(12) United States Patent
Kimura et al.

(10) Patent No.: US 8,126,266 B2
(45) Date of Patent: Feb. 28, 2012

(54) VIDEO SIGNAL PROCESSING METHOD, PROGRAM FOR THE VIDEO SIGNAL PROCESSING METHOD, RECORDING MEDIUM RECORDING THE PROGRAM FOR THE VIDEO SIGNAL PROCESSING METHOD, AND VIDEO SIGNAL PROCESSING APPARATUS

(75) Inventors: Seiji Kimura, Chiba (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 948 days.

(21) Appl. No.: 12/124,289

(22) Filed: May 21, 2008

(65) Prior Publication Data

US 2008/0292185 A1 Nov. 27, 2008

(30) Foreign Application Priority Data

May 24, 2007 (JP) ............................. P2007-137470

(51) Int. Cl.
  *G06K 9/00* (2006.01)
  *H04N 17/00* (2006.01)
  *H04N 17/02* (2006.01)
  *H04N 5/00* (2011.01)
(52) U.S. Cl. ......... 382/170; 382/275; 348/193; 348/606
(58) Field of Classification Search .................. 382/172, 382/168, 170, 275; 348/180, 193, 606–624, 348/701
  See application file for complete search history.

(56) References Cited

U.S. PATENT DOCUMENTS

| | | | |
|---|---|---|---|
| 6,295,384 B1 * | 9/2001 | Into .............................. | 382/275 |
| 6,298,144 B1 * | 10/2001 | Pucker et al. ................. | 382/103 |
| 7,139,035 B2 * | 11/2006 | Kempf .......................... | 348/607 |
| 7,319,494 B2 * | 1/2008 | Wredenhagen et al. ...... | 348/606 |
| 7,714,939 B2 * | 5/2010 | Zhou et al. .................... | 348/701 |
| 7,738,042 B2 * | 6/2010 | Kamimura .................... | 348/607 |
| 7,932,955 B2 * | 4/2011 | Zhong et al. .................. | 348/701 |
| 8,023,762 B2 * | 9/2011 | Rhee ............................. | 382/260 |
| 2001/0033692 A1 * | 10/2001 | Borneo et al. ................ | 382/205 |
| 2004/0114055 A1 * | 6/2004 | Yu ................................. | 348/700 |
| 2005/0110907 A1 | 5/2005 | Jung | |
| 2005/0243205 A1 | 11/2005 | Wredenhagen et al. | |

(Continued)

FOREIGN PATENT DOCUMENTS

JP   8-201464   8/1996

(Continued)

OTHER PUBLICATIONS

M.P. Wand, Data-Based Choice of Histogram Bin Width, Feb. 1997, vol. 51, No. 1, The American Statistician, p. 59.*

(Continued)

*Primary Examiner* — Aaron W Carter
(74) *Attorney, Agent, or Firm* — Finnegan, Henderson, Farabow, Garrett & Dunner, L.L.P.

(57) ABSTRACT

Provided is a video signal processing method of measuring a noise level of an input video signal, the method including the steps of: setting a plurality of areas in the input video signal and extracting a characteristic amount which is an index of the noise level of the input video signal for each area; detecting characteristic amounts suitable to a measurement of the noise level from among the characteristic amounts of the plurality of areas; and creating a histogram by using the detected characteristic amounts suitable to the measurement of the noise level and detecting the noise level by analyzing the histogram.

20 Claims, 38 Drawing Sheets

U.S. PATENT DOCUMENTS

| | | | |
|---|---|---|---|
| 2006/0050783 A1 | 3/2006 | Le Dinh et al. | |
| 2008/0292185 A1* | 11/2008 | Kimura et al. | 382/172 |
| 2010/0246953 A1* | 9/2010 | Guermoud et al. | 382/168 |
| 2010/0309378 A1* | 12/2010 | Zhong | 348/607 |
| 2011/0037899 A1* | 2/2011 | Rhee | 348/607 |
| 2011/0037900 A1* | 2/2011 | Rhee | 348/607 |

FOREIGN PATENT DOCUMENTS

| | | |
|---|---|---|
| JP | 10-262160 | 9/1998 |
| JP | 2003-173449 | 6/2003 |
| JP | 2003-209716 | 7/2003 |
| JP | 2003-331283 | 11/2003 |
| JP | 2005-229166 | 8/2005 |
| JP | 2006-245694 | 9/2006 |
| JP | 2007-011926 | 1/2007 |
| JP | 2007-053697 | 3/2007 |
| WO | WO 01/35677 A1 | 5/2001 |

OTHER PUBLICATIONS

Chao-Chee Ku et al, Luminance-Based Adaptive Color Saturation Adjustment, Aug. 2005, IEEE, vol. 51, No. 3, p. 939.*

European Search Report from the European Patent Office issued in corresponding in EP 08 25 1447, dated Aug. 27, 2010.

* cited by examiner

NOISE LEVEL SMALL

NOISE LEVEL LARGE

VIDEO SIGNAL PROCESSING METHOD, PROGRAM FOR THE VIDEO SIGNAL PROCESSING METHOD, RECORDING MEDIUM RECORDING THE PROGRAM FOR THE VIDEO SIGNAL PROCESSING METHOD, AND VIDEO SIGNAL PROCESSING APPARATUS

CROSS REFERENCES TO RELATED APPLICATIONS

The present invention contains subject matter related to Japanese Patent Application JP 2007-137470 filed in the Japanese Patent Office on May 24, 2007, the entire contents of which are incorporated herein by reference.

BACKGROUND OF THE INVENTION

1. Field of the Invention

The present invention relates to a video signal processing method, a program for the video signal processing method, a recording medium recording the program for the video signal processing method, and a video signal processing apparatus, which can be applied, for example, to a noise filter for eliminating a nose in a video signal. According to an embodiment of the present invention, a histogram is generated while a characteristic amount which is not suitable to a noise level measurement is excluded and this histogram is analyzed to measure the noise level so that the noise level is measured with a further improved accuracy as compared with a case in related art.

2. Description of the Related Art

In the past, in various video signal processing apparatuses, a method of measuring a noise level of an input video signal and suppressing a noise of the input video signal on the basis of the measurement result, or the like, has been adopted. Regarding this measurement method for the noise level, various techniques by using a histogram have been proposed.

That is, Japanese Unexamined Patent Application Publication No. 8-201464 discloses a method of finding out a plurality of statistical values such as a peak value and an average value from a histogram and setting a small statistical amount as a noise level. Also, Japanese Unexamined Patent Application Publication No. 10-262160 proposes a method of selecting a small value side from among a two-dimensional processing measurement value while an in-plane signal is set as a measurement target and a three-dimensional processing measurement value while a difference signal between fields or between frames is set as a measurement target and finding out a noise level from a peak value of a histogram which uses the measurement value on the selected side. In addition, Japanese Unexamined Patent Application Publication No. 2005-229166 proposes a method of detecting an image area with a high correlativity between adjacent frames and finding out a noise level from a peak value of a histogram which is created from an average value of difference values, a median of the difference values, and the difference values between image areas or the like.

However, according to these disclosed techniques, there is a problem that it is difficult to measure the noise level with a high accuracy because of an influence of a motion difference component included in a signal of the measurement target or a non-flat signal component such as an edge or a texture.

SUMMARY OF THE INVENTION

Embodiments of the present invention have been made in view of the above-mentioned problems. It is therefore desirable to propose a video signal processing method, a program for the video signal processing method, a recording medium recording the program for the video signal processing method, and a video signal processing apparatus in which a noise level can be measured with a further improved accuracy as compared with a case in related art.

According to an embodiment of the present invention, there is provided a video signal processing method of measuring a noise level of an input video signal, the method including the steps of: setting a plurality of areas in the input video signal and extracting a characteristic amount which is an index of the noise level of the input video signal for each area; detecting characteristic amounts suitable to a measurement of the noise level from among the characteristic amounts of the plurality of areas; and creating a histogram by using the detected characteristic amounts suitable to the measurement of the noise level and detecting the noise level by analyzing the histogram.

In addition, according to another embodiment of the present invention, there is provided a program for a video signal processing method of measuring a noise level of an input video signal, the method including the steps of: setting a plurality of areas in the input video signal and extracting a characteristic amount which is an index of the noise level of the input video signal for each area; detecting characteristic amounts suitable to a measurement of the noise level from among the characteristic amounts of the plurality of areas; and creating a histogram by using the detected characteristic amounts suitable to the measurement of the noise level and detecting the noise level by analyzing the histogram.

In addition, according to another embodiment of the present invention, there is provided a recording medium which records a program for a video signal processing method of measuring a noise level of an input video signal, the method including the steps of: setting a plurality of areas in the input video signal and extracting a characteristic amount which is an index of the noise level of the input video signal for each area; detecting characteristic amounts suitable to a measurement of the noise level from among the characteristic amounts of the plurality of areas; and creating a histogram by using the detected characteristic amounts suitable to the measurement of the noise level and detecting the noise level by analyzing the histogram.

In addition, according to another embodiment of the present invention, there is provided a video signal processing apparatus for measuring a noise level of an input video signal, the apparatus including: a characteristic amount extraction section adapted to set a plurality of areas in the input video signal and extract a characteristic amount which is an index of the noise level of the input video signal for each area; a measurement availability detection section adapted to detect characteristic amounts suitable to a measurement of the noise level from among the characteristic amounts of the plurality of areas; and a noise level measurement section adapted to create a histogram by using the characteristic amounts suitable to the measurement of the noise level detected in the measurement availability detection section and analyze the histogram to detect the noise level.

According to the above-mentioned configurations, the noise level can be measured by only using the characteristic amount which is suitable to the noise measurement, and as a result, the noise level can be measured with a further improved accuracy as compared with a case in related art.

According to the embodiments of the present invention, the noise level can be measured with a further improved accuracy as compared with a case in related art.

DESCRIPTION OF THE PREFERRED EMBODIMENTS

Hereinafter, while appropriately referring to the accompanying drawings, embodiments of the present invention will be described in detail.

First Embodiment (1) Configuration of the Embodiment

Figure 1:
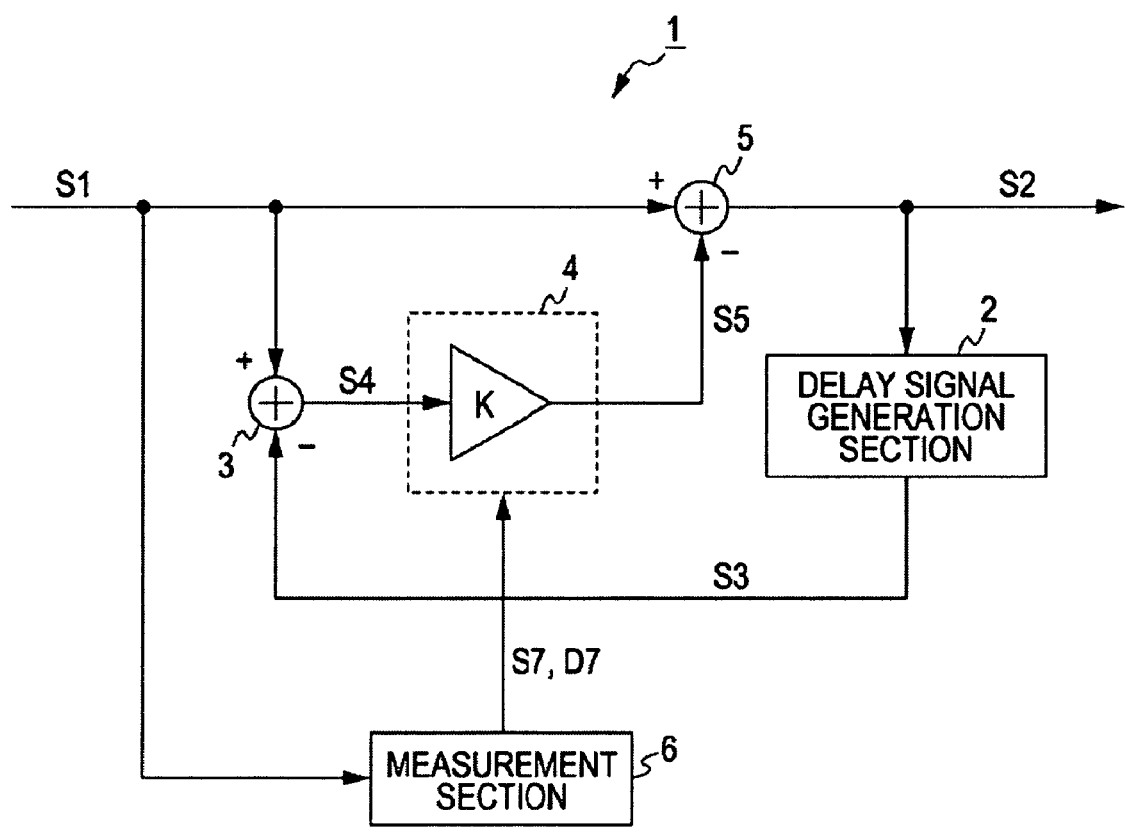
FIG. 1 is a block diagram of a noise filter which is applied to a video signal processing apparatus according to a first embodiment of the present invention.

FIG. 1 is a block diagram of a noise filter which is applied to a video signal processing apparatus according to a first embodiment of the present invention. A noise filter 1 is a time cyclic noise filter and adapted to eliminate a noise of an input video signal S1 by utilizing a correlation between continuous fields and frames to output an output video signal S2.

It should be noted that according to this embodiment, the noise filter 1 is configured of a processor adapted to process the input video signal S1 through an execution of a predetermined program. According to this embodiment, this program is previously installed and provided but instead of this, the program may also be recorded and provided in a recording medium such as an optical disk, a magnetic disk, or a memory card or provided through a download via a network such as the Internet.

Herein, a delay signal generation section 2 is adapted to delay the output video signal S2 to output a delay signal S3 for noise component extraction. It should be noted that herein, the delay signal S3 may be generated by motion-compensating the output video signal S2. A subtraction circuit 3 is adapted to subtract the delay video signal S3 from the input video signal S1 to generate a noise signal component S4. A signal level compensation circuit 4 is adapted to amplify the noise signal component S4 at a predetermined gain to compensate the signal level of the noise signal component S4 to thereby generate a compensation signal S5. A subtraction circuit 5 is adapted to subtract the compensation signal S5 from the input video signal S1 to generate the output video signal S2.

A measurement section 6 is adapted to measure the signal level of the noise signal component from the input video signal S1 to output a measurement result S7 and also output a measurement reliability D7 indicating the degree of reliability of the measurement result S7. The signal level compensation circuit 4 varies the gain of the signal level compensation circuit 4 in accordance with the measurement result S7, and as a result, the signal level of the compensation signal S5 is compensated. The measurement section 6 is adapted to set the gain of the signal level compensation circuit 4 on the basis of a weighted average value of a gain value set in the immediately preceding frame and a gain value obtained from the measurement result S7 in the corresponding field, and vary a weighting coefficient used for this weighted average in accordance with the measurement reliability D7. As a result, the noise filter 1 compensates the noise level so as to reflect the prior compensation amount in accordance with the measurement reliability D7 when the degree of reliability of the measurement result S7 is low.

Figure 2:
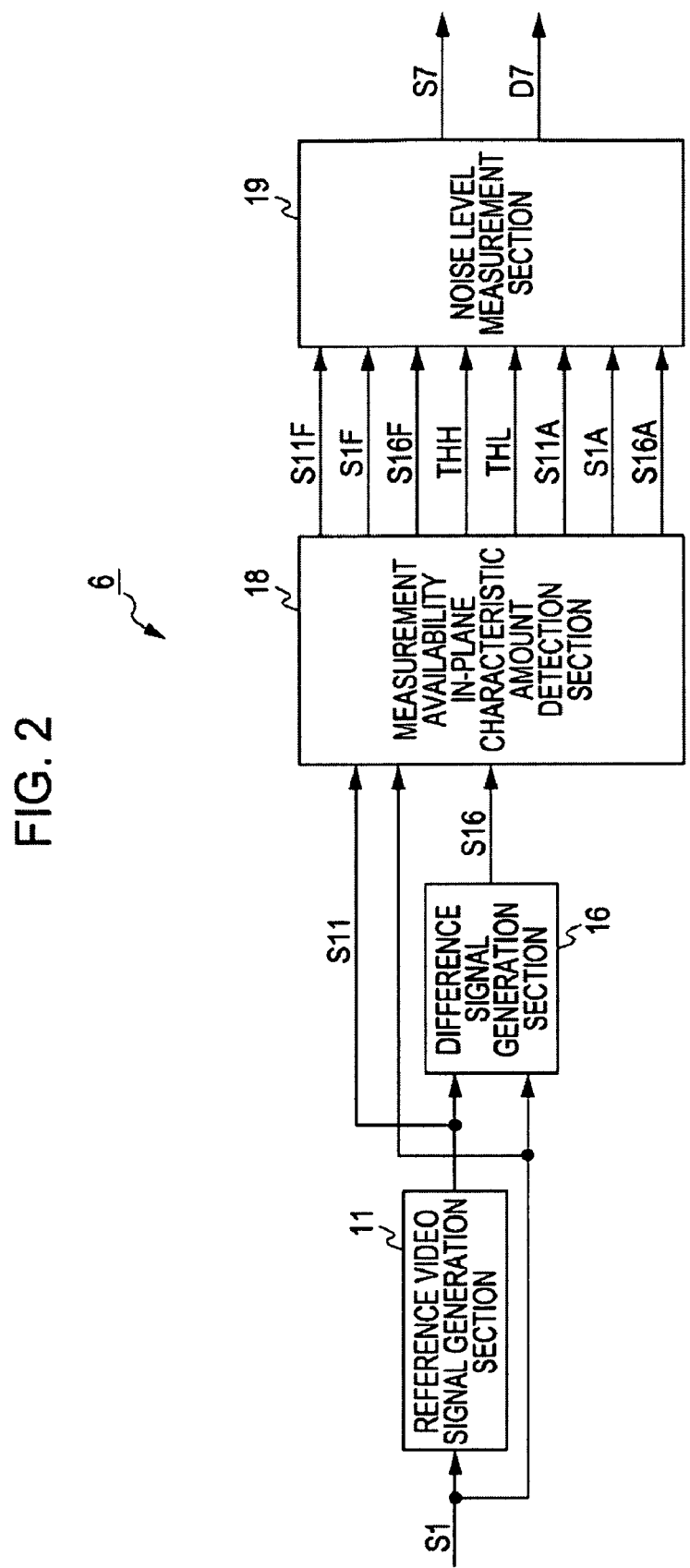
FIG. 2 is a block diagram of a measurement section in the noise filter of FIG. 1.

FIG. 2 is a block diagram of the measurement section 6. In the measurement section 6, a reference video signal generation section 11 delays the input video signal S1 by the period of the one field or the one frame to output a reference video signal S11. To be more specific, the reference video signal generation section 11 motion-compensates the input video signal S1 to generate the reference video signal S11.

Figure 3:
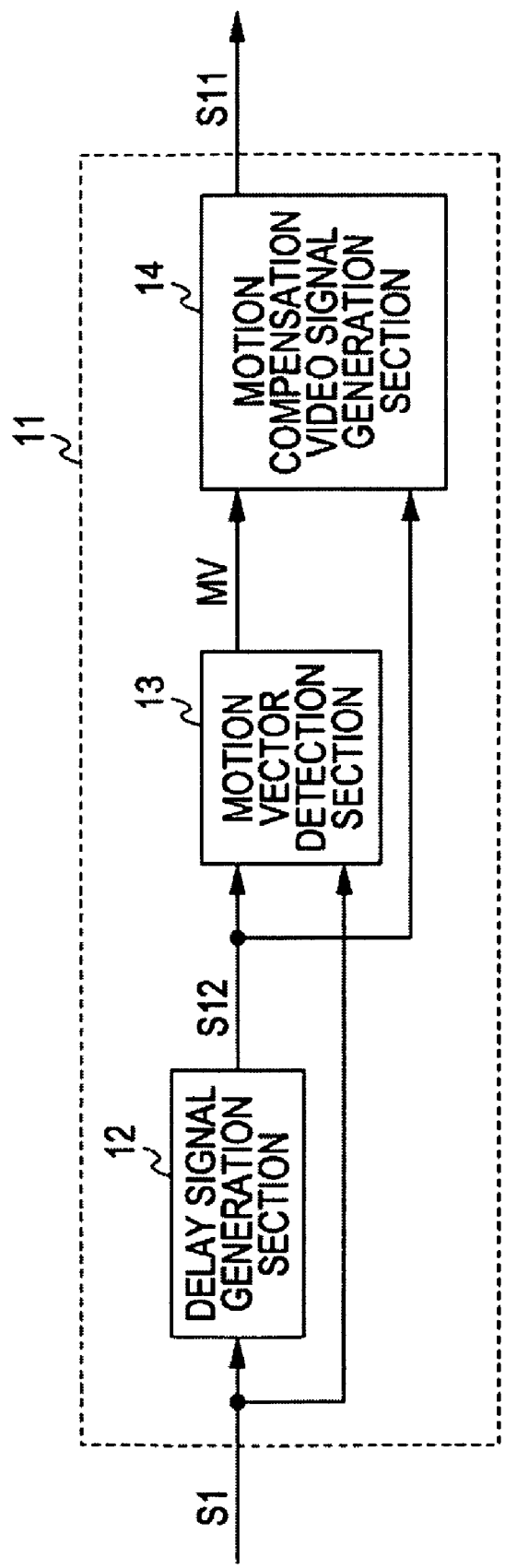
FIG. 3 is a block diagram of a reference video signal generation section in the measurement section of FIG. 2.

Herein, FIG. 3 is a block diagram of the reference video signal generation section 11. In the reference video signal generation section 11, a delay signal generation section 12 delays the input video signal S1 by the period of one field or one frame to generate a delay video signal S12. A motion vector detection section 13 is adapted to detect a motion vector MV from the input video signal S1 by using the delay video signal S12 as a reference. It should be noted that herein, for the detection of the motion vector MV, various motion vector detection methods such as a block matching method and a gradient method can be applied. In addition, the accuracy of the motion vector MV may be either an integer pixel accuracy or a decimal pixel accuracy.

Figure 4:
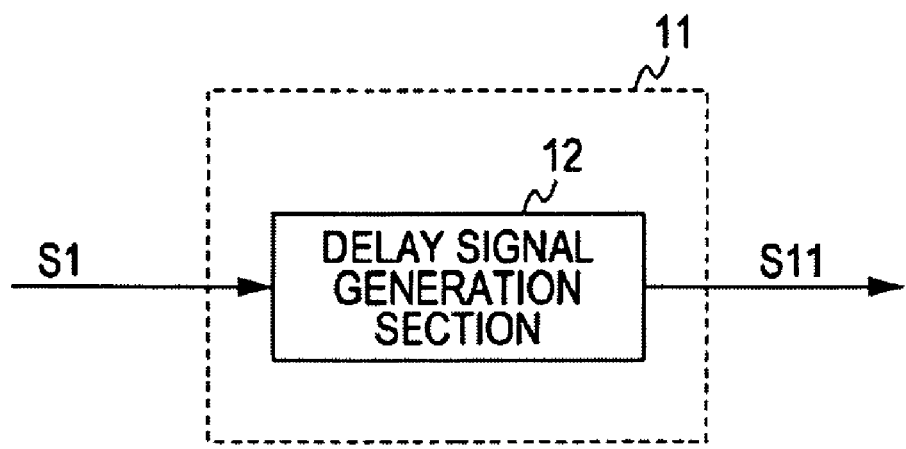
FIG. 4 is a block diagram of another example of the reference video signal generation section of FIG. 3.

A motion compensation video signal generation section 14 is adapted to motion-compensate the delay video signal S12 by using the motion vector MV to output the reference video signal S11. It should be noted that herein, the reference video signal S11 may be generated by simply delaying the input video signal S1 by the one field or the one frame in the delay signal generation section 12 in a case where a practically sufficient characteristic can be ensured as illustrated in FIG. 4.

Figure 5:
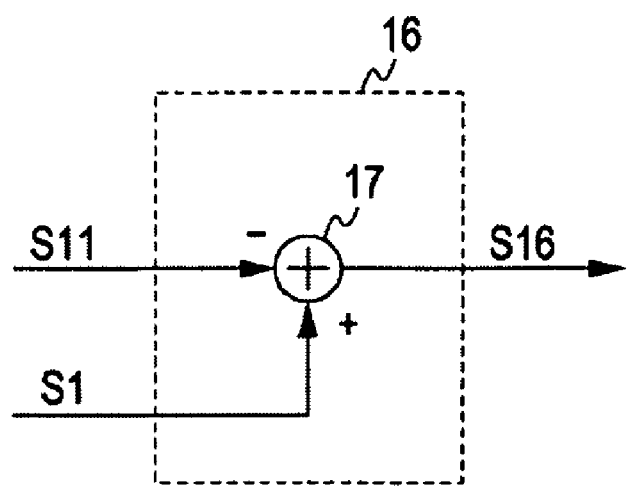
FIG. 5 is a block diagram of a difference single generation section in the noise filter of FIG. 1.

A difference signal generation section 16 (FIG. 2) is adapted to subtract the reference video signal S11 from the input video signal S1 in a subtraction circuit 17 and output a difference signal S16 which is a difference between fields or frames as illustrated in FIG. 5.

A measurement availability in-plane characteristic amount detection section 18 (FIG. 2) is adapted to set a plurality of areas in one screen of the input video signal S1 and detect a characteristic amount which is an index of the noise level of the input video signal S1 for each area. To be more specific, the measurement availability in-plane characteristic amount detection section 18 finds out and outputs, for each area, in-plane characteristic amounts S1A, S11A, and S16A which are a fluctuation of pixel values in the input video signal S1, the reference video signal S11, and the difference signal S16 (hereinafter referred to as activity). In addition, the measurement availability in-plane characteristic amount detection section 18 outputs measurement availability identification flags S1F, S11F, and S16F indicating whether the activities S1A, S11A, and S16A of the input video signal S1, the reference video signal S11, and the difference signal S16 are suitable to the noise measurement for each area. In addition, for a statistical processing which uses a histogram in a noise level measurement section 19 in a later stage, a lower limit threshold THL and an upper limit threshold THH for defining a range where this histogram is created are calculated and output. It should be noted that in a case where the noise level can be detected with a practically sufficient accuracy, the activity can be generated by using any one or two of the input video signal S1, the reference video signal S11, and the difference signal S16.

Figure 6:
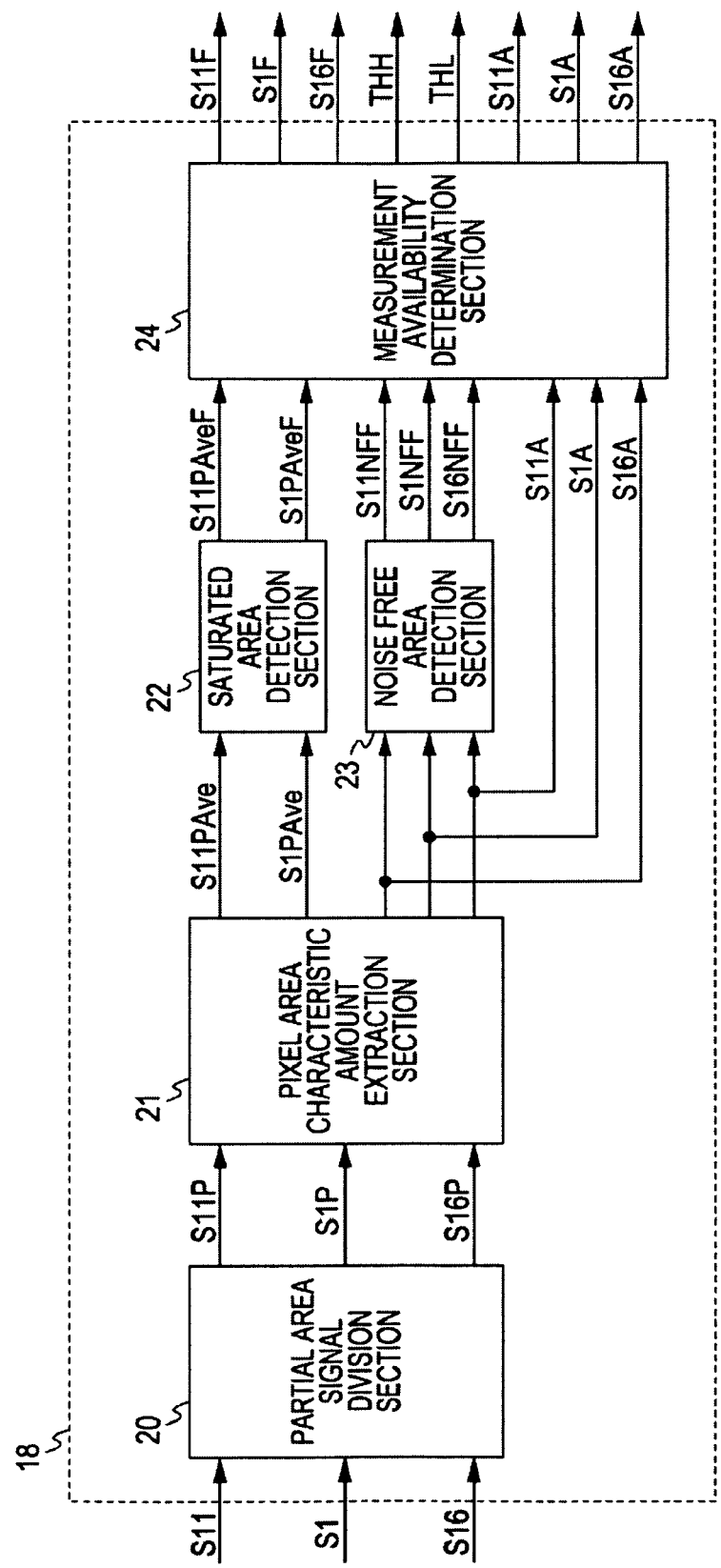
FIG. 6 is a block diagram of a measurement availability in-plane characteristic amount detection section in the measurement section of FIG. 2.
Figure 7:
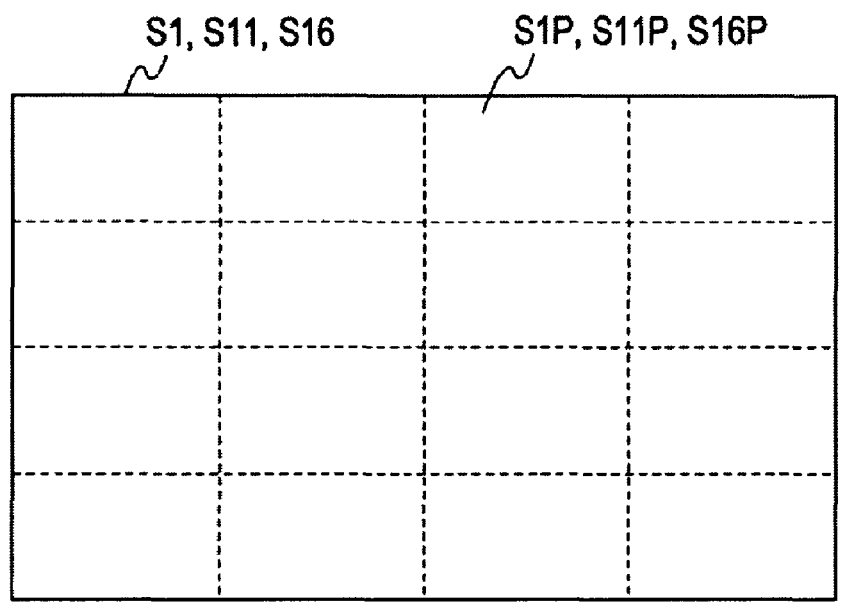
FIG. 7 is a plan view used for describing an operation of a partial area signal division section in the measurement availability in-plane characteristic amount detection section of FIG. 6.
Figure 8:
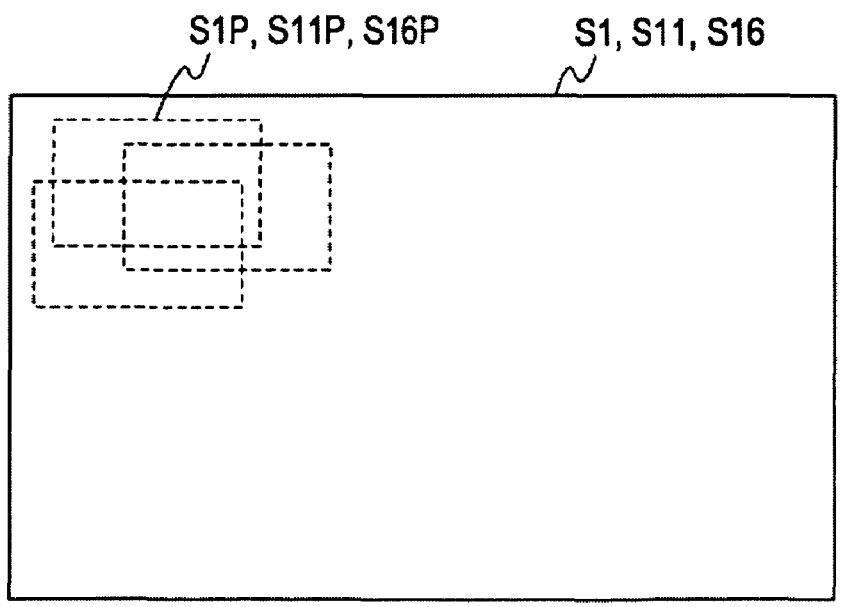
FIG. 8 is a plan view used for describing an operation of another example of the partial area signal division section in the measurement availability in-plane characteristic amount detection section of FIG. 6.

Herein, FIG. 6 is a block diagram of the measurement availability in-plane characteristic amount detection section 18. In the measurement availability in-plane characteristic amount detection section 18, a partial area signal division section 20 is adapted, as illustrated in FIG. 7, to divide the one screen of the input video signal S1 in the horizontal direction and the vertical direction to set a plurality of areas on one screen of the input video signal S1. Also, for each area, the input video signal S1, the reference video signal S11, and the difference signal S16 are allocated, and for each area, these input video signal S1, the reference video signal S11, and the difference signal S16 are integrated to be output. It should be noted that the input video signal S1, the reference video signal S11, and the difference signal S16 allocated for each area and output for each area in this manner are appropriately referred to as partial input video signal S1P, partial reference video signal S11P, and partial difference signal S16P. It should be noted that in comparison with FIG. 7, as illustrated in FIG. 8, the setting of areas may be performed in such a manner that adjacent areas are partially overlapped one another.

A pixel area characteristic amount extraction section 21 is adapted to input and process the partial input video signal S1P, the partial reference video signal S11P, and the partial difference signal S16P for each area, and detect the activities S1A, S11A, and S16A of the input video signal S1, the reference video signal S11, and the difference signal S16 for each area. It should be noted that a variance value of the signals in each area may be applied to the activities S1A, S11A, and S16A, and also instead of this, a root mean square value of the pixel values, an average value of absolute values of the pixel values, a standard deviation value of the pixel values, or the like, may be applied. In addition, the pixel area characteristic amount extraction section 21 calculates and outputs average values S1PAve and S11PAve of the pixel values of the input video signal S1 and the reference video signal S11 for each area.

A saturated area detection section 22 is adapted to detect an area where clipping of the pixel values of the input video signal S1 and the reference video signal S11 may be caused due to an influence of a dynamic range (hereinafter referred to as saturated area) by determining the average values S1PAve and S11PAve of the pixel values of the input video signal S1 and the reference video signal S11 calculated in the pixel area characteristic amount extraction section 21 with predetermined thresholds S_min_Th and S_max_Th to set up saturated area detection flags S1PAveF and S11PAveF corresponding to the detected saturated areas. It should be noted that herein the clipping refers to so-called white crushing or black crushing. Also, the thresholds S_min_Th and S_max_Th are respectively thresholds on the black level side and the white level side. Therefore, regarding the partial input video signal S1P, the saturated area detection section 22 sets up the saturated area detection flag S1PAveF of the input video signal S1 by determining as the saturated area in a case where the following relational expression is established. In addition, regarding the partial reference video signal S11P, the saturated area detection flag S11PAveF of the reference video signal S11 is set up by determining as the saturated area in a case where the following relational expression is established. It should be noted that herein, Ave in Expression (1) refers to the average values S1PAve and S11PAve of the pixel values of the input video signal S1 and the reference video signal S11 respectively calculated in the pixel area characteristic amount extraction section 21.

[Expression 1]

$$\text{Ave} < S\_min\_Th \text{ or } \text{Ave} > S\_max\_Th \qquad (1)$$

Herein, in a case where the pixel value of the video signal is influenced by the dynamic range and the clipping is caused, the noise overlapping this video signal also involves the clipping. Therefore, in this clipping area, it is difficult to correctly measure the noise level. Therefore, for each area, while the average values S1PAve and S11PAve of the input video signal 51 and the reference video signal S11 are used as the reference, the saturated area detection section 22 detects an area which is not suitable to the noise level detection and outputs the detection result through the saturated area detection flags S1PAveF and S11PAveF.

A noise free area detection section 23 is adapted to input the activities S1A, S11A, and S16A of the input video signal S1, the reference video signal S11, and the difference signal S16 and detect respective noise free areas to thereby output noise free area detection flags S1NFF, S11NFF, and S16NFF. Herein, the noise free area refers to an area of a graphical user interface such as a television receiver or an optical disk recorder or an area where caption information or the like which is inserted during an editorial procedure is displayed, and is regarded as an area where almost no noise exists in the target signal.

The noise free area detection section 23 determines a value Iact of the activities S1A and S11A of the input video signal S1 and the reference video signal S11 in each area with a predetermined threshold INF_Th. In a case where the following relational expression is established, the area is determined as the noise free area and the noise free area detection flags S1NFF and S11NFF of the input video signal S1 and the reference video signal S11 are set up.

[Expression 2]

$$\text{Iact} < INF\_Th \qquad (2)$$

In addition, the noise free area detection section 23 determines a value Pact of the activity S16A of the difference signal S16 in each area with a threshold PNF_Th. In a case where the following relational expression is established, the area is determined as the noise free area and the noise free area detection flag S16NFF of the difference signal S16 is set up.

[Expression 3]

$$\text{Pact} < PNF\_Th \qquad (3)$$

A measurement availability determination section 24 is adapted to process the saturated area detection flags S1PAveF and S11PAveF and the noise free area detection flags S1NFF, S11NFF, and S16NFF to output the measurement availability identification flags S1F, S11F, and S16F indicating whether the area is suitable to the noise. Also, the lower limit threshold THL and the upper limit threshold THH are generated and output.

Figure 9:
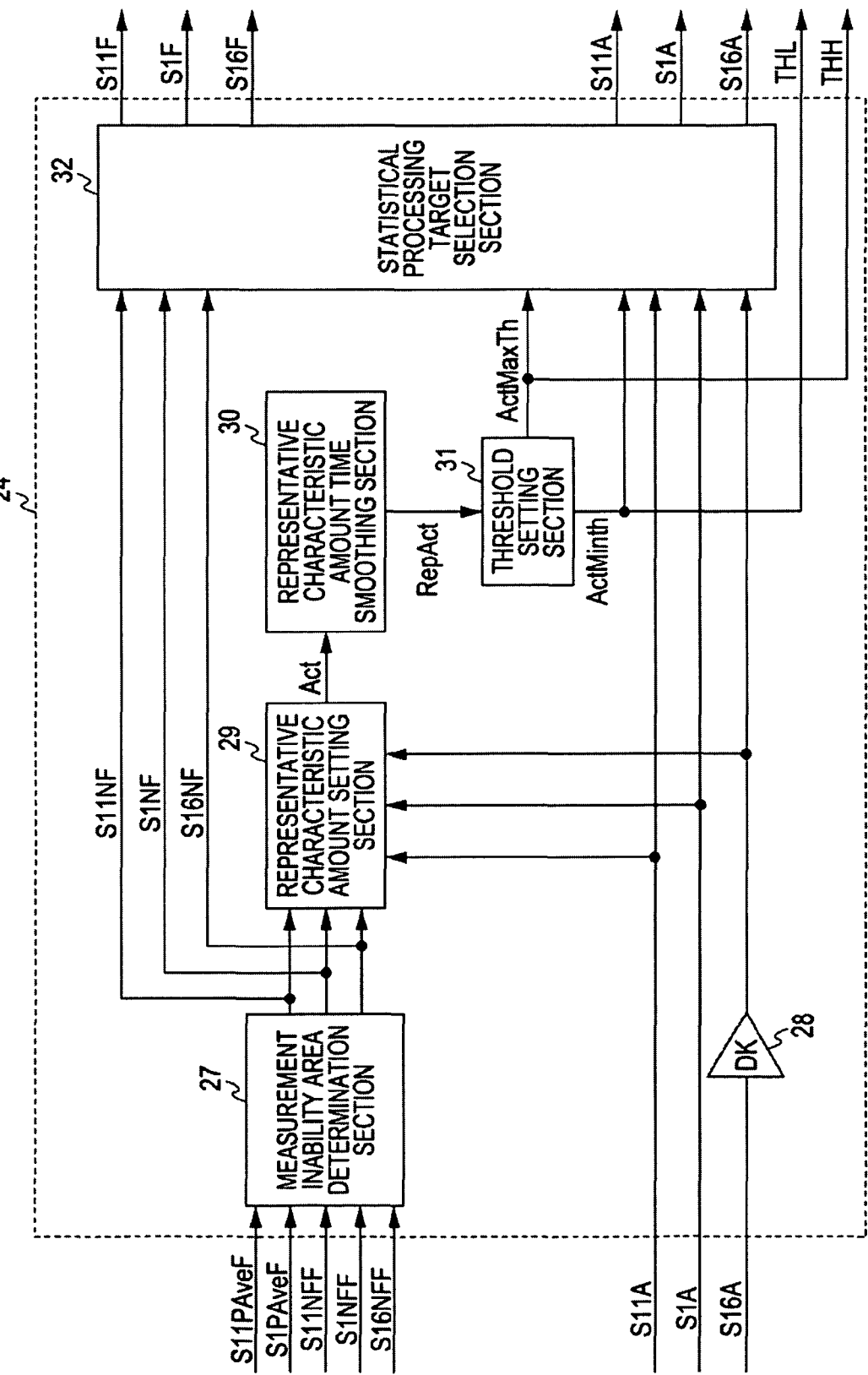
FIG. 9 is a block diagram of a measurement availability determination section in the measurement availability in-plane characteristic amount detection section of FIG. 6.

FIG. 9 is a block diagram of the measurement availability determination section 24. In the measurement availability determination section 24, a measurement inability area determination section 27 is adapted to perform a logical computation processing on the saturated area detection flags S1PAveF and S11PAveF and the noise free area detection flags S1NFF, S11NFF, and S16NFF to set up measurement inability area determination flags S1NF, S11NF, and S16NF for each of the input video signal S1, the reference video signal S1, and the difference signal S16.

To be more specific, in a case where any one of the saturated area detection flag S1PAveF of the input video signal S1 and the noise free area detection flag S1NFF is set up, the measurement inability area determination section 27 determines that the input video signal S1 of the corresponding area is not suitable to the noise measurement to set up the measurement inability area determination flag S1NF of the input video signal S1. In addition, in a case where any one of the saturated area detection flag S11PAveF of the reference video signal S11 and the noise free area detection flag S11NFF is set up, the measurement inability area determination section 27 determines that the reference video signal S11 of the corresponding area is not suitable to the noise measurement to set up the measurement inability area determination flag S11NF of the reference video signal S11. In addition, in a case where any one of the noise free area detection flag S16NFF of the difference signal S16, the saturated area detection flag S1PAveF of the input video signal S1, and the saturated area detection flag S11PAveF of the reference video signal S11 is set up, the measurement inability area determination section 27 determines that the difference signal S16 of the corresponding area is not suitable to the noise measurement to set up the measurement inability area determination flag S16NF of the difference signal S16 in the corresponding area.

An amplification circuit 28 is adapted to amplify the activity S16A of the difference signal S16 with a gain DK and output so as to be corresponding to the activity S1A of the input video signal S1 and the activity S11A of the input video signal S11. It should be noted that this amplification with the gain DK is used for compensate the activity S16A of the difference signal S16 while a consideration is given on that the dynamic range of the difference signal S16 may be larger than those of the input video signal S1 and the reference video signal S11.

A representative characteristic amount setting section 29 is adapted to select the activities S1A, S11A, and S16A determined as being suitable to the measurement of the noise level from the activity S1A of the input video signal S1, the activity S11A of the input video signal S1, and the activity S16A of the difference signal S16 output from amplification circuit 28 in a case where the corresponding measurement inability area determination flags S1NF, S11NF, and 16NF are not set up. Also, the selected activities S1A, S11A, and S16A are statistically processed to detect a representative characteristic amount Act which represents a plurality of detected characteristic amounts.

Figure 10:
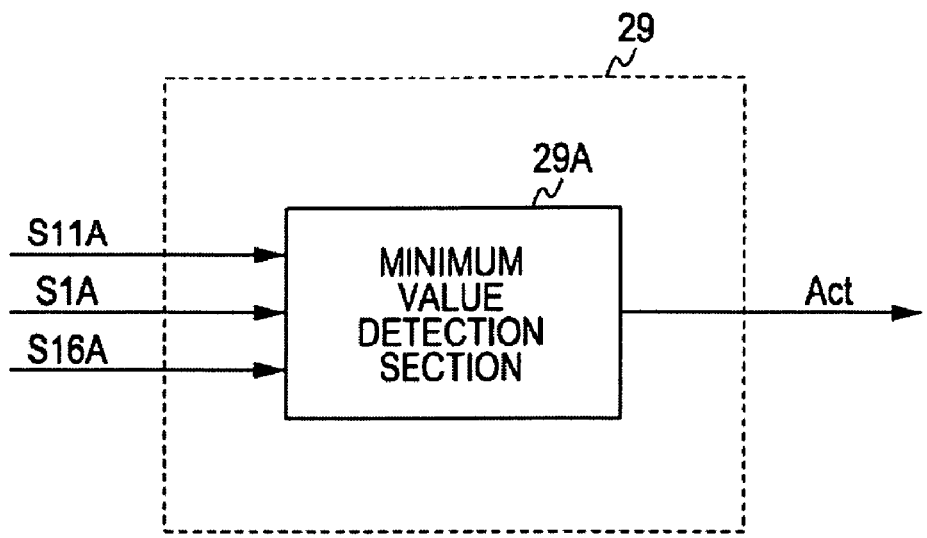
FIG. 10 is a block diagram of a representative characteristic amount setting section in the measurement availability determination section of FIG. 9.

Herein, any of the configurations illustrated in FIGS. 10 to 14 may be applied to this statistical processing. Herein, FIG. 10 illustrates such a configuration that with a minimum value detection section 29A, a minimum value is detected in units of a field or a frame from the selected activities S1A, S11A, and S16A to be set as the representative characteristic amount Act. It is possible to set the representative characteristic amount Act while trying to avoid the influence from the motion, but a stability is not sufficient, which may lead to a drawback.

Figure 11:
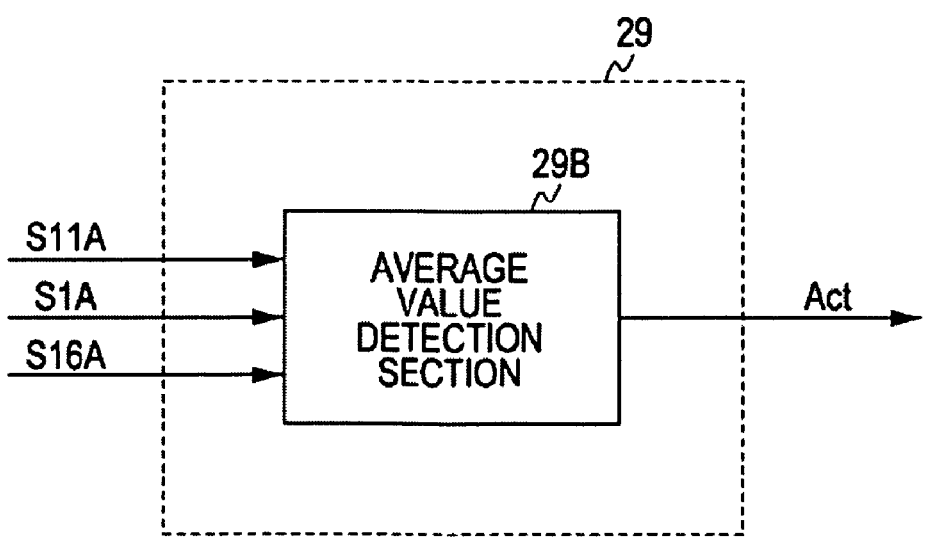
FIG. 11 is a block diagram of a representative characteristic amount setting section which is a different example from FIG. 10.
Figure 12:
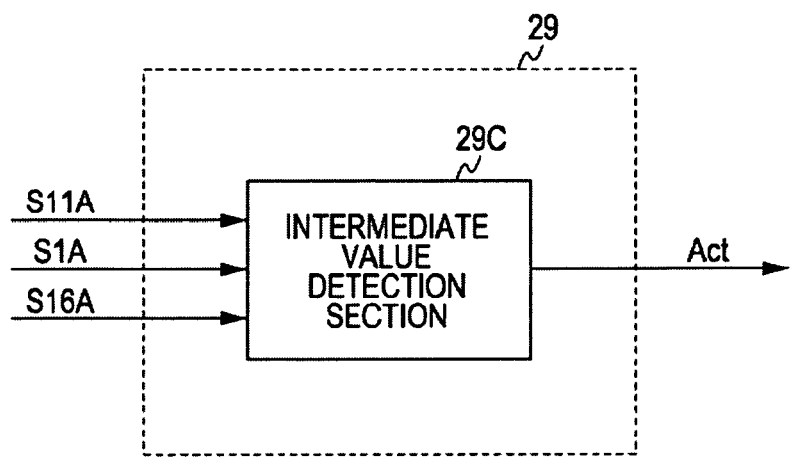
FIG. 12 is a block diagram of a representative characteristic amount setting section which is a different example from FIGS. 10 and 11.

In addition, FIG. 11 illustrates such a configuration that with an average value detection section 29B, an average value is calculated in units of a field or a frame from the selected activities S1A, S11A, and S16A to be set as the representative characteristic amount Act. In addition, FIG. 12 illustrates such a configuration that with an intermediate value detection section 29C, an activity of an intermediate value is selected in units of a field or a frame from the selected activities S1A, S11A, and S16A to be set as the representative characteristic amount Act. The configurations of FIGS. 11 and 12 put a priority on the stability as compared with the configuration of FIG. 10.

Figure 13:
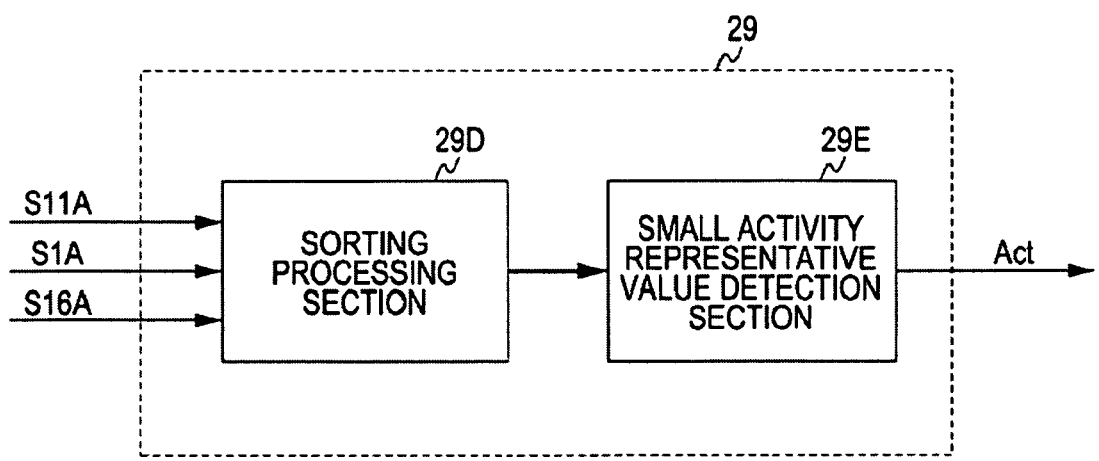
FIG. 13 is a block diagram of a representative characteristic amount setting section which is a different example from FIGS. 10 to 12.

In contrast, FIG. 13 illustrates such a configuration that with a sorting processing section 29D, the selected activities S1A, S11A, and S16A are sorted in units of a field or a frame in an ascending order or a descending order to be input to a small activity representative value detection section 29E, and a predetermine number of activities from the small value side are averaged in the small activity representative value detection section 29E to be set as the representative characteristic amount Act. It should be noted that in this case, an activity of a predetermined number from the small value side may be selected to be set as the representative characteristic amount Act.

Figure 14:
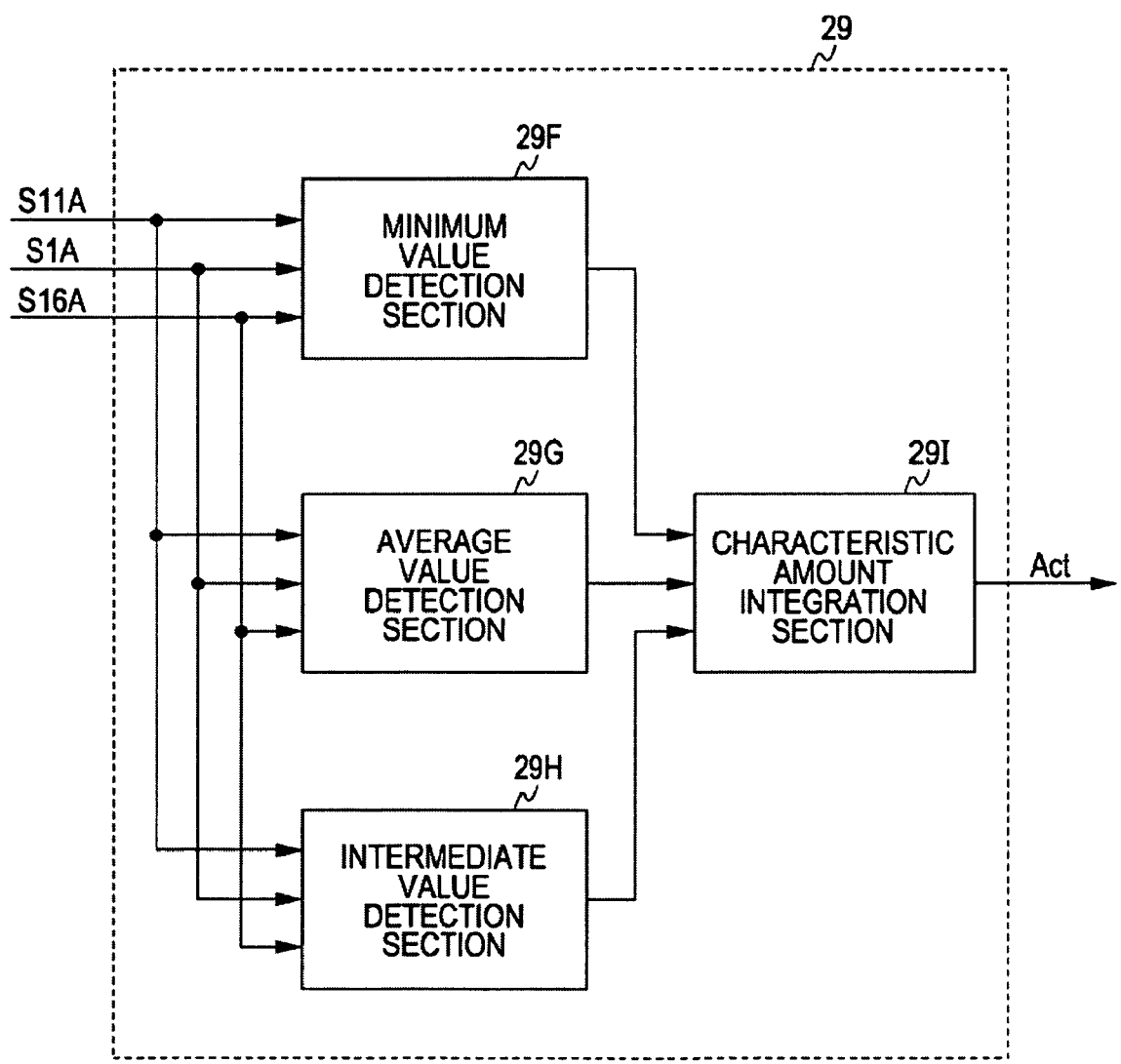
FIG. 14 is a block diagram of a representative characteristic amount setting section which is a different example from FIGS. 10 to 13.

In addition, FIG. 14 illustrates such a configuration that from the selected activities S1A, S11A, and S16A, in units of a field or a frame, with a minimum value detection section 29F, an average value detection section 29G, and an intermediate value detection section 29H, a minimum value, an average value, and an intermediate value are respectively detected, and with a characteristic amount integration section 29I, these minimum value, average value, and intermediate value are weighted-averaged to be set as the representative characteristic amount Act. FIGS. 13 and 14 are the configurations in which while the stability is improved, the influence from the motion is reduced to detect the representative characteristic amount Act. It should be noted that a variance value or the like may be used for representative characteristic amount.

A representative characteristic amount time smoothing section 30 is adapted to smooth the representative characteristic amount Act which is output from the representative characteristic amount setting section 29 to output a time smoothing representative characteristic amount RepAct. It should be noted that herein, an IIR filter or an FIR can be applied to the representative characteristic amount time smoothing section 30. Also, by applying an order statistical filter such as a median filter, an influence from a sudden time fluctuation due to a scene change, a sudden time fluctuation due to a repetition of the same frame in a 2-3 pull down system, or the like, may be avoided. In addition, in a case where a fluctuation in the representative characteristic amount Act which is output from the representative characteristic amount setting section 29 can be sufficiently tolerated, the representative characteristic amount time smoothing section 30 may be omitted. Also, this smoothing processing may be executed on the upper limit threshold THH and the lower limit threshold THL which will be described later instead of the representative characteristic amount.

A threshold setting section 31 is adapted to execute a computation processing in the following expression by using the time smoothing representative characteristic amount RepAct output from the representative characteristic amount time smoothing section 30 to set the upper limit threshold THH (Act_MaxTh) and the lower limit threshold THL (Act_MinTh). It should be noted that A_sd and A_mean are constant numbers which are determined in accordance with a quality of the representative characteristic amount while corresponding to the configuration of the representative characteristic amount setting section 29 described with reference to FIGS. 10 to 14. In addition, ActTh_FactorS and ActTh_FactorL are constant numbers which are determined while a consideration is given on the noise distribution.

[Expression 4]

$$Est SD = RepAct \times A\_sd \qquad (4)$$

[Expression 5]

$$EstMean = RepAct \times A\_mean \qquad (5)$$

[Expression 6]

$$Act\_MaxTh = EstMean + EstSD \times ActTh\_FactorL \qquad (6)$$

[Expression 7]

$$Act\_MinTh = EstMean - EstSD \times ActTh\_FactorS \qquad (7)$$

The threshold setting section 31 outputs the upper limit threshold THH (Act_MaxTh), the lower limit threshold THL (Act_MinTh) found out to a statistical processing target selection section 32 and also to the noise level measurement section 19. It should be noted that in this case, when necessary, the upper limit threshold THH (Act_MaxTh) and the lower limit threshold THL (Act_MinTh) are delayed and output so that a capacity of a memory may be set smaller and further the real time performance of the noise measurement may be ensured. It should be noted that in a description to be provided below, such a case will be described when the minimum value is set as the representative characteristic amount in the configuration of FIG. 10.

The statistical processing target selection section 32 sets the measurement availability identification flags S1F, S11F, and S16F indicating whether each area is eventually suitable to the noise measurement for each of the input video signal S1, the reference video signal S11, and the difference signal S16 in accordance with the measurement inability area determination flags S1NF, S11NF, and S16NF, and the activities S1A, S11A, and S16A.

That is, the statistical processing target selection section 32 determines that the corresponding input video signal S1, reference video signal S11, and difference signal S16 of the areas are not suitable to the measurement in a case of being determined as not suitable to the measurement on the basis of the corresponding measurement inability area determination flags S1NF, S11NF, and S16NF and also in a case where the activities S1A, S11A, and S16A are not within the range of the upper limit threshold THH (Act_MaxTh) and the lower limit threshold THL (Act_MinTh), the corresponding measurement availability identification flags S1F, S11F, and S16F of the areas are set down.

Also, in a case where this condition is not established, that is, in a case where the corresponding measurement inability area determination flags S1NF, S11NF, and S16NF are set down or the activities S1A, S11A, and S16A are within the range of the upper limit threshold THH (Act_MaxTh), the lower limit threshold THL (Act_MinTh), it is determined that the corresponding input video signal S1, reference video signal S11, and difference signal S16 of the areas are suitable to the measurement and the corresponding measurement availability identification flags S1F, S11F, and S16F are set up.

It should be noted that instead of this, it is determined that the corresponding input video signal S1, reference video signal S11, and difference signal S16 of the areas are not suitable to the measurement on the basis of the corresponding measurement inability area determination flags S1NF, S11NF, and S16NF, or the activities S1A, S11A, and S16A are not within the range of the upper limit threshold THH (Act_MaxTh) and the lower limit threshold THL (Act_MinTh), it is determined that the corresponding input video signal S1, reference video signal S11, and difference signal S16 are not suitable to the measurement. In a case of being determined as suitable to the measurement on the basis of the corresponding measurement inability area determination flags S1NF, S11NF, and S16NF and also in a case where the activities S1A, S11A, and S16A are within the range of the upper limit threshold THH (Act_MaxTh) and the lower limit threshold THL (Act_MinTh), it is determined that the corresponding input video signal S1, reference video signal S11, and difference signal S16 are suitable to the measurement, and as a result, the measurement accuracy of the noise level may be further improved.

The statistical processing target selection section 32 sets and outputs the measurement availability identification flags S1F, S11F, and S16F for each area, and outputs the activities S1A, S11A, and S16A which are sequentially input.

The noise level measurement section 19 (FIG. 2) selects the activities S1A, S11A, and S16A determined as being suitable to the measurement of the noise level on the basis of the measurement availability identification flags S1F, S11F, and S16F to create a histogram. Also, by analyzing this histogram, the noise level measurement result S7 and the measurement reliability D7 are detected, and the noise level measurement result S7 and the measurement reliability D7 are output.

Figure 15:
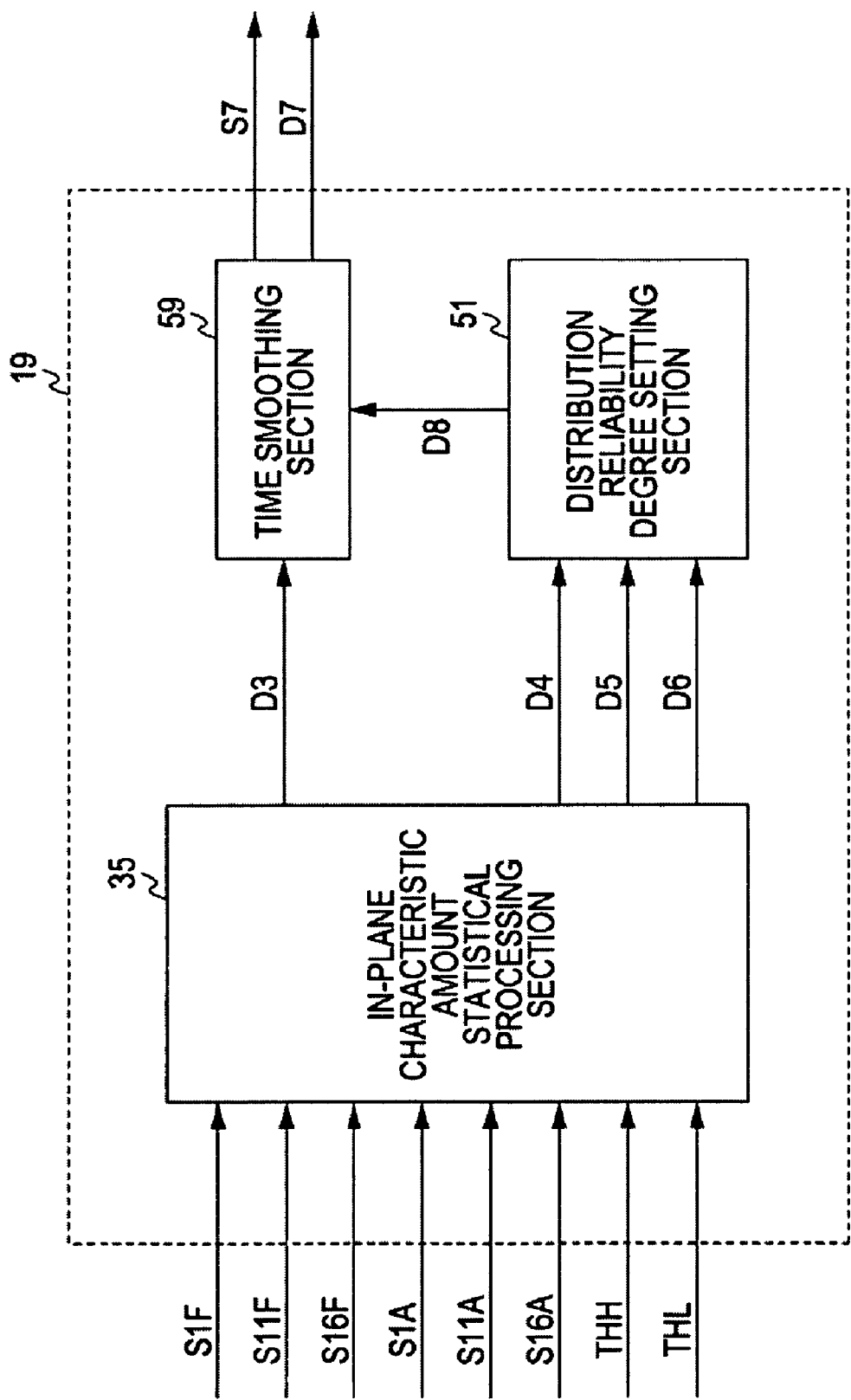
FIG. 15 is a block diagram of a noise level measurement section in the measurement section of FIG. 2.

Herein, FIG. 15 is a block diagram of the noise level measurement section 19. In the noise level measurement section 19, an in-plane characteristic amount statistical processing section 35 is adapted to use the measurement availability identification flags S1F, S11F, and S16F to select the activities S1A, S11A, and S16A determined as being suitable to the measurement of the noise level to thereby create a histogram. Also, the in-plane characteristic amount statistical processing section 35 outputs various parameters which features a shape of the histogram.

Figure 16:
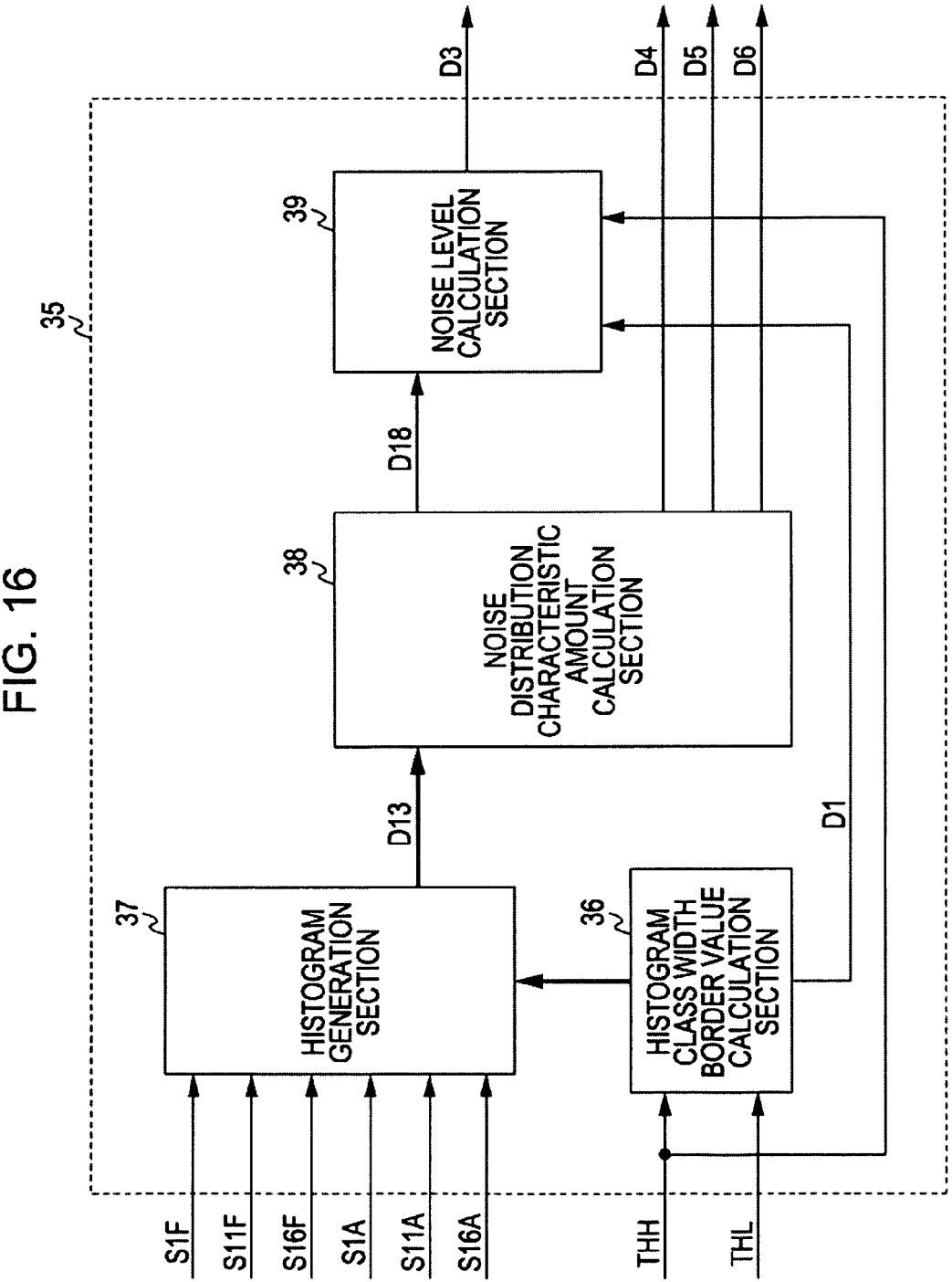
FIG. 16 is a block diagram of an in-plane characteristic amount statistical processing section in the noise level measurement section of FIG. 15.

That is, as illustrated in FIG. 16, the in-plane characteristic amount statistical processing section 35 inputs the upper limit threshold THH and the lower limit threshold THL to a histogram class width border value calculation section 36. The histogram class width border value calculation section 36 divides the value between the upper limit threshold THH and the lower limit threshold THL on the basis of the number of classes previously set to provide a border between the upper limit threshold THH and the lower limit threshold THL to thereby calculate a class width and a border value of the histogram. The histogram class width border value calculation section 36 notifies a histogram generation section 37 of the histogram class and the border value. Also, the histogram class width border value calculation section 36 notifies a noise level calculation section 39 of a histogram class D1. As a result, according to this embodiment, in order that as the fluctuation of the activities S1A, S11A, and S16A which are the characteristic amounts is larger, the histogram class is larger, the histogram class is varied in accordance with the characteristic amounts to create the histogram.

The histogram generation section 37 selectively sets the activities S1A, S11A, and S16A determined as being suitable to the measurement on the basis of the measurement availability identification flags S1F, S11F, and S16F as the histogram generation targets and creates the histogram by classifying the activities S1A, S11A, and S16A of the histogram generation targets on the basis of the histogram class and the border value notified from the histogram class width border value calculation section 36. The histogram generation section 37 creates the histogram in units of the field or units of the frame and notifies a noise distribution characteristic amount calculation section 38 of a frequency of each class in the created histogram on the basis of distribution information D13 of the histogram.

The noise distribution characteristic amount calculation section 38 analyzes the frequency of each class notified from the histogram generation section 37 to analyze the histogram generated in the histogram generation section 37 and to thereby output various parameters which feature the shape of the histogram.

Figure 17:
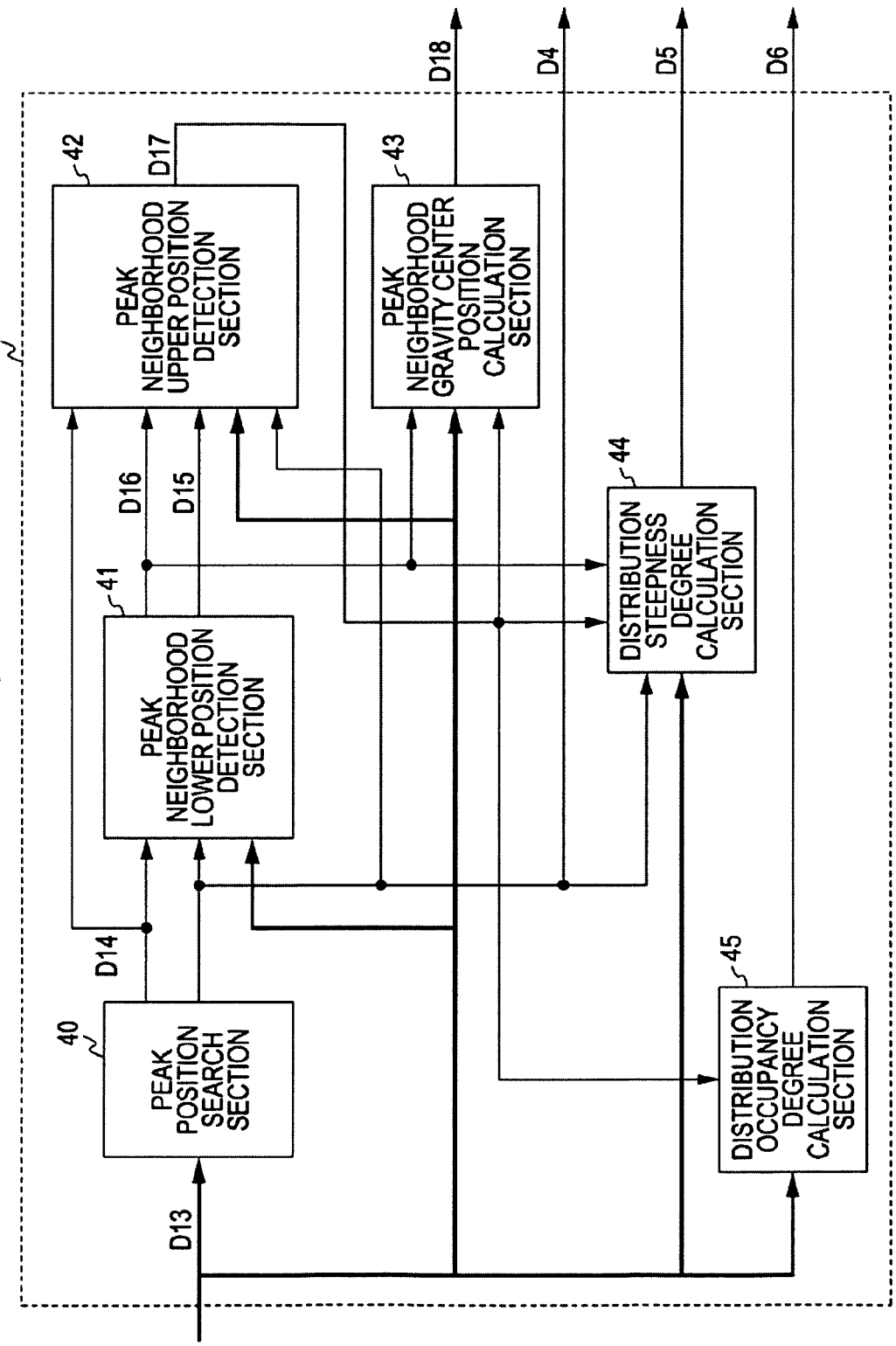
FIG. 17 is a block diagram of a noise distribution characteristic amount calculation section in the in-plane characteristic amount statistical processing section of FIG. 16.
Figure 18:
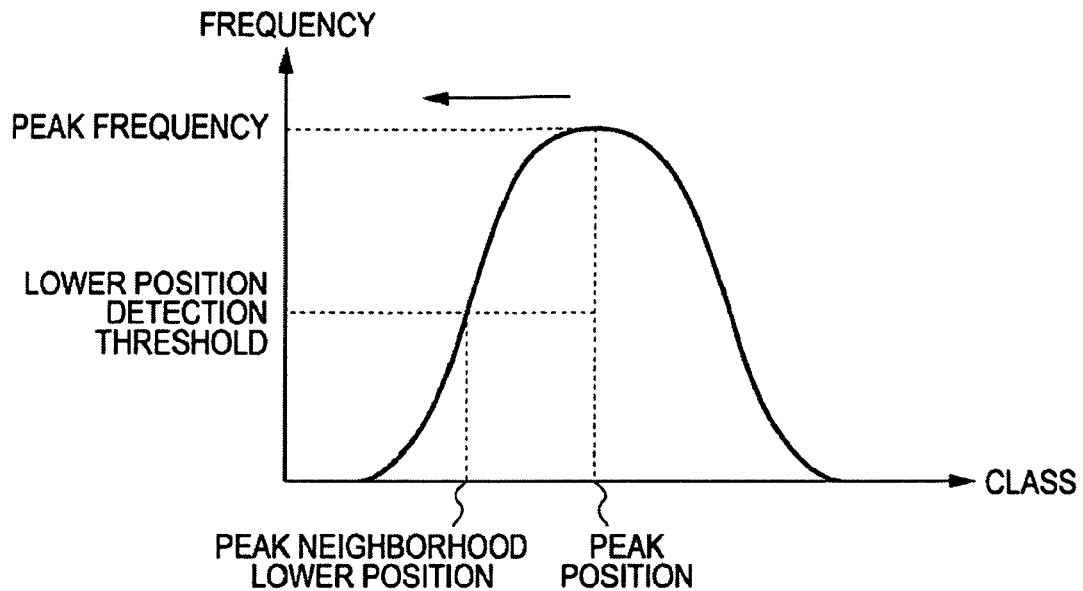
FIG. 18 is a characteristic curve diagram used for describing an operation of a peak position search section in the noise distribution characteristic amount calculation section of FIG. 17.

That is, as illustrated in FIG. 17, in the noise distribution characteristic amount calculation section 38, a peak position search section 40 is adapted to analyze the frequency of each class notified from the histogram generation section 37 as illustrated in FIG. 18 and searches for a distribution peak position which is a class where the frequency becomes maximum to detect a class at the distribution peak position and a frequency at the distribution peak position. The peak position search section 40 outputs the class at the distribution peak position as a distribution peak position D4. Also, the frequency at the distribution peak position is output as peak frequency information D14.

A peak neighborhood lower position detection section 41 is adapted to multiply the frequency at the distribution peak position by a positive coefficient which is equal to or smaller than 1 on the basis of the peak frequency information D14 output from the peak position search section 40 to find out a lower position detection threshold D15. Also, as illustrated with an arrow in FIG. 18, the frequency of each class is determined sequentially from the distribution peak position to the smaller class side on the basis of the lower position detection threshold D15 to detect a class in which the frequency becomes equal to or smaller than the lower position detection threshold D15 for the first time. The peak neighborhood lower position detection section 41 outputs this detected class as a peak neighborhood lower position D16 together with the lower position detection threshold D15.

Figure 19:
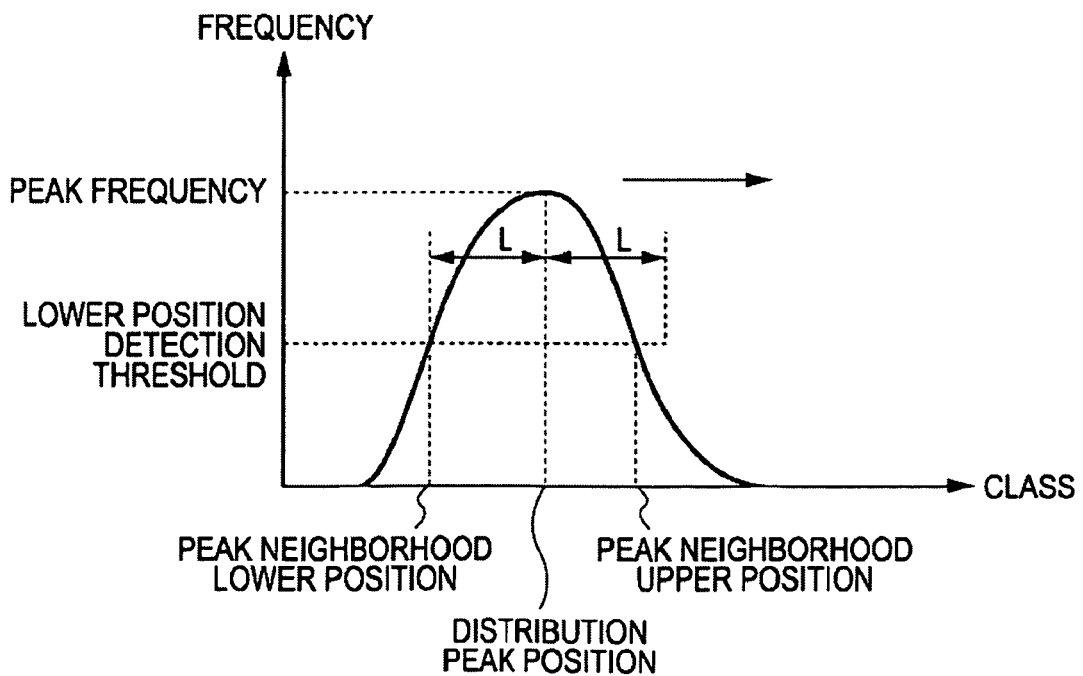
FIG. 19 is a characteristic curve diagram used for describing an operation of a peak neighborhood upper position detection section in the noise distribution characteristic amount calculation section of FIG. 17.
Figure 20:
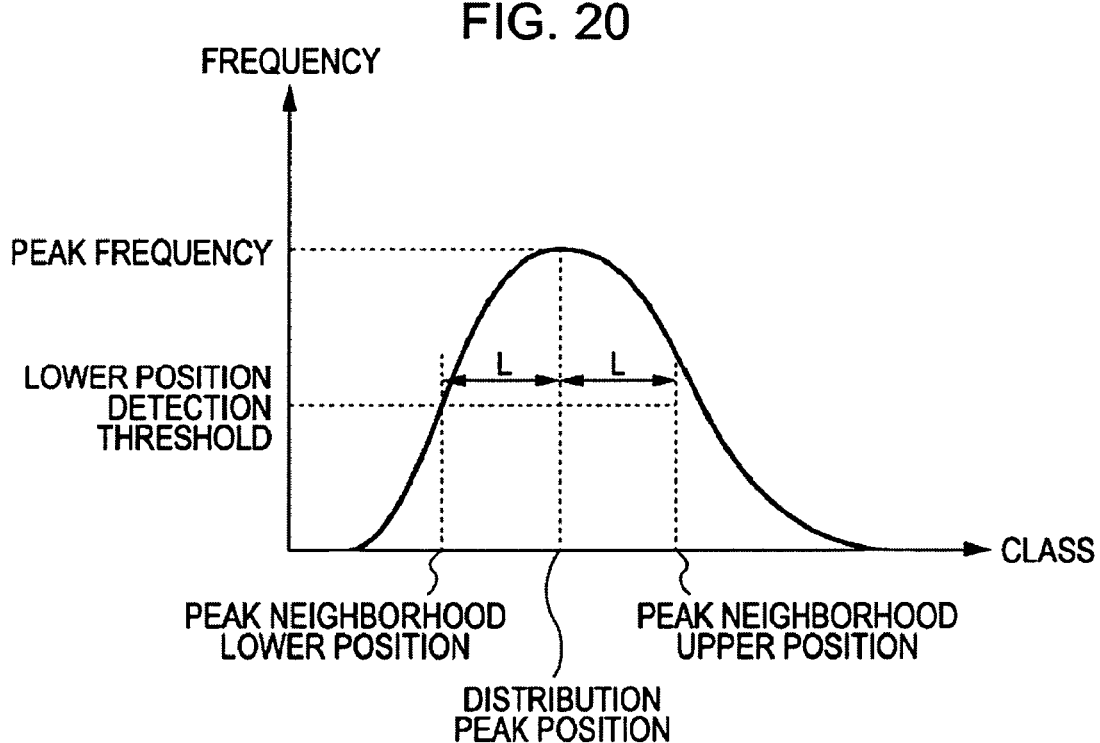
FIG. 20 is a characteristic curve diagram used for describing a peak neighborhood upper position.

A peak neighborhood upper position detection section 42 is adapted to determine the frequency of each class sequentially from the distribution peak position to the larger class side on the basis of the lower position detection threshold D15 as illustrated with an arrow in FIG. 19 in contrast to the peak neighborhood lower position detection section 41 to detect a class in which the frequency becomes equal to or smaller than the lower position detection threshold D15 for the first time. Herein, when the number of classes from the distribution peak position to the peak neighborhood lower position is set as a value L, the peak neighborhood upper position detection section 42 executes the detection processing on the class larger side in a range from the distribution peak position by the number of classes L. As illustrated in FIG. 20, in a case where the class in which the frequency becomes equal to or smaller than the lower position detection threshold D15 may be hard to be detected in the range of the number of classes L, a class on the side where the class becomes larger from the distribution peak position by the number of classes L is detected. The peak neighborhood upper position detection section 42 outputs this detected class as a peak neighborhood upper position D17. Hereinafter, the classes respectively detected in the peak neighborhood lower position detection section 41 and the peak neighborhood upper position detection section 42 are referred to as peak neighborhood lower position and peak neighborhood upper position.

Figure 21:
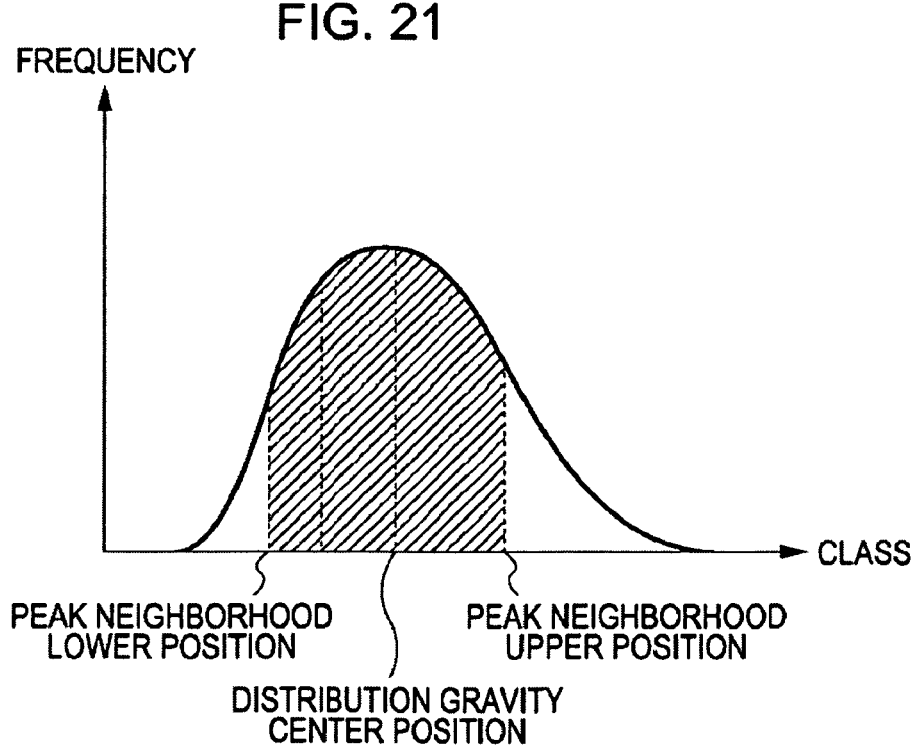
FIG. 21 is a characteristic curve diagram used for describing an operation of a peak neighborhood gravity center position calculation section in the noise distribution characteristic amount calculation section of FIG. 17.

A peak neighborhood gravity center position calculation section 43 is adapted to weighted-average the values of classes existing between the peak neighborhood lower position and the peak neighborhood upper position respectively by the frequencies on the basis of the distribution information D13 of the histogram, the peak neighborhood lower position D16, and the peak neighborhood upper position D17 as illustrated with a hatching in FIG. 21, and find out a class of a distribution gravity center position of the histogram between the peak neighborhood lower position and the peak neighborhood upper position. The peak neighborhood gravity center position calculation section 43 outputs this class of the distribution gravity center position as peak neighborhood gravity center position information D18. Herein, the peak neighborhood gravity center position information D13 indicates the noise level of the input video signal S1, and is hereinafter appropriately also referred to as noise level information.

Figure 22:
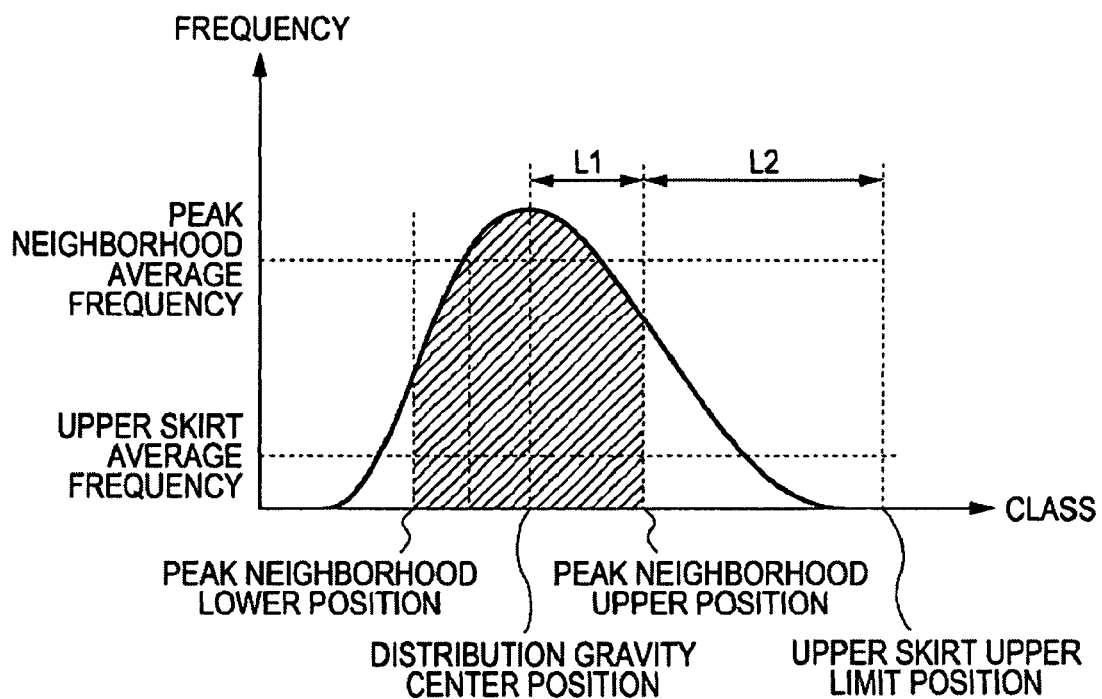
FIG. 22 is a characteristic curve diagram used for describing an operation of a distribution steepness degree calculation section in the noise distribution characteristic amount calculation section of FIG. 17.

A distribution steepness degree calculation section 44 is adapted to detect a distribution steepness degree indicating a degree of concentration of the distribution in the histogram. That is, as illustrated in FIG. 22, on the basis of the processing results in the peak neighborhood lower position detection section 41, the peak neighborhood upper position detection section 42, and the like, the distribution steepness degree calculation section 44 calculates an average frequency of the classes existing between the peak neighborhood lower position and the peak neighborhood upper position D17 (hereinafter referred to as peak neighborhood average frequency). In addition, the distribution steepness degree calculation section 44 finds out an upper neighborhood distance L1 which is the number of classes between the class position of the distribution gravity center position and the peak neighborhood upper position and also finds out the number of classes L2 obtained by multiplying the upper neighborhood distance L1 by a predetermined coefficient. The distribution steepness degree calculation section 44 sets a position where the class is on a larger side from the peak neighborhood upper position by the number of classes L2 as an upper skirt upper limit position and calculates an average frequency of classes existing between the peak neighborhood upper position and the upper skirt upper limit position (hereinafter referred to as upper skirt average frequency).

The distribution steepness degree calculation section 44 calculates a ratio between the peak neighborhood average frequency and the upper skirt average frequency. Herein, as the peak of the histogram is steeper, the peak neighborhood average frequency becomes larger with respect to the upper skirt average frequency. The ratio between the peak neighborhood average frequency and the upper skirt average frequency indicates a steepness degree of the peak in the histogram. The distribution steepness degree calculation section 44 outputs this ratio as the distribution steepness degree D5.

Figure 23:
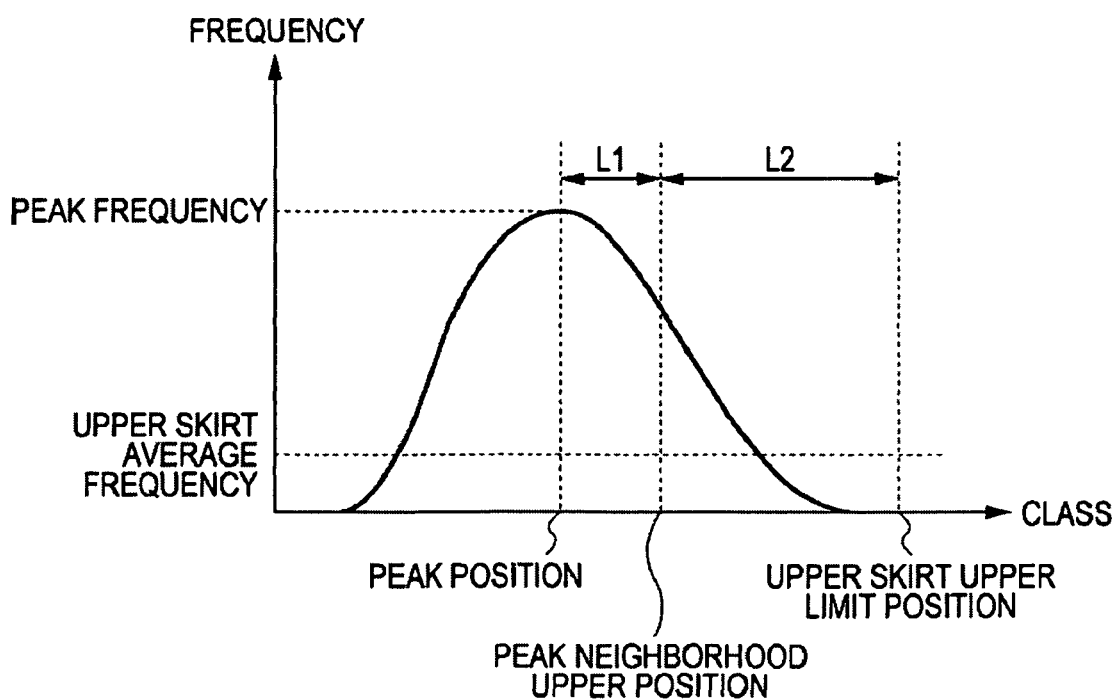
FIG. 23 is a characteristic curve diagram used for describing another distribution steepness degree detection technique.
Figure 24:
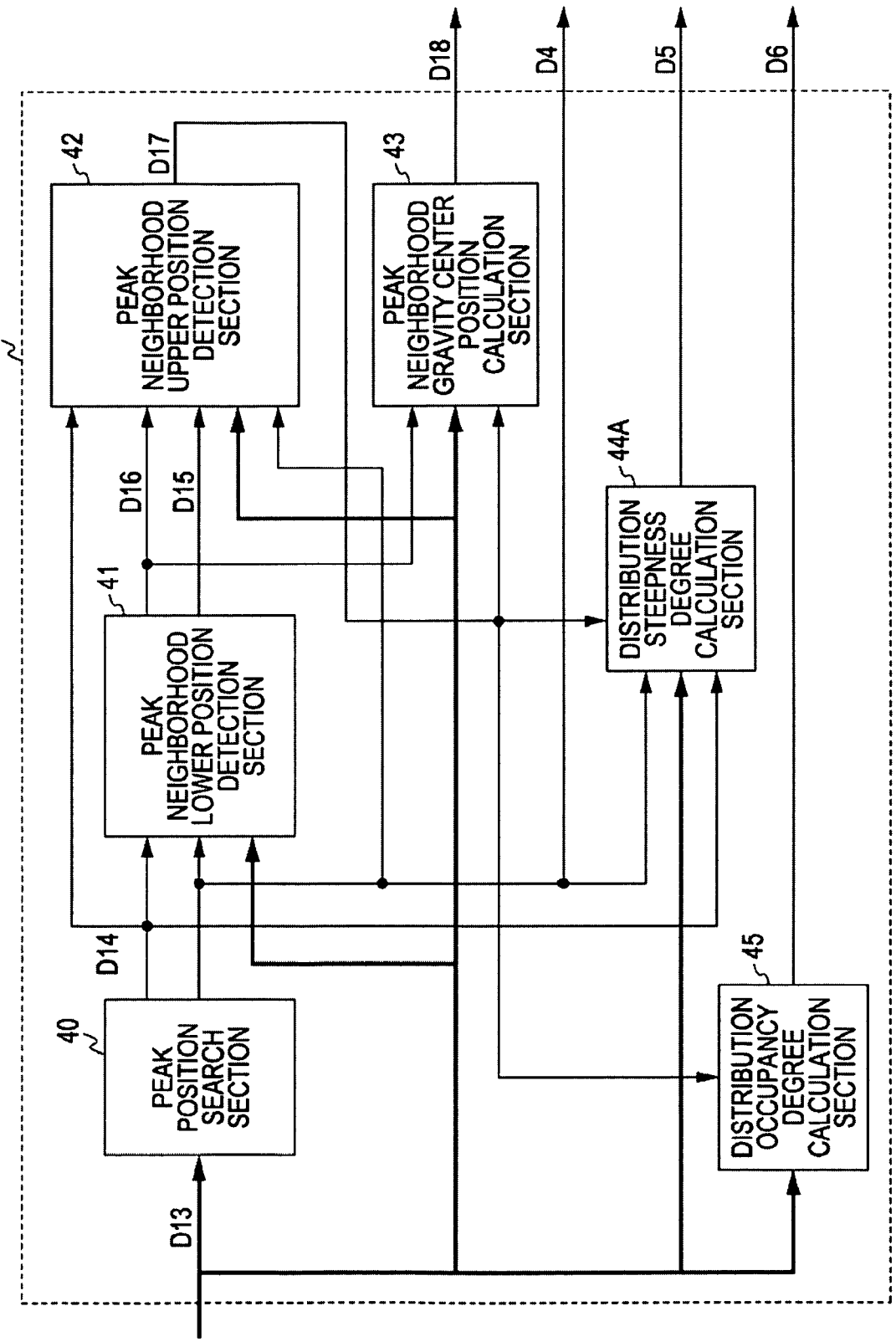
FIG. 24 is a block diagram of another noise distribution characteristic amount calculation section of FIG. 17.

It should be noted that in comparison with FIG. 22, as illustrated in FIG. 23, instead of the number of classes L1 between the class position of the distribution gravity center and the peak neighborhood upper position, the number of classes L1 from the distribution peak position to the peak neighborhood upper position may be applied to calculate the distribution steepness degree D5. Also, instead of the peak neighborhood average frequency, the frequency at the distribution peak position may be applied to calculate the distribution steepness degree D5. It should be noted that in this case, in comparison with FIG. 17, as illustrated in FIG. 24, the noise distribution characteristic amount calculation section 38A is configured by applying the distribution steepness degree calculation section 44 instead of the distribution steepness degree calculation section 44A which calculates the distribution steepness degree D5 by using the peak neighborhood average frequency. It should be noted that a so-called spinous degree may be applied for the steepness degree.

Figure 25:
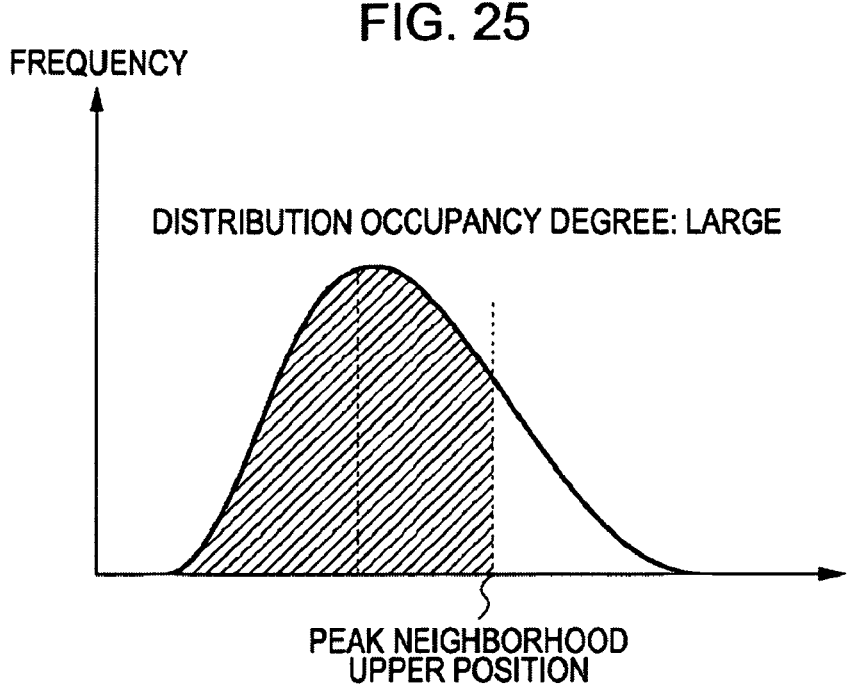
FIG. 25 is a characteristic curve diagram used for describing an operation of a distribution occupancy degree calculation section in the noise distribution characteristic amount calculation section FIG. 17.
Figure 26:
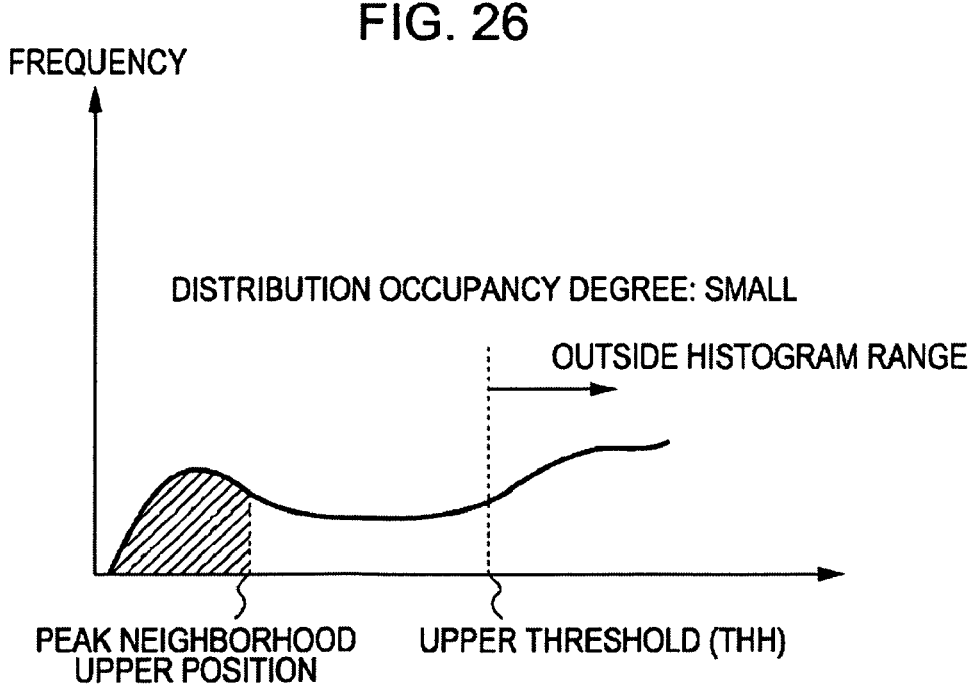
FIG. 26 is a characteristic curve diagram used for describing a characteristic amount which is not included in a histogram.

A distribution occupancy degree calculation section 45 (FIG. 17) is adapted to count the total frequency of all the classes equal to or smaller than the peak neighborhood upper position as illustrated with a hatching in FIG. 25 and set a distribution occupancy degree D6 so that the value is increased as the count value is increased. Herein, in a case where the motion difference component, the non-flat signal component (the edge or the texture), the saturated area component, and the like are included in the input video signal S1, as illustrated in FIG. 26, these components are out of the range between the upper limit threshold THH and the lower limit threshold THL and is not included in the histogram. However, these components are included in the range between the upper limit threshold THH and the lower limit threshold THL in some cases and may configure the histogram. In this case, such a component is often classified into a class outside of the peak neighborhood upper position, and as a result, in this case, the distribution occupancy degree D6 is small. As a result, the distribution occupancy degree calculation section 45 detects the degree of concentration of the frequency in the histogram to output the distribution occupancy degree D6.

The noise distribution characteristic amount calculation section 38 (FIG. 10) outputs the distribution peak position D4, the distribution steepness degree D5, and the distribution occupancy degree D6 as the parameters which feature the shape of the histogram. On the basis of the peak neighborhood gravity center position information D18, the noise level calculation section 39 converts a class in the distribution center which is grasped in the vicinity of the distribution peak position into a value equivalent to a standard deviation of the noise components to calculate a noise level D3 and output the noise level D3. In this processing, the noise level calculation section 39 compensates and outputs the noise level D3 in accordance with the lower limit threshold THL, the histogram class D11, and the index used as the activity.

Figure 27:
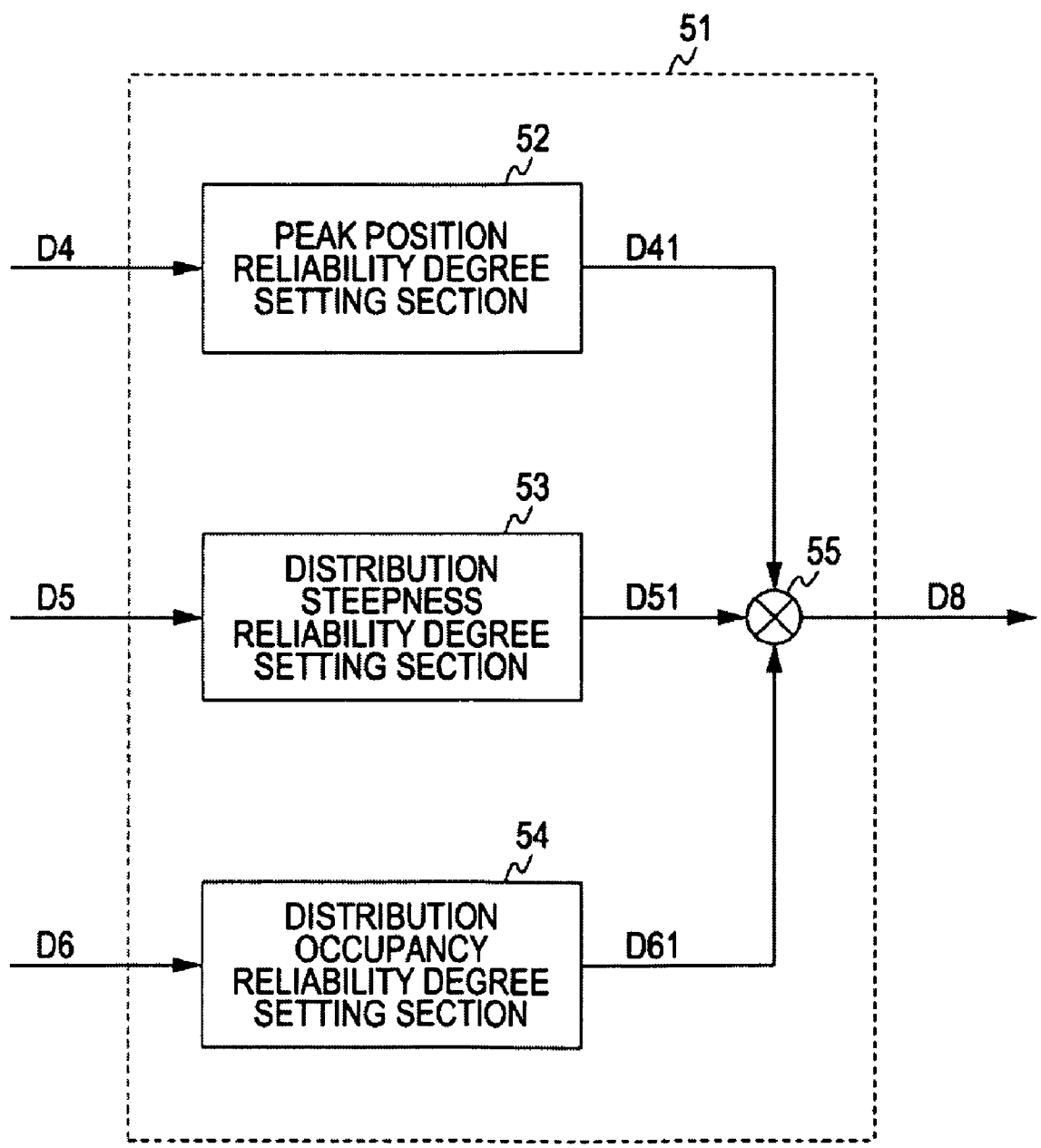
FIG. 27 is a characteristic curve diagram used for describing a distribution reliability degree setting processing section in the noise level measurement section of FIG. 15.
Figure 28:
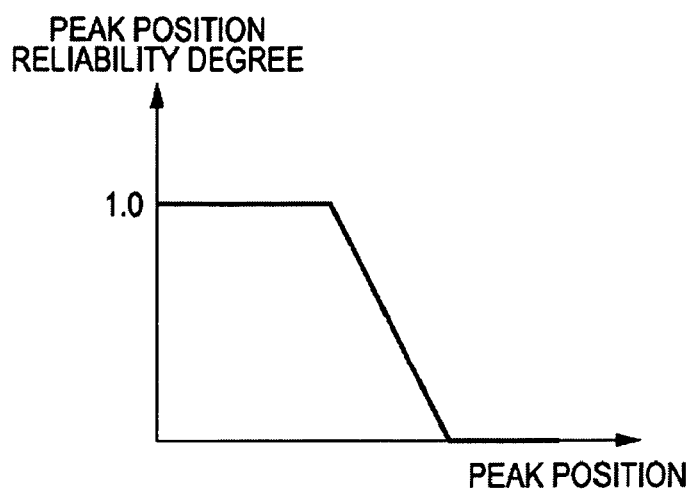
FIG. 28 is a characteristic curve diagram used for describing an operation of a peak position reliability degree setting section in the distribution reliability degree setting processing section of the FIG. 27.

A distribution reliability degree setting section 51 (FIG. 15) is adapted to calculate a reliability degree D8 indicating a certainty of the noise level D3 on the basis of the distribution peak position D4, the distribution steepness degree D5, and the distribution occupancy degree D6. FIG. 27 is a block diagram of the distribution reliability degree setting section 51. In the distribution reliability degree setting section 51, a peak position reliability degree setting section 52 is adapted to generate a reliability degree D41 indicating a certainty of the noise level D3 on the basis of the distribution peak position so that the value becomes smaller as the class at the distribution peak position of the histogram is increased. That is, the distribution peak position is excessively shifted to the larger class side, it can be determined that the peak is significantly influenced by the motion difference component or the non-flat signal component such as the edge or the texture. As a result, as illustrated in FIG. 28, the peak position reliability degree setting section 52 generates the reliability degree D41 while the values on the large side and the small side are set as 0 and 1 respectively as being the saturated characteristics such that the value is decreased in accordance with the distribution peak position D4.

Figure 29:
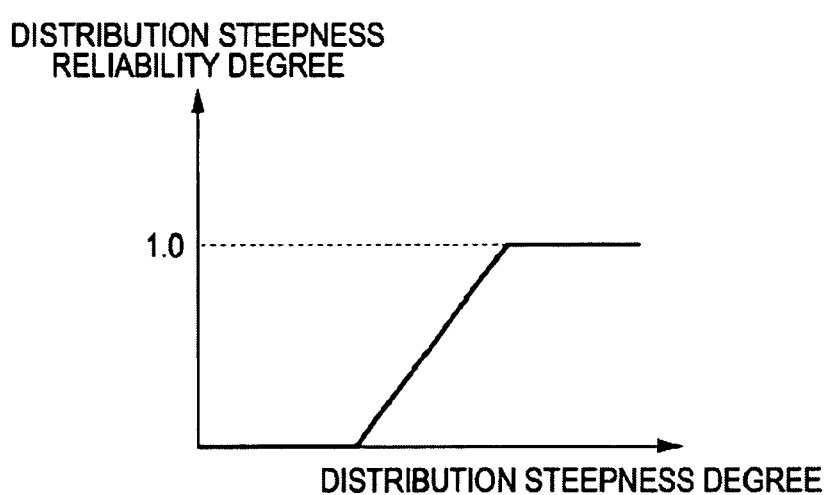
FIG. 29 is a characteristic curve diagram used for describing an operation of a distribution steepness reliability degree setting section in the distribution reliability degree setting processing section of FIG. 27.

A distribution steepness reliability degree setting section 53 is adapted to generate a reliability degree D51 indicating a certainty of the noise level D3 on the basis of the steepness degree such that the value becomes larger as the distribution in the histogram is concentrated in the distribution peak position while the steepness degree is decreased. That is, in this case, as illustrated in FIG. 29, the distribution steepness reliability degree setting section 53 generates the reliability degree D51 in which the values on the large side and the small side are set as 1 and 0 respectively as being the saturated characteristics such that the value is increased in accordance with the steepness degree D5.

Figure 30:
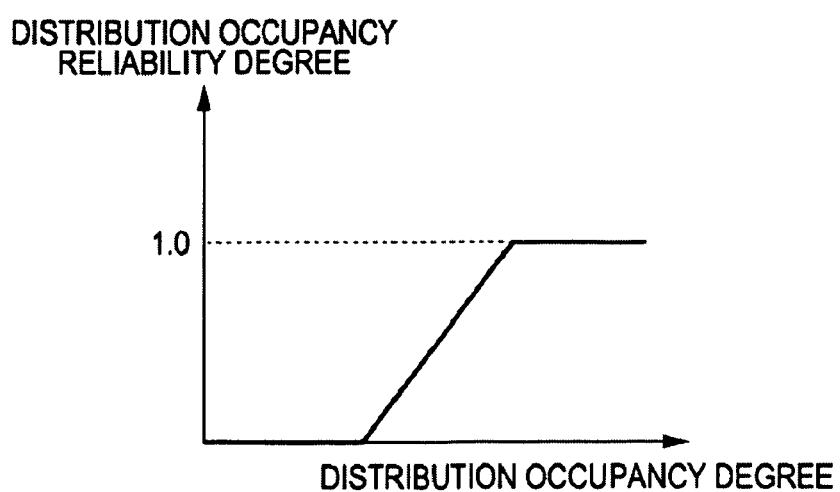
FIG. 30 is a characteristic curve diagram used for describing an operation of a distribution occupancy reliability degree setting section in the distribution reliability degree setting processing section of FIG. 27.

A distribution occupancy reliability degree setting section 54 is adapted to generate a reliability degree D61 indicating a certainty of the noise level D3 on the basis of the distribution occupancy degree D6 which is grasped by the number of the total frequencies equal to or smaller than the peak neighborhood upper position. That is, in this case, as illustrated in FIG. 30, the distribution occupancy reliability degree setting section 54 generates the reliability degree D61 in which the values on the large side and the small side are set as 1 and 0 respectively as being the saturated characteristics such that the value is increased in accordance with the distribution occupancy degree D6.

A multiplication circuit 55 is adapted to multiply the reliability degrees D41, D51, and D61 to output the total reliability degree D8. It should be noted that for a calculation method for the total reliability degree D8, various integration methods such as a weighted average of the reliability degrees D41, D51, and D61 and a computation based on a predetermined function while the reliability degrees D41, D51, and D61 are used as inputs can be applied. It should be noted that as a result, according to this embodiment, the reliability degree D8 indicating the certainty of the noise level D3 which indicates the noise level is generated in accordance with the steepness degree, the shape of the histogram represented by the distribution occupancy degree, and the distribution peak position. The reliability degree can be set on the basis of various parameters representing the distribution shape of the histogram, the total frequency, the gravity center position, and the like other than the steepness degree and the distribution occupancy degree, and also be set by using any one or combination of the above-mentioned parameters and the like.

A time smoothing section 59 is adapted to process the noise level D3 which is output from the in-plane characteristic amount statistical processing section 35 on the basis of the reliability degree D8 to carry out a smoothing processing and calculate and output the noise measurement result S7. Also, the reliability degree D8 is subjected to the smoothing processing to calculate a reliability degree D7 and output the reliability degree D7. In this smoothing processing, the time smoothing section 59 controls the filter characteristic related to the noise measurement result S7 and the smoothing processing on the reliability degree D7 so that a passing band is decreased as the reliability degree D7 is decreased.

Figure 31:
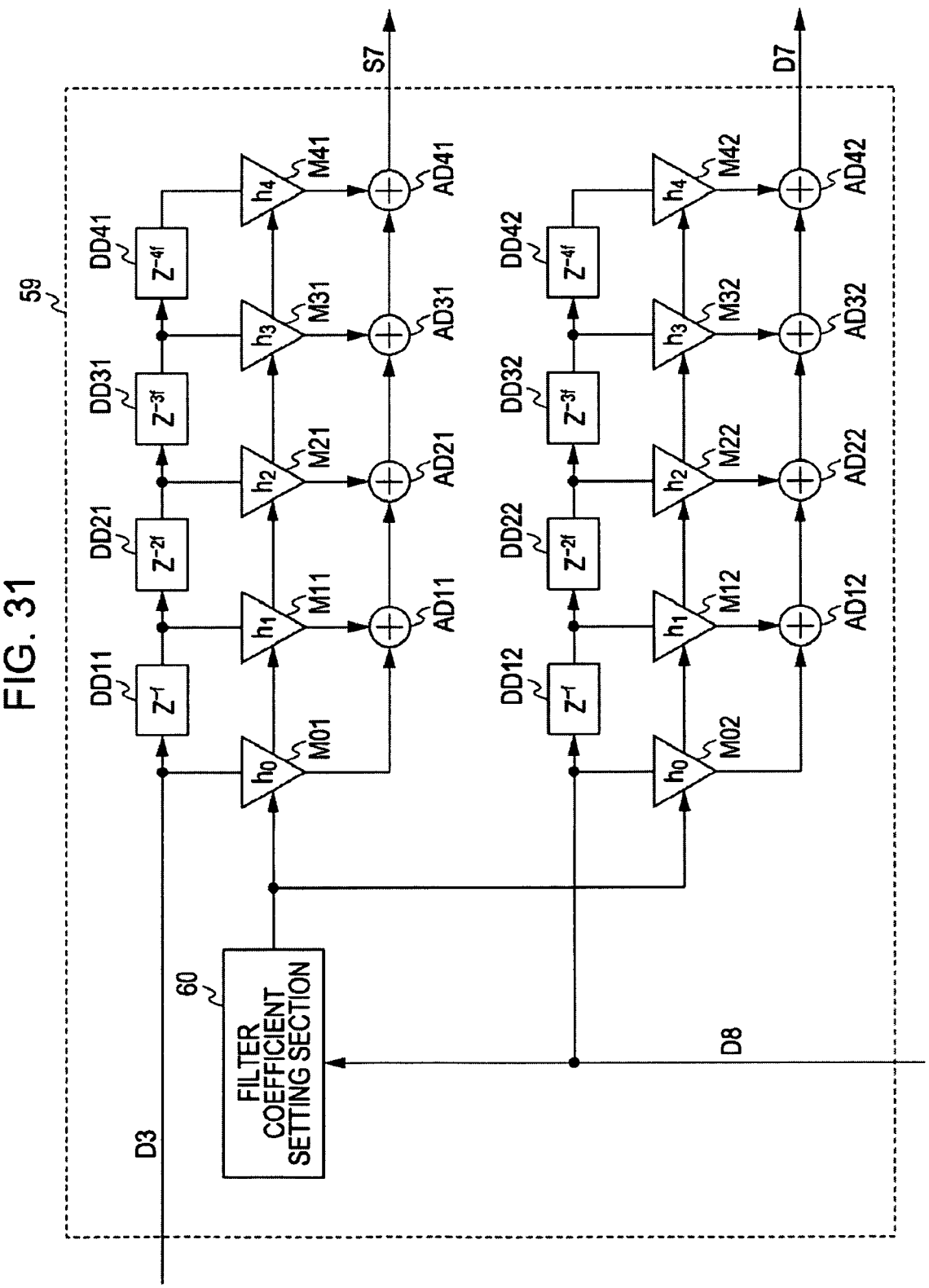
FIG. 31 is a block diagram of a time smoothing section in the noise level measurement section FIG. 15.

Herein, FIG. 31 is a block diagram of the time smoothing section 59 when configured of an FIR low-pass filter. The time smoothing section 59 sequentially delays the noise levels D3 with delay circuits DD11 to DD41 to carry out the smoothing processing on the noise level D3 while the outputs of the noise level D3 and the delay circuits DD11 to DD41 are weighting-added on the basis of multiplication circuits M01 to M41 and addition circuits AD11 to AD41. Also, with a filter coefficient setting section 60, a weighting coefficient for the delay circuits DD11 to DD41 is controlled so that a weighting coefficient of the multiplication circuit M01 for multiplying the noise level D3 is increased with respect to other multiplication circuits M11 to M41 as the reliability degree D8 is increased.

In addition, the reliability degrees D8 are sequentially delayed with delay circuits DD12 to DD42. The outputs of the reliability degree D8 and the delay circuits DD12 to DD42 are weighting-added on the basis of multiplication circuits M02 to M42 and addition circuits AD12 to AD42 to smooth the reliability degree D8. In addition, with the filter coefficient setting section 60, similarly to the processing on the noise level D3, weighting coefficients of the multiplication circuits M02 to M42 are controlled.

Figure 32:
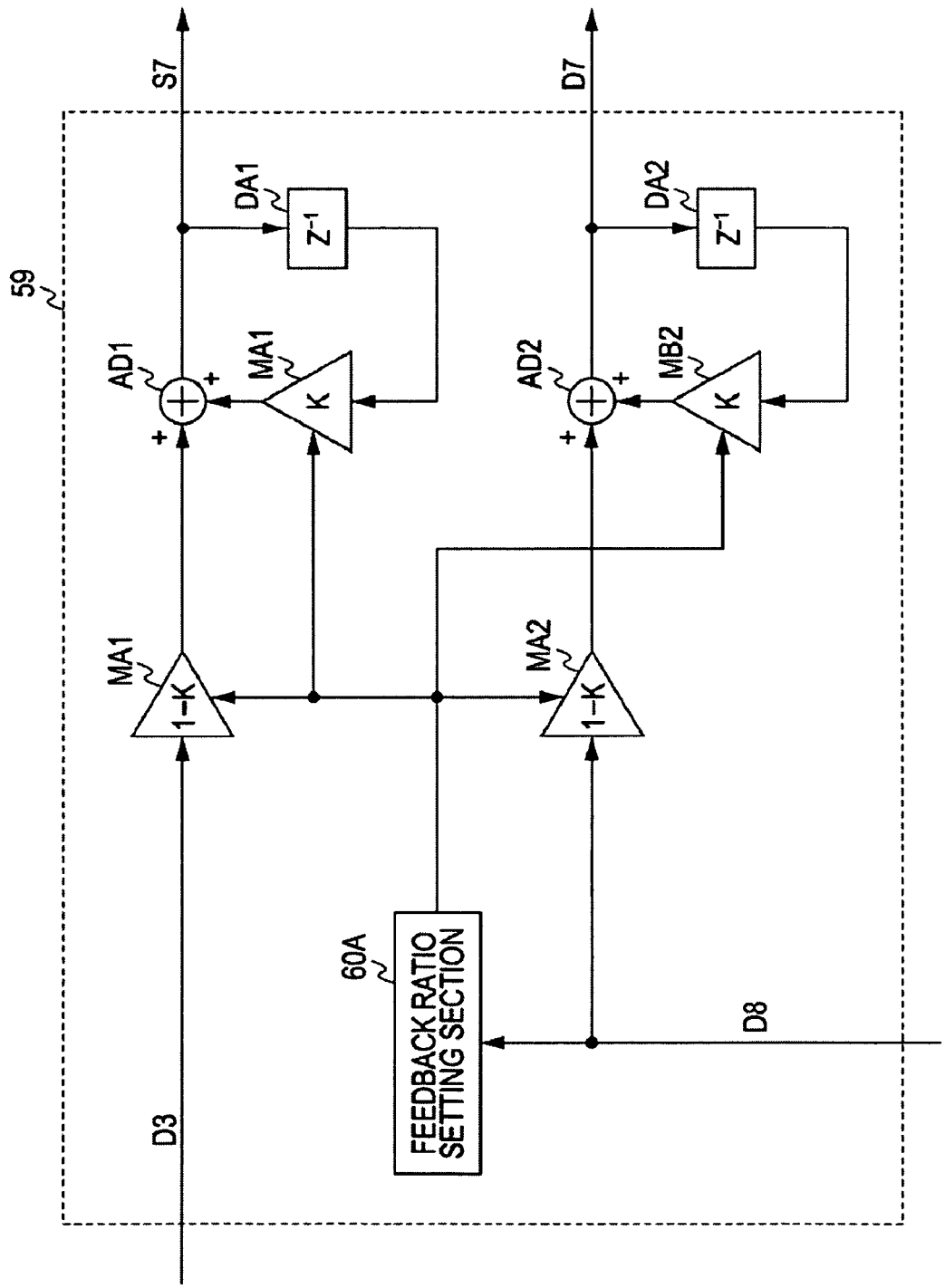
FIG. 32 is a block diagram of a time smoothing section which is a different example from FIG. 31.

In contrast to this, FIG. 32 is a block diagram of the time smoothing section 59 when configured of a cyclic IIR low-pass filter. The time smoothing section 59 delays the measurement result S7 with a delay circuit DA1, and this delayed measurement result S7 and the noise levels D3 sequentially input are weighting-added on the basis of multiplication circuits MA1 and MB1 and the additional circuit. Also, with a feedback ratio setting section 60A, a feedback ratio is decreased by increasing the weighting coefficient on the noise level D3 while the reliability degree D8 is increased.

In addition, the reliability degree D7 output from the time smoothing section 59 is delayed by a delay circuit DA2. This delayed reliability degree D7 and the sequentially input reliability degrees D8 are weighting-added on the basis of multiplication circuits MA2 and MB2 and an addition circuit AD2. In addition, with the feedback ratio setting section 60A, similarly to the processing on the noise level D3, as the reliability degree D8 is increased, the weighting coefficient on the reliability degree D8 side is increased.

It should be noted that with the above-mentioned configurations according to this embodiment, the class of the gravity center position in the histogram is set as the noise level measurement result S7, but when necessary, instead of this, an intermediate value, an average value, a peak value, or the like of the histogram may be set as the noise level measurement result S7.

(2) Operation of the Embodiment

In the above-mentioned configurations, the difference signal is generated between the input video signal S1 (FIG. 1) and the delay signal S3 of the output video signal S2, and the noise signal component S4 is detected. The signal level of the noise signal component S4 is compensated on the basis of the compensation signal S5 by the measurement section 6 due to the noise measurement result S7. Regarding the input video signal S1, the compensation signal S5 is subtracted to suppress the noise level and output by the output video signal S2. As a result, in the noise filter 1, the noise level is measured with a satisfactory accuracy by the measurement section 6, and the noise can be suppressed. In a case where the accuracy of the noise measurement result S7 by the measurement section 6 is low, it is difficult to sufficiently suppress the noise.

In view of the above, according to this embodiment (FIG. 2), in the measurement availability in-plane characteristic amount detection section 18 of the measurement section 6, a plurality of areas are set in one screen of the input video signal S1, and for each area, the characteristic amount which is the index of the noise level is detected on the basis of the activity S1A. Also, on the basis of the activity S1A, the histogram is created in the noise level measurement section 19, and the noise level S7 is detected by analyzing the histogram.

However, among the characteristic amounts detected in this manner, there are characteristic amounts detected from areas which are not suitable to the noise level measurement, and as a result, the accuracy of the noise level S7 is degraded. In view of the above, according to this embodiment, in the measurement availability in-plane characteristic amount detection section 18, the characteristic amounts suitable to the noise level measurement are detected from the detected characteristic amounts, and the characteristic amounts suitable to the noise level measurement are used to create the histogram.

As a result, in the noise filter 1, the influence of the motion difference component or the non-flat signal component such as the edge or the texture included in the input video signal to the measurement result is reduced, and it is possible to measure the noise level with a further improved accuracy as compared with related art.

Figure 33:
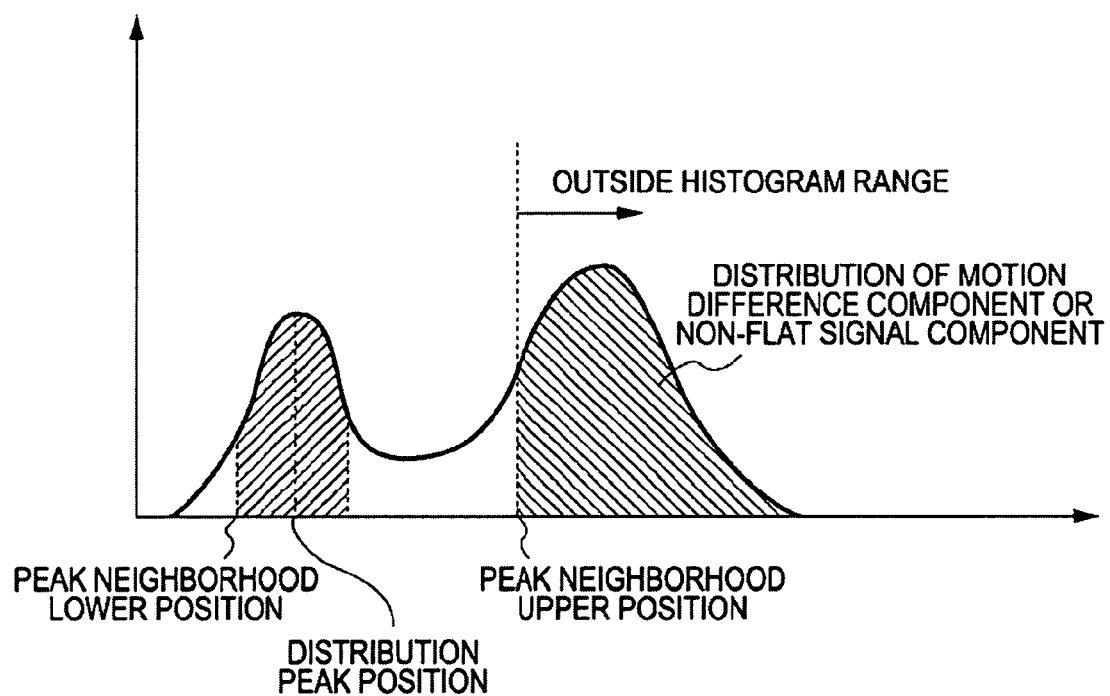
FIG. 33 is a characteristic curve diagram used for describing an operation of the noise measurement section of FIG. 2.

That is, as illustrated in FIG. 33, in a case where the histogram is created by using all the characteristic amounts without any limitation, the motion component, the non-flat signal component, or the like is mixed and the accuracy of the noise level measurement result obtained by analyzing the histogram on the basis of these components is degraded. However, when the characteristic amounts suitable to the noise level measurement are detected and the characteristic amounts suitable to the noise level measurement are used to create the histogram, the component causing the degradation of the measurement accuracy can be avoided from being used for creating the histogram as being outside of the histogram. As a result, the influence of the motion difference component, the non-flat signal component such as the edge or the texture, or the like to the measurement result is reduced, and it is possible to measure the noise level with a further improved accuracy as compared with related art.

As a result, in the noise filter 1, the input video signal S1 is delayed by the period of the one field or the one frame in the reference video signal generation section 11 to generate the reference video signal S11 (FIGS. 3 and 4) and in the difference signal generation section 16, between the reference video signal S11, the difference signal S16 is generated (FIG. 5). In addition, in the partial area signal division section 20 of the measurement availability in-plane characteristic amount detection section 18 (FIG. 6), for each area, after the input video signal S1, the reference video signal S11, and the difference signal S16 set to the input video signal S1 are divided (FIG. 7), subsequently, in the pixel area characteristic amount extraction section 21, for each area, the activities S1A, S11A, and S16A which are the characteristic amounts of the input video signal S1, the reference video signal S11, and the difference signal S16 are respectively detected.

With this configuration, in the noise filter 1, for each area, the characteristic amounts of the three types generated on the basis of the input video signal S1, the reference video signal S11, and the difference signal S16 are detected. From the characteristic amounts of the three types, the characteristic amounts suitable to the noise measurement are selected to create the histogram. The noise levels in both the in-plane direction and the time axis direction are detected in a comprehensive manner, and it is possible to therefore improve the detection accuracy for the noise level. Also, even in a case where the histogram is created by excluding the characteristic amounts which are not suitable to the noise detection, the number of characteristic amounts used for creating the histogram can be sufficiently ensured, and with this configuration as well, it is possible to detect the noise level with a satisfactory accuracy.

In the noise filter 1, in the pixel area characteristic amount extraction section 21, for each area, the average values S1PAve and S11PAve of the pixel values in the input video signal S1 and the reference video signal S11 are found out, and in the saturated area detection section 22, the average values S1PAve and S11PAve are determined on the basis of the thresholds Smin_Th and S_max_Th to detect the saturated area. Also, with the detection result, in order that the characteristic amounts determined as the saturated areas are excluded from the creation targets of the histogram, the measurement availability determination section 24 sets the measurement availability identification flags S1F, S11F, and S16F. As a result, in the noise filter 1, the areas where it is difficult to appropriately measure the noise level due to the saturation of the pixel value are excluded from the creation targets of the histogram, and it is possible to detect the noise level with a satisfactory accuracy.

In addition, regarding the input video signal S1, in the noise free area detection section 23, the activities S1A, S11A, and S16A of the input video signal S1, the reference video signal S11, and the difference signal S16 are determined on the basis of the predetermined thresholds INF_Th and PNF_Th, and as a result, it is possible to detect the noise free area which can be regarded as an area of a graphical user interface such as a television receiver or an optical disk recorder or an area where caption information or the like inserted during an editorial procedure is displayed. Also, with the detection result, in order that the characteristic amounts determined as the noise free areas are excluded from the creation targets of the histogram, the measurement availability determination section 24 sets the measurement availability identification flags S1F, S11F, and S16F. As a result, in the noise filter 1, the areas where it is difficult to appropriately measure the noise level due to the insertion of the caption information or the like are excluded from the creation targets of the histogram. With this configuration as well, it is possible to detect the noise level with a satisfactory accuracy.

Also, furthermore, in the noise filter 1, in the measurement inability area determination section 27 of the measurement availability determination section 24 (FIG. 9), the measurement inability area determination flags S1NF, S11NF, and S16NF are set so as to exclude areas other than the saturated area and the noise free area. In the representative characteristic amount setting section 29, on the basis of the measurement inability area determination flags S1NF, S11NF, and S16NF, the statistical processing is performed for each area on the activities S1A, S11A, and S16A other than the saturated area and the noise free area. The representative characteristic amount Act representing each area is detected.

In addition, in the threshold setting section 31, with the representative characteristic amount Act, the upper limit threshold THH and the lower limit threshold THL are set. In the statistical processing target selection section 32, the activities S1A, S11A, and S16A are determined on the basis of the thresholds THH and THL. The measurement availability identification flags S1F, S11F, and S16F are set so as to exclude the areas outside the range between the upper limit threshold THH and the lower limit threshold THL from the histogram creation targets. As a result, in the noise filter 1, it is possible to create the histogram while mixing of the motion difference component or the non-flat signal component is prevented as much as possible, and it is possible to therefore improve the detection accuracy for the noise level.

In addition, the representative characteristic amount time smoothing section 30 smoothes the representative characteristic amount Act which is output from the representative characteristic amount setting section 29 to set the thresholds THH and THL, or smoothes the thresholds THH and THL to determine the activities S1A, S11A, and S16A, whereby it is possible to prevent the degradation of the detection accuracy due to the fluctuation of the thresholds THH and THL. As a result, the video signal processing apparatus effectively avoids the sudden time fluctuation due to a scene change, and it is possible to therefore improve the detection accuracy for the noise level. In particular, by applying the smoothing processing to an order statistical filter such as a median filter, in order that, for example, the minimum value is not output, the sudden time fluctuation due to the repetition of the same frame is effectively avoided in the processing on the input video signal S1 based on the 2-3 pull down system, and it is possible to therefore improve the detection accuracy for the noise level.

In the noise filter 1, the representative characteristic amount Act is generated by using the minimum value (FIG. 10), the average value (FIG. 11), the intermediate value (FIG. 12), or the variance value in units of the field or units of the frame of the activities S1A, S11A, and S16A which are the plural types of characteristic amounts based on the input video signal S1, the reference video signal S11, and the difference signal S16, or the synthesis value of these values (FIG. 13), and as a result, it is possible to detect the noise level on the basis of a desired characteristic when necessary.

In the noise filter 1, in the in-plane characteristic amount statistical processing section 35 of the noise level measurement section 19 (FIG. 2, FIG. 15), in order that the noise free area, the saturated area, and the areas outside the range between the upper limit threshold THH and the lower limit threshold THL are excluded on the basis of the measurement availability identification flags S1F, S11F, and S16F, the histogram is created on the basis of the activities S1A, S11A, and S16A, and the noise level S7 is measured through the analysis of the histogram.

That is, in the histogram generation section 37 of the in-plane characteristic amount statistical processing section 35 (FIGS. 2 and 16), in order that the noise free area, the saturated area, and the areas outside the range between the upper limit threshold THH and the lower limit threshold THL are excluded, the histogram is created on the basis of the activities S1A, S11A, and S16A. Subsequently in the noise distribution characteristic amount calculation section 38, the histogram is analyzed to detect the peak neighborhood gravity center position information D18 indicating the noise level. In the noise filter 1, the information D18 indicating the noise level is detected on the basis of the gravity center value of the histogram, or the intermediate value, the average value, the peak value, or the like, of the histogram, and as a result, the detection accuracy for the noise level can be improved as compared with related art.

In particular, in a case where the information D18 indicating the noise level is detected on the basis of the gravity center value of the histogram, while the fluctuation of the noise level measurement result due to the peak time fluctuation is prevented, the influence of the motion component to the detection result can be effectively avoided, and as a result, it is possible to stably detect the noise level and improve the accuracy.

In the detection of the information D18 indicating the noise level (FIG. 17), first, in the peak position search section 40, the peak position of the histogram is detected (FIG. 18). In addition, in the peak neighborhood lower position detection section 41, the lower position detection threshold D15 is set while the frequency of the peak position is used as a reference. In a direction in which the class is decreased from the peak position of the histogram, the first class which is equal to or smaller than the lower position detection threshold D15 is detected and the peak neighborhood lower position D16 is detected (FIG. 18). In addition, in the peak neighborhood upper position detection section 42, in a range which is equal to the distance L of the class from the distribution peak position to the peak neighborhood lower position D16, in a direction in which the class is increased from the distribution peak position, the first class which is equal to or lower than the lower position detection threshold D15 is detected and the peak neighborhood upper position D17 is detected (FIGS. 19 and 20).

In the noise filter 1, on the basis of the peak position neighborhood distribution in the range from the peak neighborhood lower position D16 to the peak neighborhood upper position D17, the information D18 indicating the noise level is detected (FIG. 21). As a result, in the noise filter 1, the detection range is set on the basis of the shape of the histogram to detect the information D18 indicating the noise level. It is possible to create the histogram while the mixing of the motion difference component or the non-flat signal component is prevented furthermore as much as possible, and it is possible to therefore improve the detection accuracy for the noise level.

Figure 34:
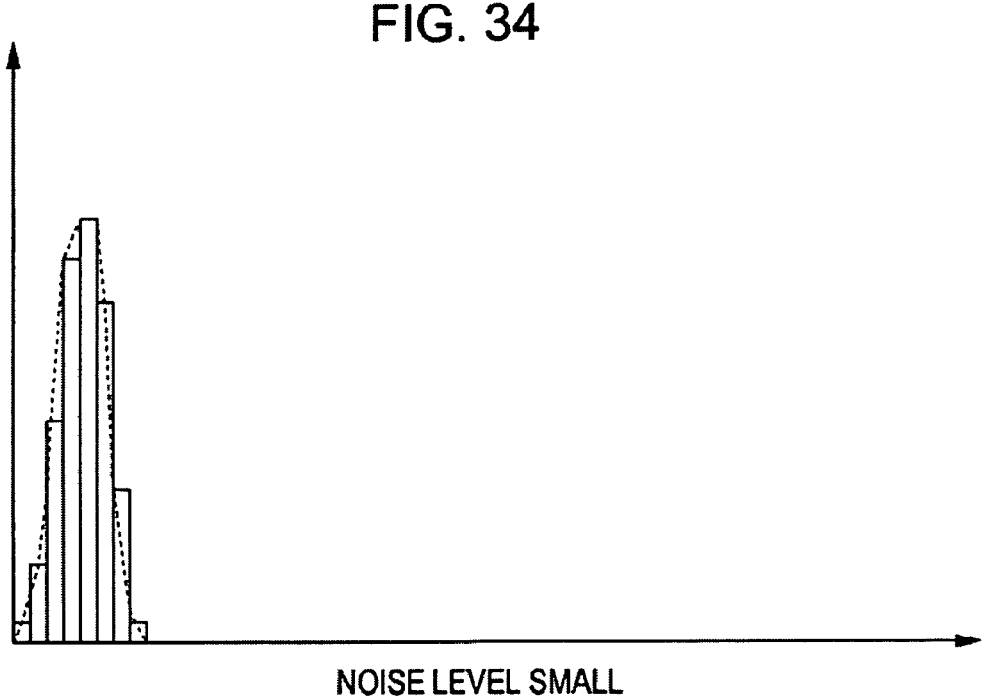
FIG. 34 is a characteristic curve diagram of a histogram in a case where a variation amount of characteristic amounts is small.
Figure 35:
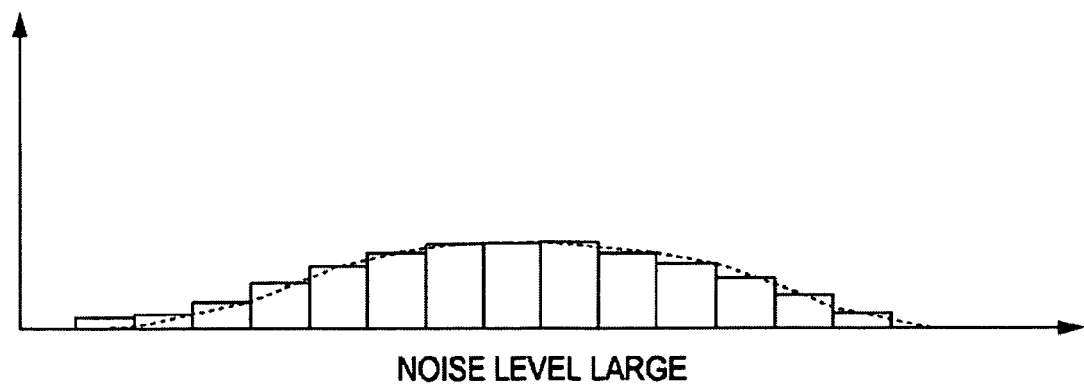
FIG. 35 is a characteristic curve diagram of a histogram in a case where a variation amount of characteristic amounts is large.

In addition, on creating the histogram and detecting the noise level in the above-mentioned manner, regarding the input video signal S1, in the histogram class width border value calculation section 36, the histogram class and the border value are set such that the range between the upper limit threshold THH and the lower limit threshold THL are equally divided by the previously set number of classes. As a result, in the noise filter 1, as illustrated in FIGS. 34 and 35, the histogram is created in such a manner that as the fluctuation width of the characteristic amount which is the dynamic range of the characteristic amount is increased, the histogram class becomes larger. As a result, in the video signal processing apparatus, the noise level is measured by varying the histogram class in accordance with the noise level so as to correspond to a visual characteristic of human beings, and it is possible to therefore improve the detection accuracy with the simple configuration.

That is, a perception characteristic of human beings to the noise is close to a characteristic of a Log scale applied to dB display of an s/n ratio. As a result, as in this embodiment, when the histogram class is varied in accordance with the noise level, as illustrated in FIG. 34, by setting the histogram class smaller as the noise level is smaller, the characteristic of the noise measurement result can be set close to the characteristic of the Log scale. Therefore, it is possible to detect the noise level measurement result while the noise level perceived as the human being watches the screen is appropriately reflected.

Also, through the detection of the noise level with the above-mentioned analysis of the histogram, the measurement accuracy can be determined on the basis of the size of the histogram class in the histogram. Therefore, when the histogram class is set small for the improvement of the detection accuracy, the number of classes is significantly increased, and as a result, the processing becomes cumbersome. Furthermore, there is a problem that the configuration becomes complicated. Also, in contrast to this, in order to simplify the configuration and the processing, when the histogram class is set large or the range of the processing target data is set small, the detection accuracy for the noise level is degraded. However, as in this embodiment, when the histogram class is varied in accordance with the noise level, it is possible to ensure the detection accuracy with the simple configuration.

Regarding the input video signal S1, in the peak position reliability degree setting section 52 (FIG. 27), the reliability degree D41 in which the value is decreased as the class at the distribution peak position is increased is detected (FIG. 28). In addition, in the distribution steepness degree calculation section 44 and the distribution occupancy degree calculation section 45, the steepness degree and the occupancy degree of the histogram are detected (FIGS. 17, 22, 23, 25, and 26). In the distribution steepness reliability degree setting section 53 and the distribution occupancy reliability degree setting section 54 (FIG. 27), the reliability degrees D51 and D61 in which the values are respectively increased as the steepness degree and the occupancy degree are increased are detected (FIGS. 29 and 30). In addition, the reliability degrees D41, D51, and D61 are integrated in the multiplication circuit 55 to detect the total reliability degree D8.

Regarding the input video signal S1, in the noise level calculation section 39, the information D18 indicating the noise level is converted into the noise level D3 (FIG. 16). As a result, in the noise filter 1, together with the noise level D3, the reliability degree D7 of the noise level D3 can be detected. In a case where various video signal processings such as a noise reduction processing are executed on the basis of the noise level D3, the processings are switched in a case of the high reliability degree and a case of the low reliability degree based on the reliability degree D7, the erroneous video signal processing due to the erroneous noise level measurement result can be effectively avoided, and the video signal can be appropriately processed.

That is, in the noise filter 1, the noise level D3 is smoothed in the time smoothing section 59 to obtain the measurement result S7 of the noise level (FIG. 15), and the feedback ratio in the noise reduction processing is varied in accordance with the measurement result S7. In this processing, by smoothing and outputting the noise level D3 in the time smoothing section 59, the fluctuation of the measurement result S7 is prevented and the input video signal S1 can be stably processed.

Also, in the smoothing processing, in accordance with the reliability degree D7, as the reliability degree is lower, the smoothing degree is increased so as to reflect the prior noise level D3 or the prior measurement result S7 on the measurement result S7 (FIGS. 31 and 32). As a result, while the noise level is stably measured, it is possible to sufficiently detect the fluctuation of the noise level, and the measurement result with the high reliability degree can be obtained.

In addition, in the noise filter 1, in conjunction with the smoothing processing of the noise level, the reliability degree D7 is also smoothed to be output. As a result, in accordance with the reliability degree D8, when the noise reduction processing or the like is executed in a case of the high reliability degree and the low reliability degree, the erroneous video signal processing can be effectively avoided.

To be more specific, in the noise filter 1 (FIG. 1), in accordance with the measurement result S7 of the noise level, so as to vary the feedback ratio in the noise reduction processing, this feedback ratio is varied in accordance with the reliability degree D8, and as a result, the erroneous video signal processing can be effectively avoided, and the video signal can be appropriately processed.

(3) Effect of the Embodiment

According to the above-mentioned configuration, the histogram is generated while the characteristic amount which is not suitable to the noise level measurement is excluded and this histogram is analyzed to measure the noise level so that the noise level can be measured with a further improved accuracy as compared with a case in related art.

In addition, by detecting the characteristic amount from at least one of the input video signal, the delay signal of the input video signal, the difference signal between the input video signal and the delay signal, it is possible to specifically detect the characteristic amount which is the index of the noise level of the input video signal.

In addition, through the determination on the signal level of the input video signal, the saturated areas which are not suitable to the noise level measurement are detected, and through the determination on the characteristic amount, the noise free areas not suitable to the noise level measurement are detected. By excluding the characteristic amounts of the saturated areas and the characteristic amounts of the noise free area which are not suitable to detect the characteristic amounts suitable to the noise level measurement, it is possible to prevent the decrease in the detection accuracy due to the characteristic amounts which are not suitable to the noise level measurement.

In addition, the representative characteristic amount which represents each area is set from the plurality of detected characteristic amounts. While this representative characteristic amount is used as a reference, the upper limit threshold and/or the lower limit threshold is set. By excluding the characteristic amounts equal to or larger than the upper limit threshold and/or the characteristic amounts equal to or smaller than the lower limit threshold, the characteristic amounts suitable to the noise level measurement are detected. Thus, the histogram can be created while the mixing of the motion difference component or the non-flat signal component is prevented as much as possible, and it is therefore possible to improve the detection accuracy for the noise level.

In addition, by smoothing this representative characteristic amount or the upper limit threshold and the lower limit threshold, the degradation of the detection accuracy due to the threshold fluctuation is prevented, and it is therefore possible to stably detect the noise level.

In addition, by executing the smoothing processing with the order statistical filter such as the median filter, the sudden time fluctuation due to the repetition of the same frame is effectively avoided in the processing on the input video signal based on the 2-3 pull down system, and it is therefore possible to improve the detection accuracy for the noise level.

In addition, by setting this representative characteristic amount on the basis of the minimum value, the average value, the intermediate value, or the variance value, or the synthesis value of at least two of the above-mentioned values, the representative characteristic amount is specifically detected so that the detection accuracy can be improved.

In addition, by detecting the intermediate value, the average value, the peak value, or the gravity center value of the histogram to be set as the noise level, the histogram is specifically analyzed and the noise level can be measured.

In addition, by setting the detection area on the basis of the shape of the histogram, the histogram can be created while the mixing of the motion difference component or the non-flat signal component is prevented further reliably, and it is therefore possible to improve the detection accuracy for the noise level.

In addition, by creating the histogram so as to set the histogram class larger as the fluctuation width of the characteristic amount is larger, it is possible to therefore improve the detection accuracy with the simple configuration. In addition, the noise level can be measured so as to correspond to the perception characteristic of human beings.

In addition, in a case where various video signal processings are executed with use of the noise level measurement result by analyzing the histogram and detecting the reliability degree of the noise level, the video signal processings are switched on the basis of the reliability degree and it is therefore possible to appropriately execute the video signal processings.

To be more specific, the reliability degree of the noise level can be detected on the basis of the distribution shape of the histogram, the total frequency, the distribution peak position, and/or the gravity center position.

In addition, in accordance with the reliability degree, by varying the smoothing degree to smooth the noise level, the measurement result with the high reliability degree can be obtained.

Second Embodiment

Figure 36:
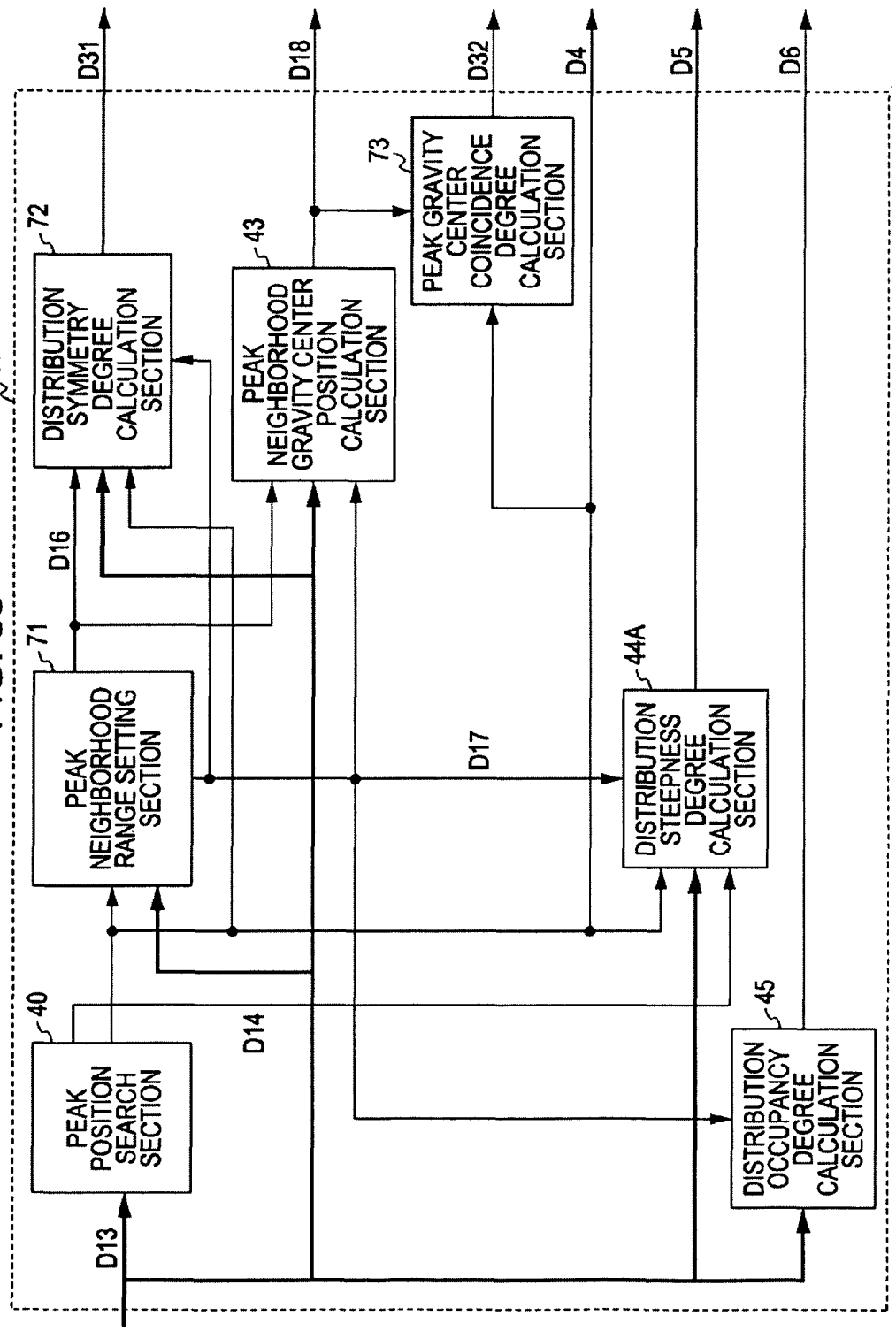
FIG. 36 is a block diagram of a noise distribution characteristic amount calculation section applied to a video signal processing apparatus according to a second embodiment of the present invention.

FIG. 36 is a block diagram of a configuration of a noise distribution characteristic amount calculation section applied to the video signal processing apparatus according to a second embodiment of the present invention. The video signal processing apparatus according to the second embodiment is configured similarly to the noise filter 1 according to the first embodiment except that a noise distribution characteristic amount calculation section 68 is applied instead of the noise distribution characteristic amount calculation section 38 (FIGS. 16 and 24) and a distribution reliability degree setting section 81 which will be described later is applied instead of the distribution reliability degree setting section 51 (FIGS. 15 and 27).

Figure 37:
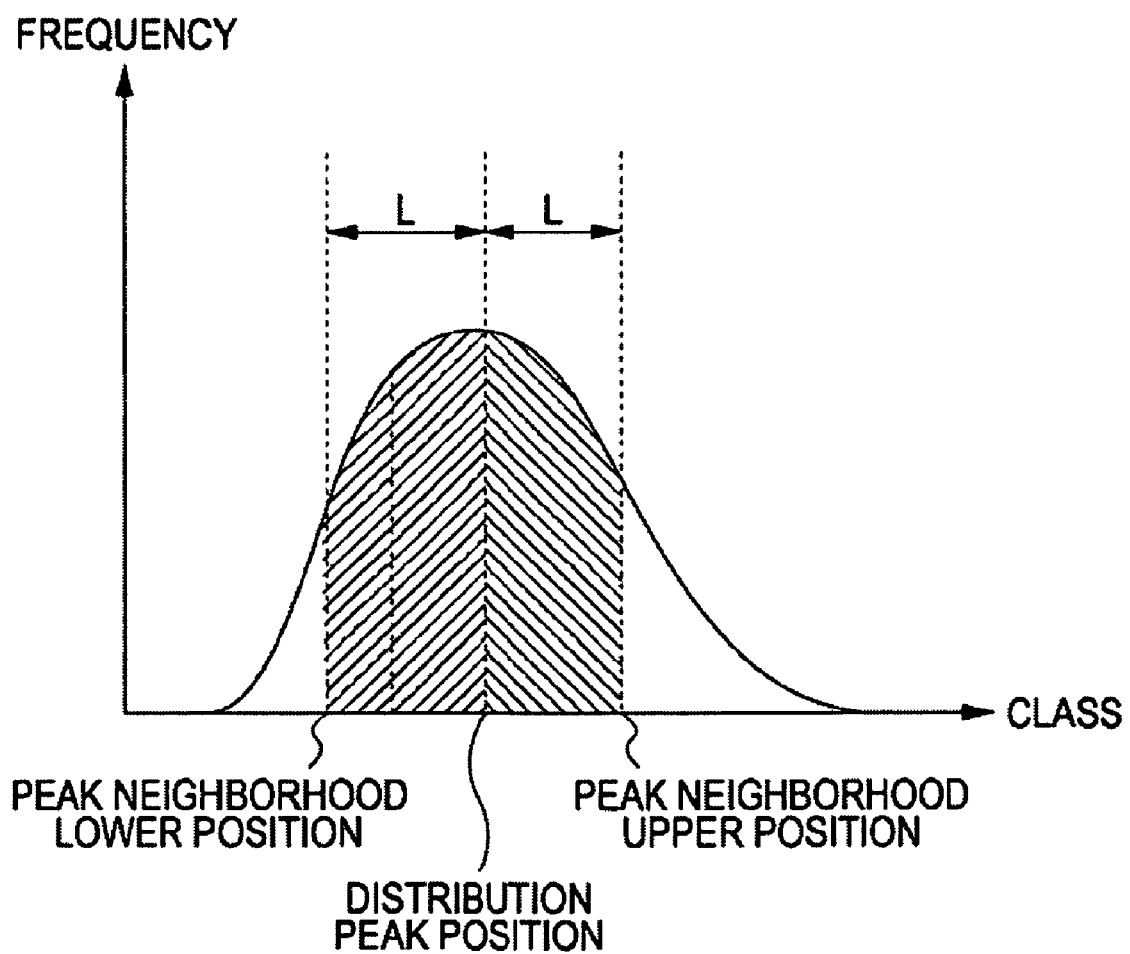
FIG. 37 is a characteristic curve diagram used for describing an operation of a peak neighborhood range setting in the noise distribution characteristic amount calculation section of FIG. 36.

Herein, in the noise distribution characteristic amount calculation section 68, a peak neighborhood range setting section 71 is provided instead of the peak neighborhood lower position detection section 41 and the peak neighborhood upper position detection section 42, to set the peak neighborhood lower position and the peak neighborhood upper position. To be more specific, as illustrated in FIG. 37, at upper and lower parts of the distribution peak position, the peak neighborhood range setting section 71 sets classes which are shifted from the distribution peak position by the predetermined number of classes L at the peak neighborhood lower position D16 and the peak neighborhood upper position D17.

A distribution symmetry degree calculation section 72 is adapted to calculate a symmetry degree of distributions at the upper and lower parts of the distribution peak position in the range between the peak neighborhood lower position and the peak neighborhood upper position and output as a distribution symmetry degree D31. To be more specific, the distribution symmetry degree calculation section 72 finds out a sum of frequencies from the peak neighborhood lower position D16 to the distribution peak position D4 and a sum of frequencies from the distribution peak position D4 to the peak neighborhood upper position D17. The distribution symmetry degree calculation section 72 sets the distribution symmetry degree D31 so that the value is increased as an absolute value of a difference value between the sums of these frequencies becomes smaller. It should be noted that instead of this, by finding out a ratio between these sums, the distribution symmetry degree D31 may be set so that the value is increased as the ratio gets closer to 1. It should be noted that the distribution symmetry degree D31 may be set by using other induce such as a distortion of the distribution.

A peak gravity center coincidence degree calculation section 73 is adapted to calculate the number of classes which is a difference between the peak neighborhood gravity center position information D18 and the distribution peak position D4 and set a peak gravity center coincidence degree D32 so that the value is decreased as the number of classes of the difference becomes larger.

The noise distribution characteristic amount calculation section 68 according to this embodiment outputs, as the parameters which feature the shape of the histogram, the distribution symmetry degree D31, the peak gravity center coincidence degree D32 in addition to the distribution peak position D4, the distribution steepness degree D5, and the distribution occupancy degree D6.

Figure 38:
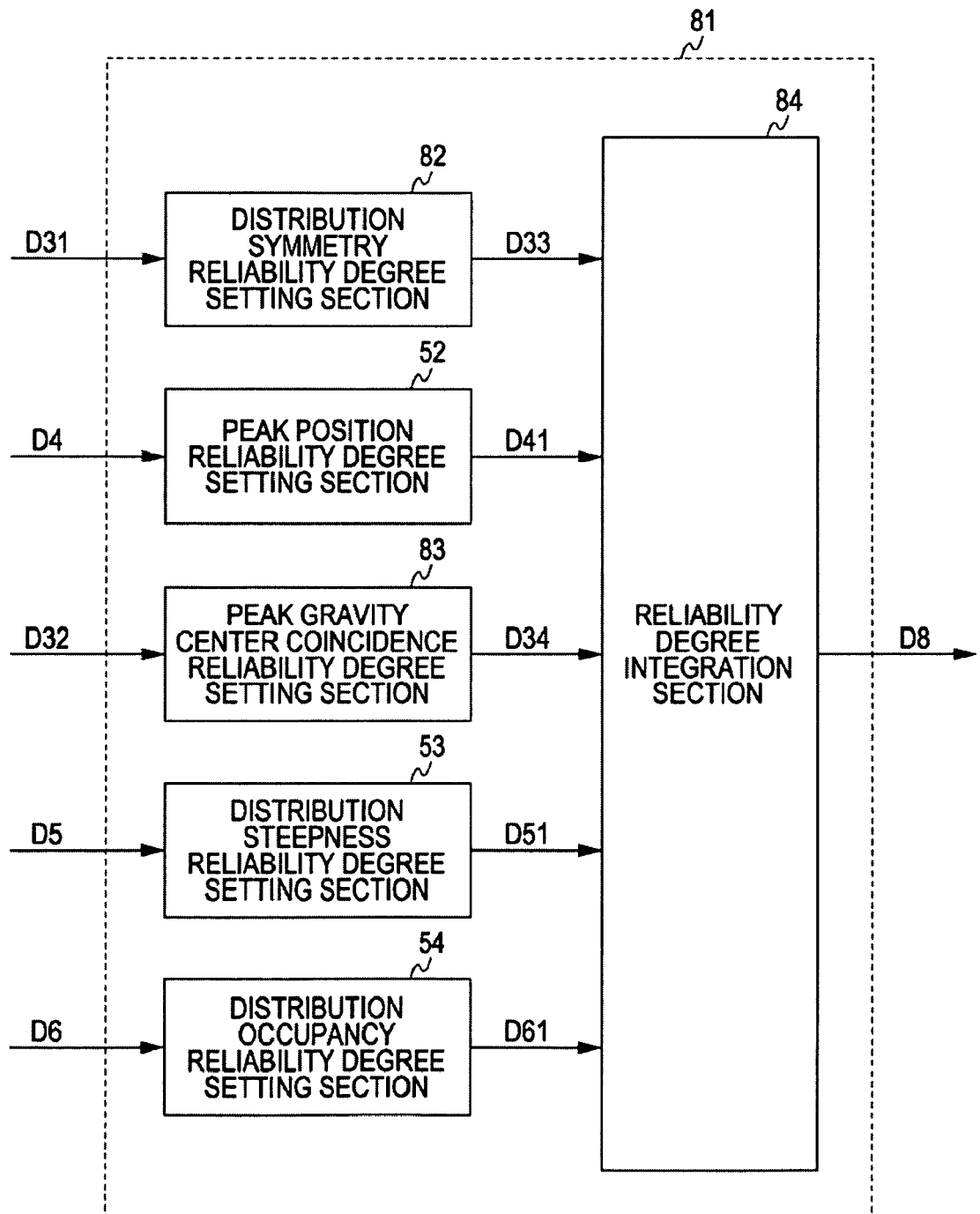
FIG. 38 is a block diagram of a distribution reliability degree setting section in the video signal processing apparatus according to the second embodiment of the present invention.
Figure 39:
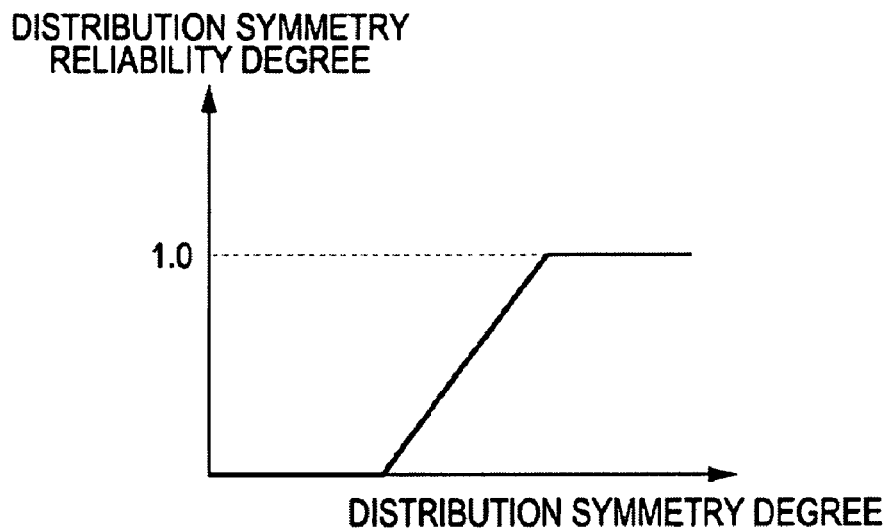
FIG. 39 is a characteristic curve diagram used for describing an operation of a distribution symmetry reliability degree setting section in the distribution reliability degree setting section of FIG. 38.
Figure 40:
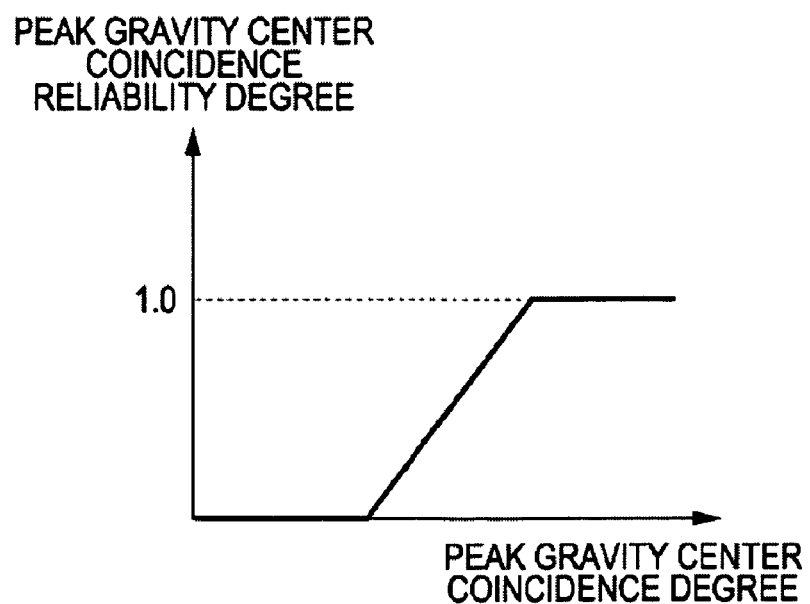
FIG. 40 is a characteristic curve diagram used for describing an operation of a peak gravity center coincidence reliability degree setting section in the distribution reliability degree setting section of FIG. 38.

FIG. 38 is a block diagram of the distribution reliability degree setting section 81 applied to the video signal processing apparatus according to the second embodiment. In the distribution reliability degree setting section 81, regarding FIG. 27, the same configurations as the distribution reliability degree setting section 51 according to the above-mentioned first embodiment are denoted by the corresponding reference numerals, and an overlapping description will be omitted. In the distribution reliability degree setting section 81, a distribution symmetry reliability degree setting section 82 is adapted to generate the distribution symmetry reliability degree D33 in which the saturated characteristics are set on the larger value side and the smaller value side with the values 1 and 0 as illustrated in FIG. 39 and the value is increased in accordance with the distribution symmetry degree D31. A peak gravity center coincidence reliability degree setting section 83 is adapted to generate the peak gravity center coincidence reliability degree D34 in which the saturated characteristics are set on the larger value side and the smaller value side with the values 1 and 0 as illustrated in FIG. 40 and the value is increased in accordance with the peak gravity center coincidence degree D32.

A reliability degree integration section 84 is adapted to integrate the reliability degrees D41, D51, D61, D33, and D34 to detect the total reliability degree D8. It should be noted that this integration can be performed by multiplying all the reliability degrees to set the reliability degree D8, or computation results or the like based on a predetermined function in which a weighted average of all the reliability degrees or all the reliability degrees are used as inputs.

According to this embodiment, at the upper and lower parts of the distribution peak position, by setting the classes shifted by the predetermined number of classes from the distribution peak position as the peak neighborhood lower position and the peak neighborhood upper position, it is possible to obtain a similar effect to the effect of the first embodiment with a more simple configuration as compared with the configuration according to the first embodiment.

In addition, by calculating the total reliability degree while the peak gravity center coincidence degree and the distribution symmetry are also considered, it is possible to further improve the measurement accuracy and the reliability degree.

Third Embodiment

Figure 41:
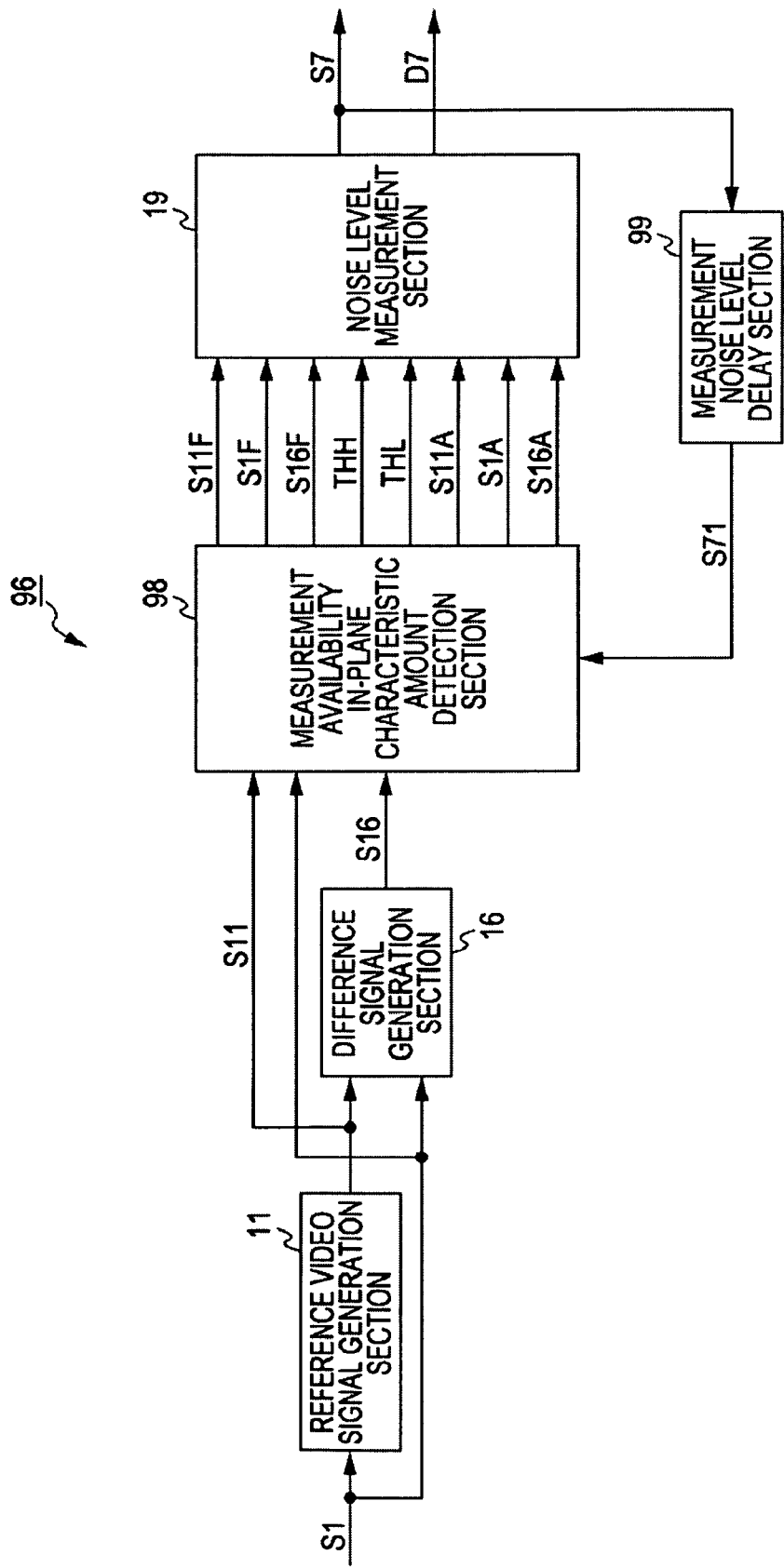
FIG. 41 is a block diagram of a measurement section applied to a video signal processing apparatus according to a third embodiment of the present invention.

FIG. 41 is a block diagram of a measurement section 96 applied to the video signal processing apparatus according to a third embodiment. The video signal processing apparatus according to this embodiment has a similar configuration to the noise filter 1 according to the first embodiment except that a measurement noise level delay section 99 is provided, and a measurement availability in-plane characteristic amount detection section 98 is provided the measurement availability in-plane characteristic amount detection section 18.

Herein, the measurement noise level delay section 99 is adapted to delay the measurement result S7 which is output from the noise level measurement section 19 by the period of the one field or the one frame to be output.

Figure 42:
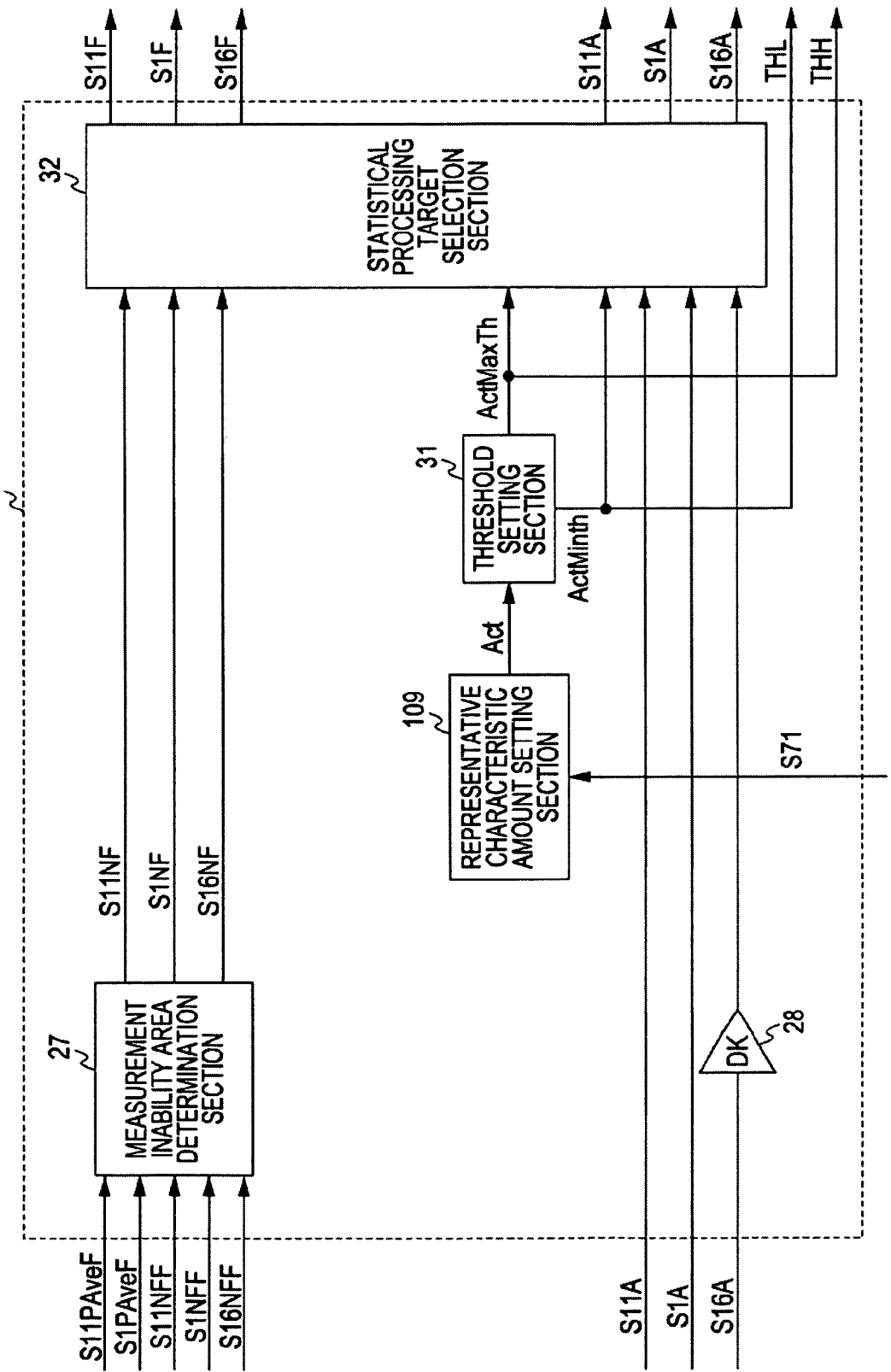
FIG. 42 is a block diagram of a measurement availability determination section applied to the measurement section of FIG. 41.

The measurement availability in-plane characteristic amount detection section 98 has a similar configuration to the above-mentioned measurement availability in-plane characteristic amount detection section 18 in FIG. 6 except that a measurement availability determination section 104 illustrated in FIG. 42 is provided instead of the measurement availability determination section 24. In addition, the measurement availability determination section 104 has a similar configuration to the above-mentioned measurement availability determination section 24 in FIG. 9 except that a representative characteristic amount setting section 109 is provided instead of the representative characteristic amount setting section 29 and the representative characteristic amount time smoothing section 30.

Herein, the representative characteristic amount setting section 109 calculates and outputs the representative characteristic amount RepAct on the basis of the noise level measurement result S71 before the one field or the one frame which is output from the measurement noise level delay section 99 instead of the measurement inability area determination flags S1NF, S11NF, and S16NF and the activities S1A, S11A, and S16A output from the measurement inability area determination section 27. It should be noted that as a result, in the noise filter 1, at the start time of the operation, the representative characteristic amount RepAct is output with a standard set value.

According to the above-mentioned configuration, by setting the representative characteristic amount on the basis of the noise measurement result obtained so far, it is possible to simplify the configuration related to the detection of the representative characteristic amount.

Fourth Embodiment

Figure 43:
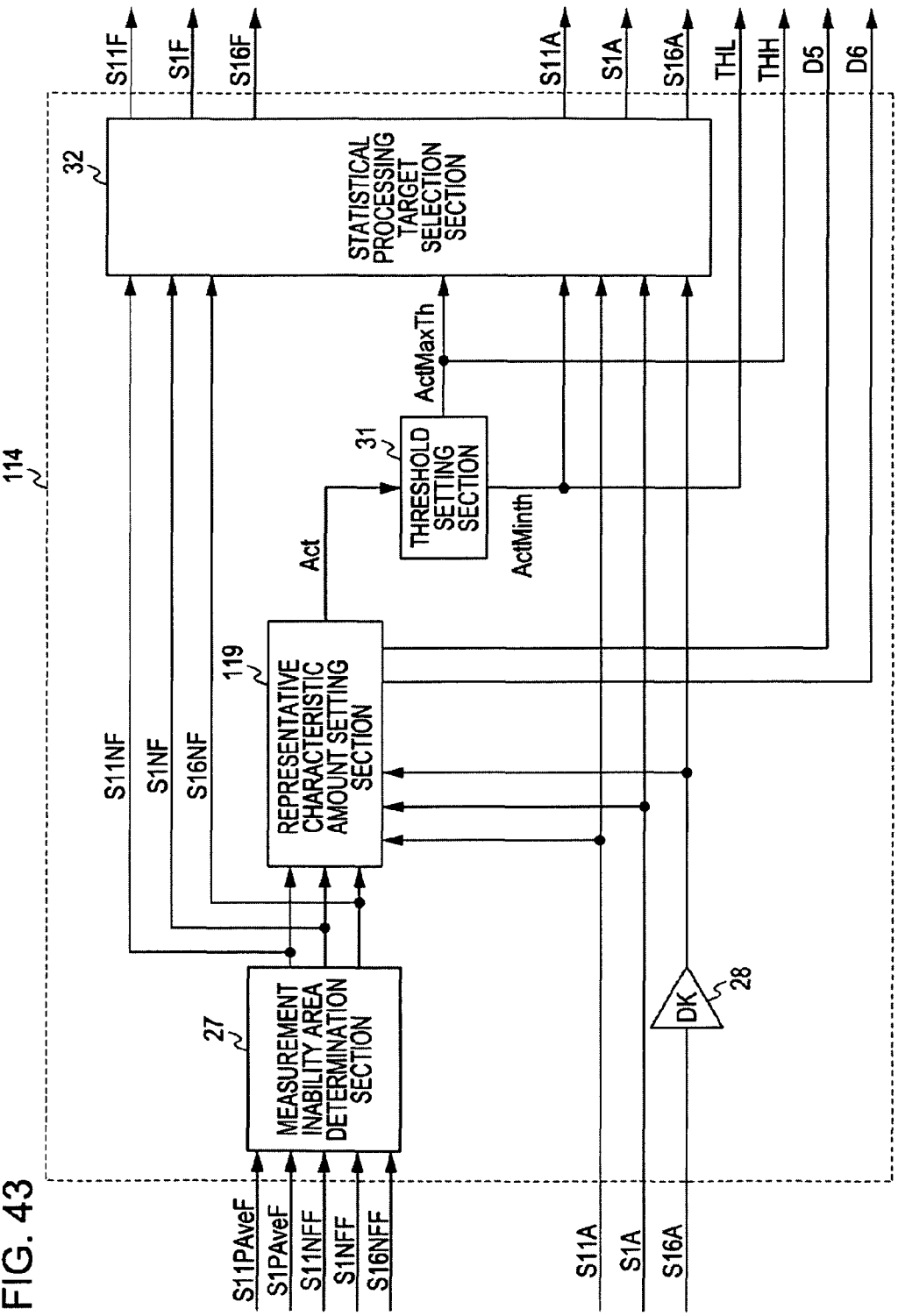
FIG. 43 is a block diagram of a measurement availability determination section applied to a video signal processing apparatus according to a fourth embodiment of the present invention.

FIG. 43 is a block diagram of a measurement availability determination section applied to the video signal processing apparatus according to a fourth embodiment of the present invention. The video signal processing apparatus according to this embodiment has a similar configuration to the above-mentioned embodiment except that a measurement availability determination section 114 illustrated in FIG. 43 is provided instead of the measurement availability determination section 24 (FIGS. 6 and 9) and a noise level measurement section 129 which will be described later is provided instead of the noise level measurement section 19.

The measurement availability determination section 114 is provided with a representative characteristic amount setting section 119 instead of the representative characteristic amount setting section 29 and the representative characteristic amount time smoothing section 30. The representative characteristic amount Act is generated in the representative characteristic amount setting section 119 and directly input to the threshold setting section 31. The measurement availability determination section 114 has a similar configuration to the above-mentioned measurement availability determination section 24 except that the configuration related to the representative characteristic amount Act is different.

Herein, the representative characteristic amount setting section 119 generates the histogram on the basis of the activities S1A, S11A, and S16A of the input video signal S1, the reference video signal S11, and the difference signal S16, and through the analysis of the histogram, the representative characteristic amount Act is generated. In addition, the distribution steepness degree D5, the distribution occupancy degree D6 is detected from the histogram to be output to the noise level measurement section 129.

Figure 44:
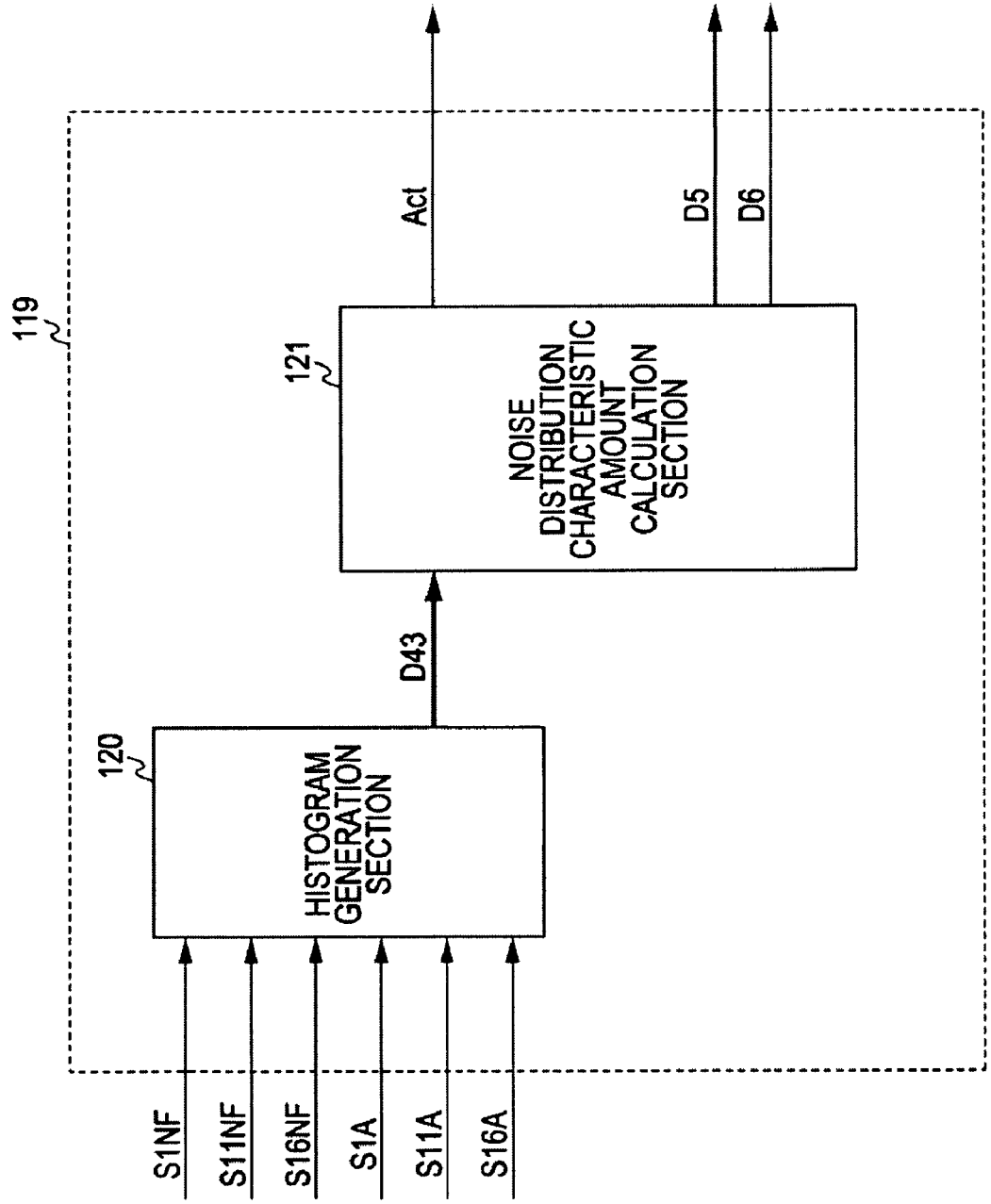
FIG. 44 is a block diagram of a representative characteristic amount setting section in the measurement availability determination section of FIG. 43.

That is, as illustrated in FIG. 44, in the representative characteristic amount setting section 119, a histogram generation section 120 is adapted to selectively set the activities S1A, S11A, and S16A determined as being suitable to the measurement on the basis of the measurement availability identification flags S1F, S11F, and S16F as the histogram generation targets, and the histogram is created by using the activities S1A, S11A, and S16A of the histogram generation targets. The histogram generation section 120 creates the histogram in units of the field or units of the frame and notifies a noise distribution characteristic amount calculation section 121 of the frequency of each class the created histogram.

Figure 45:
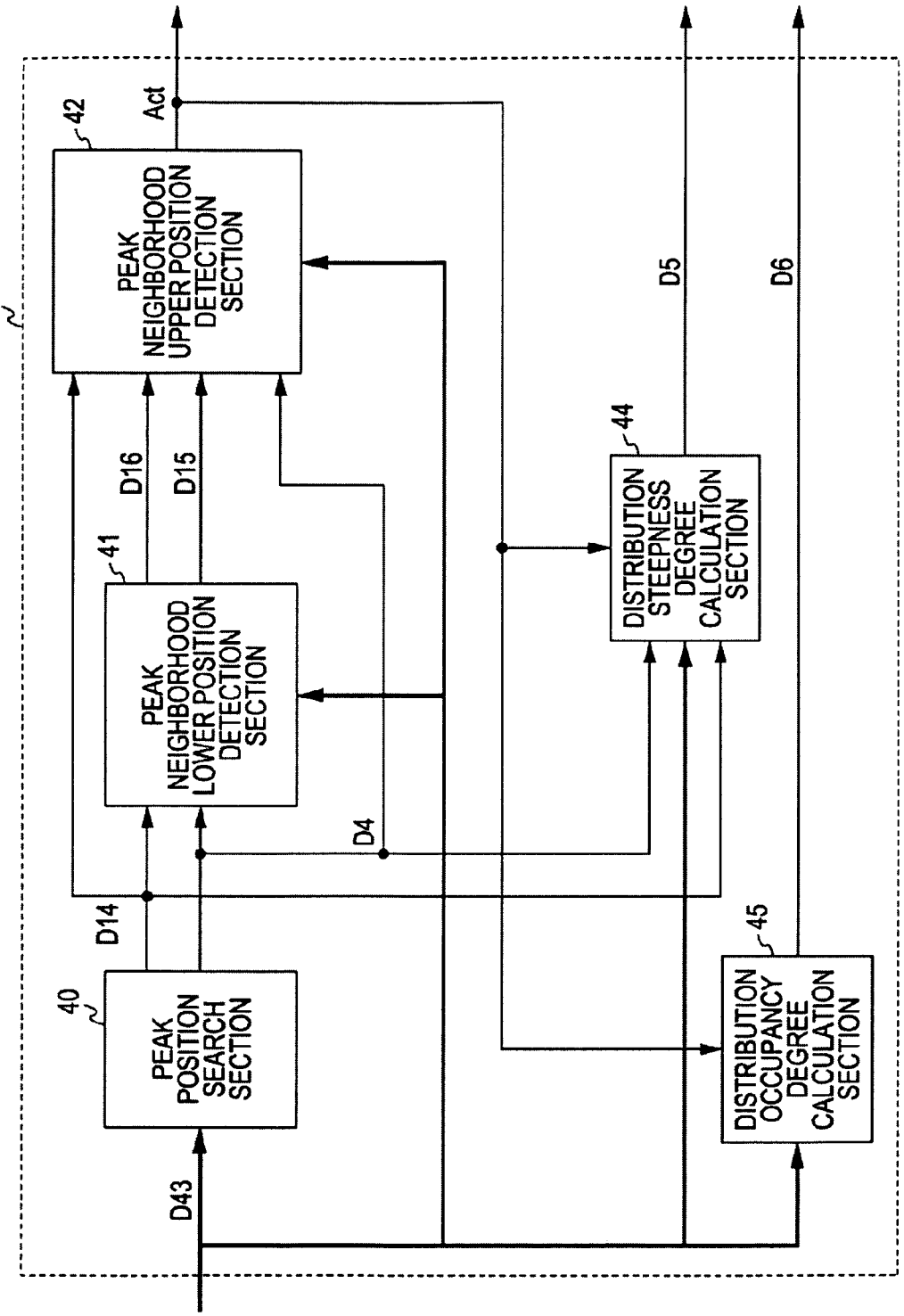
FIG. 45 is a block diagram of a noise distribution characteristic amount calculation section in the representative characteristic amount setting section of FIG. 44.

The noise distribution characteristic amount calculation section 121 analyzes the histogram generated in the histogram generation section 120 to set the representative characteristic amount Act, the distribution steepness degree D5, and the distribution occupancy degree D6. Herein, FIG. 45 is a block diagram of a configuration of the noise distribution characteristic amount calculation section 121. The noise distribution characteristic amount calculation section 121 has a similar configuration to the noise distribution characteristic amount calculation section 38A (FIGS. 15, 16, and 24) provided to the noise level measurement section 19 according to the first embodiment except that the histogram of the processing targets is different and the peak neighborhood gravity center position calculation section 43 is omitted. Therefore, in FIG. 45, the configurations corresponding to the noise distribution characteristic amount calculation section 38A illustrated in FIG. 24 are denoted by the same reference numerals.

As a result, the noise distribution characteristic amount calculation section 121 detects the peak neighborhood upper position of the histogram to set the representative characteristic amount Act. It should be noted that as a result, as described in the first embodiment, the intermediate value, the average value, the peak value, or the like of the histogram may be set as the representative characteristic amount instead of the peak neighborhood upper position.

Figure 46:
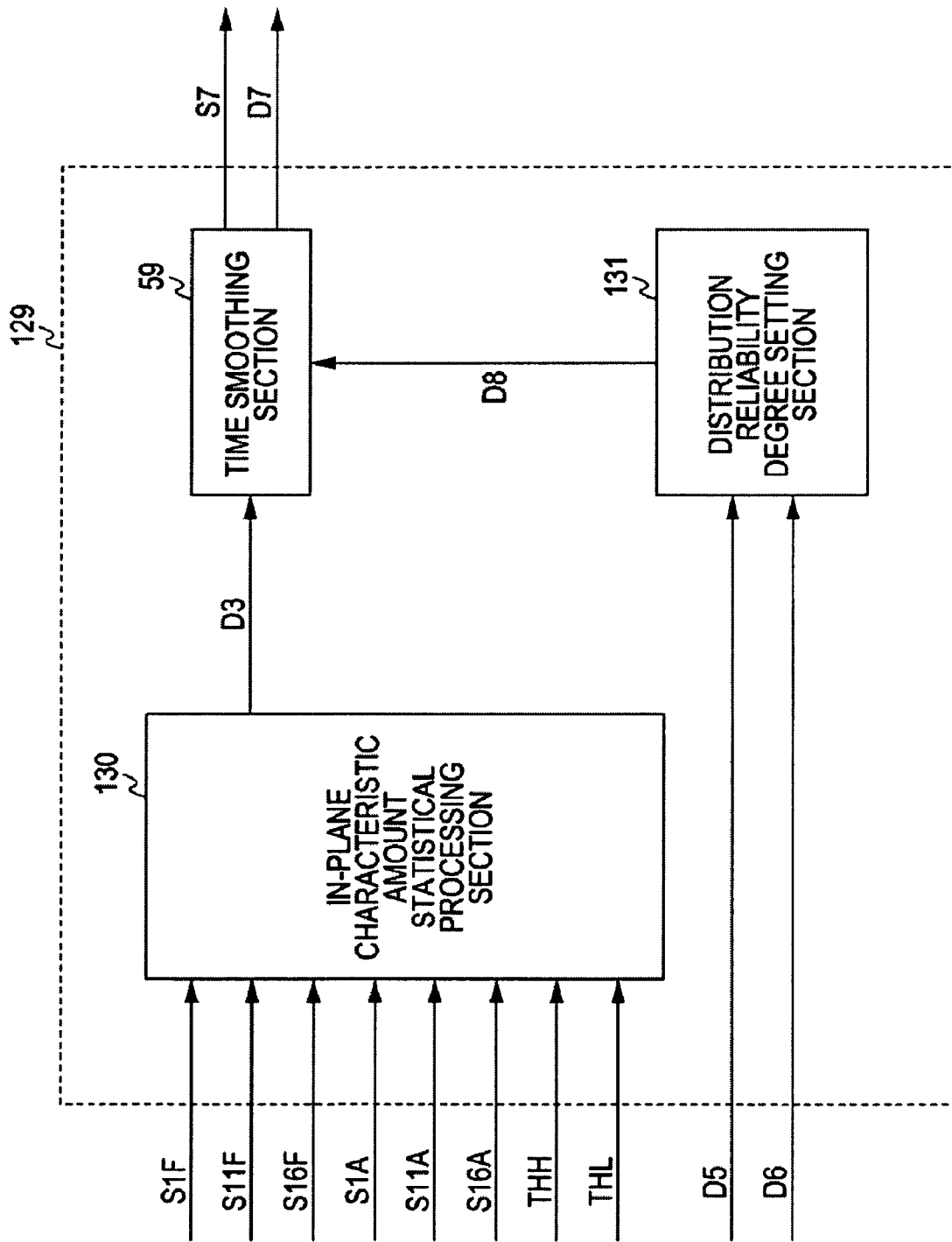
FIG. 46 is a block diagram of a noise measurement section applied to the video signal processing apparatus according to the fourth embodiment of the present invention.

FIG. 46 is a block diagram of a noise measurement section applied to the video signal processing apparatus according to the fourth embodiment. In the noise level measurement section 129, the similar configurations of the noise level measurement section 19 (FIG. 15) are denoted by the corresponding reference numerals, and an overlapping description will be omitted. In the noise level measurement section 129, an in-plane characteristic amount statistical processing section 130 has a similar configuration to the in-plane characteristic amount statistical processing section 35 of the noise level measurement section 19 except that the distribution steepness degree D5 and the distribution occupancy degree D6 are not generated and output, and on the basis of the measurement availability identification flags S1F, S11F, and S16F, the activities S1A, S11A, and S16A are selectively obtained to generate the histogram. By analyzing the histogram, the noise level D3 is output. In addition, of course, the histogram is not generated in the in-plane characteristic amount statistical processing section 130, but such a configuration may be adopted that the noise level D3 is directly found out from the statistical values such as the average value and the intermediate value of the activities S1A, S11A, and S16A determined as the measurement availability on the basis of the measurement availability identification flags S1F, S11F, and S16F to be output.

A distribution reliability degree setting section 131 is adapted to process the distribution steepness degree D5, and the distribution occupancy degree D6 to generate the respective reliability degrees similarly to the distribution reliability degree setting section 51, and integrate the reliability degrees to output the total reliability degree D8.

According to this embodiment, a similar effect to that of the first embodiment can be obtained also when the histogram is generated to calculate the representative characteristic amount.

Fifth Embodiment

Figure 47:
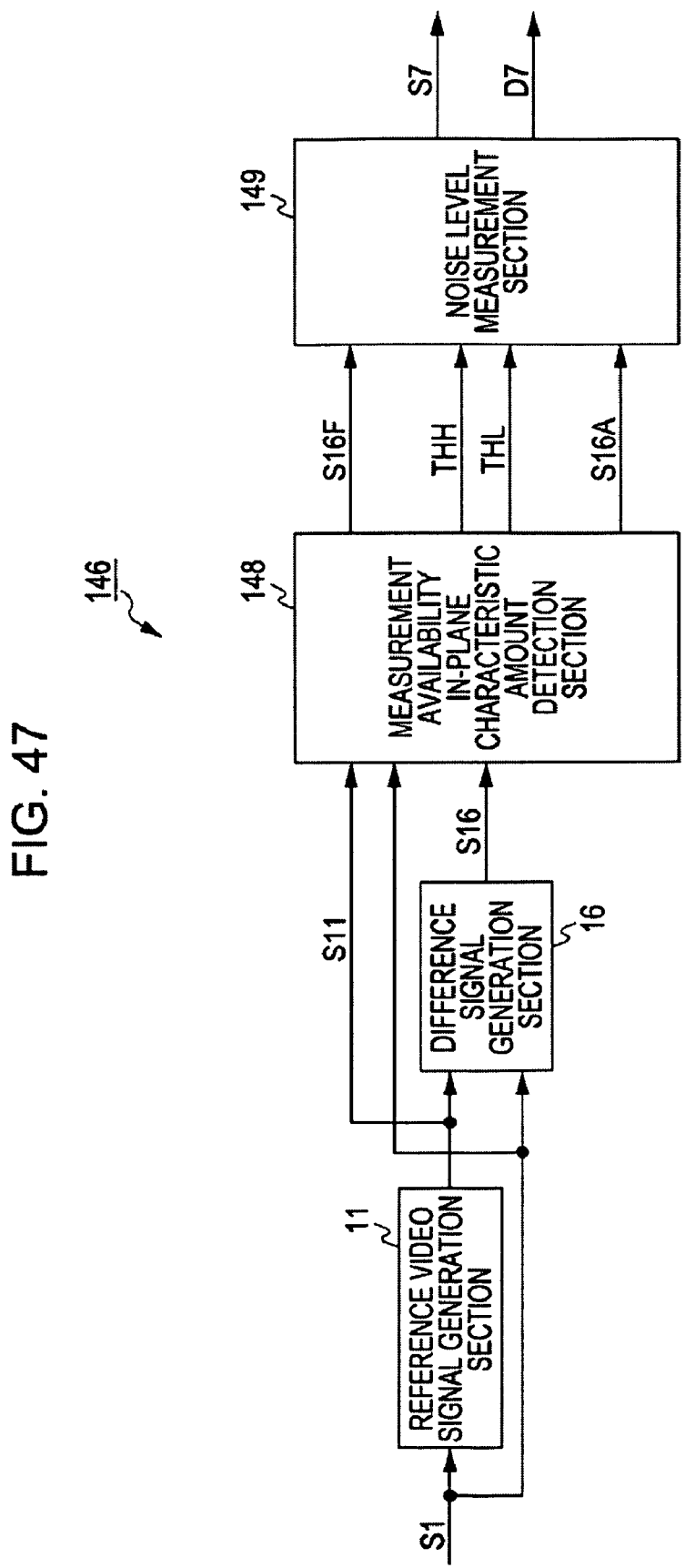
FIG. 47 is a block diagram of a measurement section in a video signal processing apparatus according to a fifth embodiment of the present invention.

FIG. 47 is a block diagram of a measurement section in the video signal processing apparatus according to a fifth embodiment of the present invention in comparison with FIG. 2. A measurement section 146 is adapted to generate the activity S16A only from the difference signal S16 and process the activity S16A to detect the noise level S7 and the reliability degree D7. As a result, the measurement section 146 is provided with a measurement availability in-plane characteristic amount detection section 148 and a noise level measurement section 149 instead of the measurement availability in-plane characteristic amount detection section 18 and the noise level measurement section 19 which are the configurations related to the activity processing.

Figure 48:
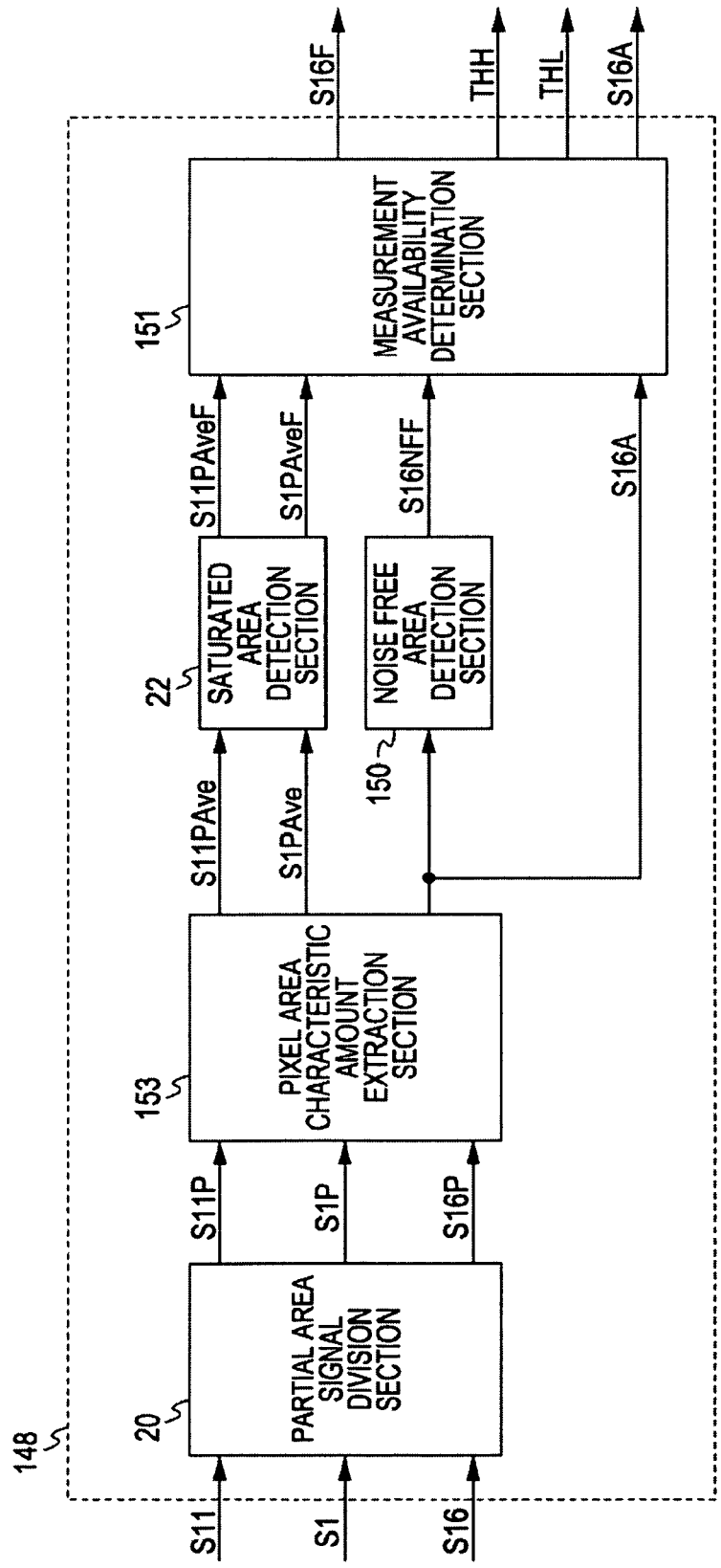
FIG. 48 is a block diagram of a measurement availability in-plane characteristic amount detection section applied to the measurement section of FIG. 47.

Herein, FIG. 48 is a block diagram of a configuration of the measurement availability in-plane characteristic amount detection section 148. The measurement availability in-plane characteristic amount detection section 148 has a similar configuration to the measurement availability in-plane characteristic amount detection section 18 (FIG. 6) except that a pixel area characteristic amount extraction section 153, a noise free area detection section 150, and a measurement availability determination section 151 are provided instead of the pixel area characteristic amount extraction section 21, the noise free area detection section 23, and the measurement availability determination section 24. Herein, the noise free area detection section 150 and the measurement availability determination section 151 respectively have similar configurations to the pixel area characteristic amount extraction section 21, the noise free area detection section 23, and the measurement availability determination section 24 except that the configurations related to the processings on the activities S1A and S11A of the input video signal S1 and the reference video signal S11 are omitted.

As a result, the measurement availability in-plane characteristic amount detection section 148 is adapted to set the representative characteristic amount only from the activity S16A of the difference signal 516 to set the thresholds THH and THL. In addition, a measurement availability identification flag S16F only for the difference signal S16 is generated and output.

The noise level measurement section 149 accordingly selectively obtains the activity S16A of the difference signal S16 on the basis of the measurement availability identification flag S16F to generate the histogram. By analyzing the histogram, the noise level S7 and the reliability degree D7 are detected.

As in this embodiment, even in a case where the noise level is measured by detecting only one type of the characteristic amount regarding the difference signal, it is possible to obtain the similar effect to that of the above-mentioned embodiment. In addition, in this case, it is possible to measure only the noise components which time-fluctuate between continuous fields or frames in principle. Therefore, the fixed pattern noise which does not time-fluctuate is measured at a small level in term of the noise level. As a result, with the configuration illustrated in FIG. 1, with a combination with a time cyclic type 3D-NR for use, the fixed pattern noise can be eliminated without excessively increase the feedback ratio, and as a result, it is possible to prevent a generation of blur which is referred to as smear at a moving object border section with a low contrast.

Sixth Embodiment

Figure 49:
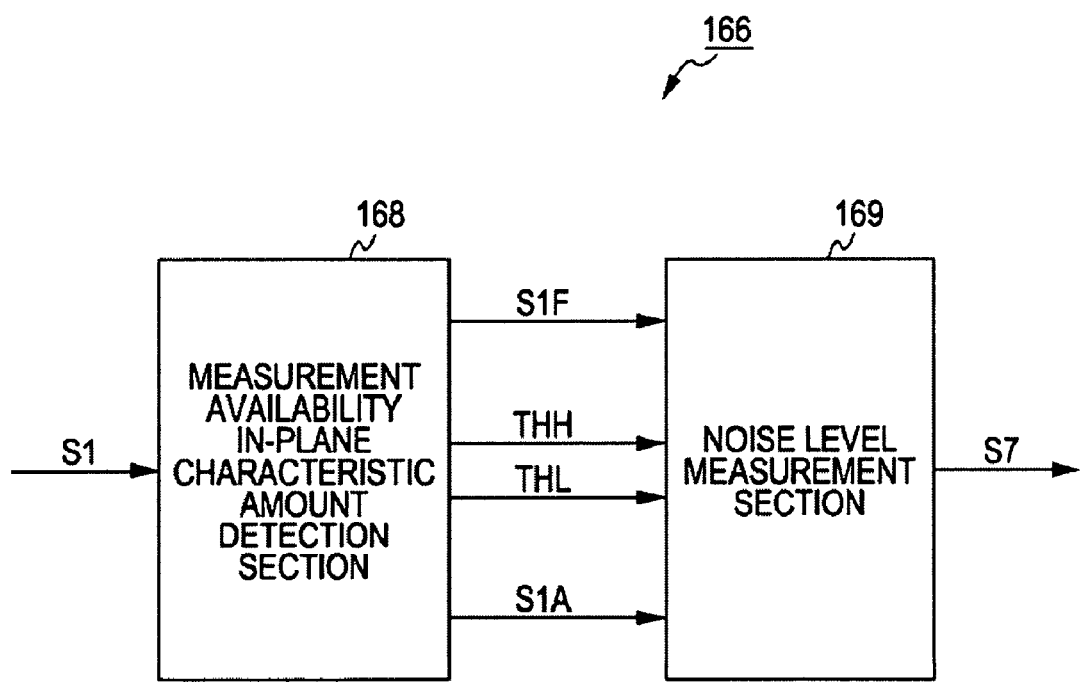
FIG. 49 is a block diagram of a measurement section in a video signal processing apparatus according to a sixth embodiment of the present invention.

FIG. 49 is a block diagram of a measurement section related to the video signal processing apparatus according to a sixth embodiment of the present invention in comparison with FIG. 2. A measurement section 166 is adapted to generate the activity S1A only from the input video signal S1 and process the activity S1A to detect the noise level S7 and the reliability degree D7. As a result, in the measurement section 166, the reference video signal generation section 11 and the difference signal generation section 16 which are the configurations for respectively generating the reference video signal S11 and the difference video signal S16 are omitted. In addition, the difference measurement availability in-plane characteristic amount detection section 168 and the noise level measurement section 169 for processing only the activity S1A of the input video signal S1 are provided instead of the measurement availability in-plane characteristic amount detection section 18 and the noise level measurement section 19.

Figure 50:
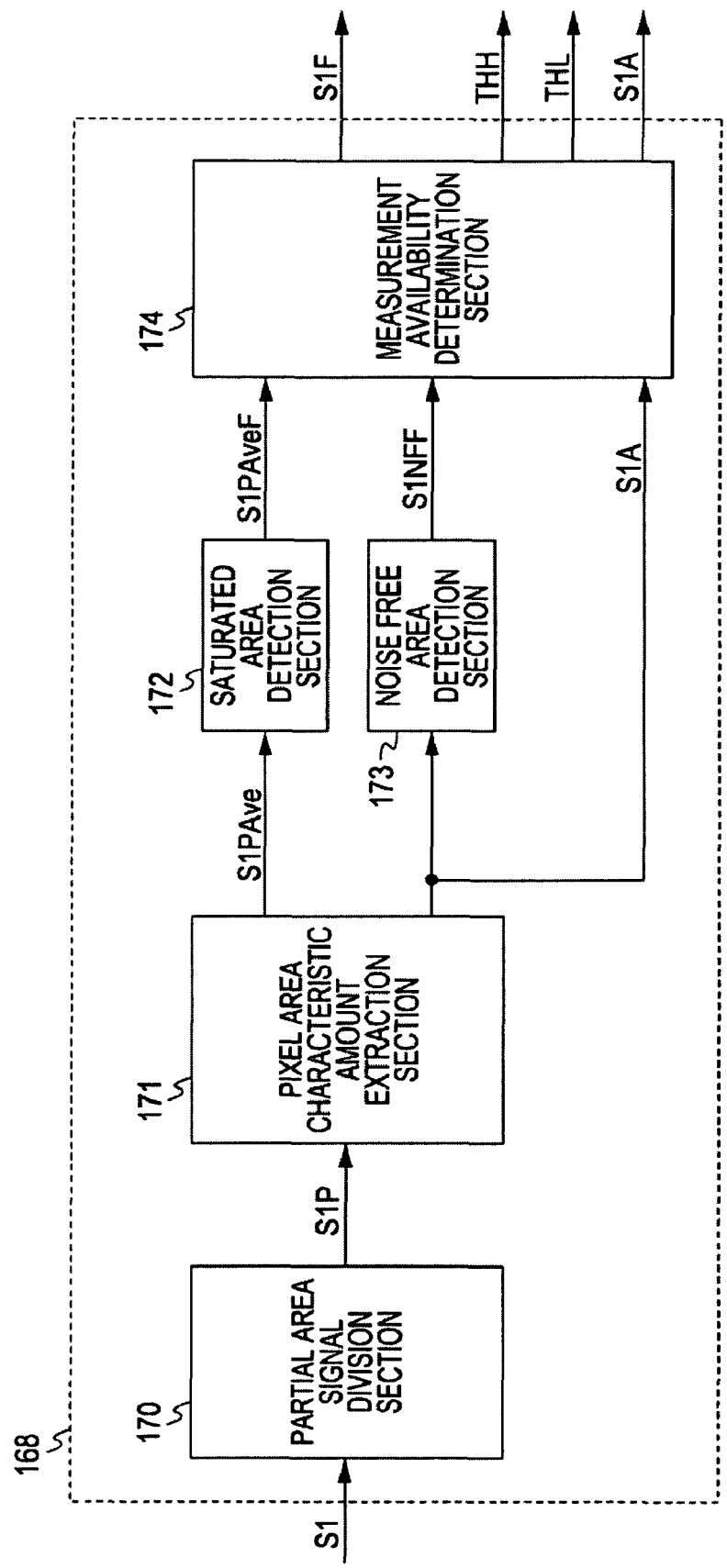
FIG. 50 is a block diagram of a measurement availability in-plane characteristic amount detection section applied to the measurement section of FIG. 49.

Herein, the measurement availability in-plane characteristic amount detection section 168 divides the input video signal S1 for each area as illustrated in FIG. 50 in a partial area signal division section 170. A pixel area characteristic amount extraction section 171 is adapted to process an output signal from the partial area signal division section 170 and for each area, output the activity S1A of the input video signal S1 and the average value S1PAve. A saturated area detection section 172 is adapted to detect the average value S1PAve and the saturated area of the input video signal S1. A noise free area detection section 173 is adapted to process the activity S1A of the input video signal S1 to detect the noise free area of the input video signal S1. A measurement availability determination section 174 is adapted to set a representative value from the activity S1A of the input video signal S1 to set the thresholds THH and THL, and the like.

As a result, the noise level measurement section 169 selectively obtains the activity S1A of the input video signal S1 from the measurement availability identification flag S1F to generate the histogram and analyzes the histogram to detect the noise level S7 and the reliability degree D7.

As in this embodiment, even in a case where the noise level is measured by detecting only one type of the characteristic amount regarding the input video signal, it is possible to obtain the similar effect to that of the above-mentioned embodiment. In addition, in this case, the configurations related to the generations of the reference video signal and the difference signal can be omitted and it is therefore possible to simplify the entire configuration.

Seventh Embodiment

It should be noted that according to the above-mentioned embodiment, the case in which the reference video signal is generated in the reference video signal generation section has been described, but the embodiments of the present invention are not limited to the above. The delay signal generated in the delay signal generation section 2 (FIG. 1) may be used as generated in. In this manner, the configuration of the reference video signal generation section can be omitted and it is therefore possible to simplify the entire configuration.

In addition, according to the above-mentioned embodiment, the case in which the noise measurement result is used for the noise reduction processing has been described, but the embodiments of the present invention are not limited to the above. The noise measurement result can be widely applied to various video signal processings and further, the measurement of the noise amount, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A computer-implemented method for processing a video signal, comprising:
generating a reference signal associated with an input video signal, the reference signal being based on a motion compensation of the input video signal;
identifying a plurality of areas within the input video signal;
computing, using at least one processor, indices of a noise level associated with the plurality of areas of the input video signal, the indices comprising fluctuations of pixel values of at least the reference signal and the input video signal;
determining, using the at least one processor, a subset of the computed indices suitable to a measurement of the noise level within the plurality of areas;
creating, using the least one processor, a histogram based on the subset of the indices suitable to the measurement of the noise level; and
detecting the noise level associated with the input signal through an analysis of the histogram.

2. The method of claim 1, further comprising:
generating a difference signal, the difference signal being based on a difference between the input video signal and the reference signal,
wherein the indices comprise fluctuations of pixel values of the difference signal, the reference signal, and the input video signal.

3. The method of claim 1, wherein:
the reference signal comprises a delay signal having a corresponding delay time; and
the delay time of the delay signal is a period of one field or one frame of the input video signal.

4. The method of claim 1, wherein:
the method further comprises:
detecting a saturated area which is not suitable to the measurement of the noise level on the basis of a determination on a signal level of the input video signal; and
detecting a noise free area which is not suitable to a measurement of the noise level area on the basis of a determination on the characteristic amounts; and
the determining comprises:
selecting indices associated with areas of the input video signal that fail to be associated with the saturated area and the noise free area as the indices suitable to the measurement of the noise level.

5. The method of claim 1, wherein
the method further comprises:
setting a representative characteristic amount which represents a plurality of the computed indices; and
setting at least one of an upper limit threshold and a lower limit threshold of the indices, the representative characteristic amount being used as a reference; and
the determining comprises:
determining whether a value of at least one of the indices is equal to or larger than the set upper limit threshold, or is equal to or smaller than the set lower limit threshold: and
selecting the at least one of the indices for the subset, when the value is equal to or larger than the upper limit threshold, or is equal to or smaller than the lower limit threshold.

6. The method of claim 5, wherein the determining the subset of the computed indices comprises:
smoothing at least one of the representative characteristic amount, the upper limit threshold, or the lower limit threshold.

7. The method of claim 6, wherein the smoothing comprises applying a statistical filter to the representative characteristic amount, the upper limit threshold, or the lower limit threshold.

8. The method of claim 5, wherein the setting the representative characteristic amount includes:
setting at least one of a minimum value, an average value, an intermediate value, a variance value of the plurality of indices, or a synthesis value obtained by using at least two of the minimum value, the average value, the intermediate value, or the variance value as the representative characteristic amount.

9. The method of claim 1, wherein detecting the noise level comprises:
detecting at least one of an intermediate value, an average value, a peak value, or a gravity center value of the histogram as the noise level.

10. The method of claim 9, wherein detecting the noise level comprises:
setting a detection range for at least one of the intermediate value, the average value, the peak value, or the gravity center value, based on a shape of the histogram.

11. The method of claim 1, wherein the detecting comprises:
varying a class of the histogram in accordance with the subset of the indices, the histogram class becoming larger as a fluctuation width of the indices increases.

12. The method of claim 1, wherein detecting the noise level comprises:
detecting a reliability degree of the noise level, based on at least the histogram.

13. The method of claim 12, wherein detecting the reliability degree comprises:
detecting the reliability degree on the basis of at least one of a distribution shape of the histogram, a total frequency, a peak position, or a gravity center position.

14. The method of claim 12, wherein detecting the noise level comprises:
smoothing the noise level by varying a smooth degree in accordance with the reliability degree.

15. The method of claim 5, wherein setting the representative characteristic amount comprises:
setting, on the basis of the detected noise level, the representative characteristic amount for a period during which a noise level is subsequently detected.

16. The method of claim 5, wherein:
creating the histogram comprises creating the histogram over a predetermined period of time; and
the method further comprises analyzing the histogram to set the representative characteristic amount.

17. A tangible, non-transitory computer-readable storage medium storing instructions that, when executed by a processor, cause the processor to perform a method for processing a video signal, the method comprising:
generating a reference signal associated with an input video signal, the reference signal being based on a motion compensation of the input video signal;
identifying a plurality of areas within the input video signal;
computing, using at least one processor, indices of a noise level associated with the plurality of areas of the input video signal, the indices comprising fluctuations of pixel values of at least the reference signal and the input video signal;
determining, using the at least one processor, a subset of the computed indices suitable to a measurement of the noise level within the plurality of areas;
creating, using the least one processor, a histogram based on the subset of the indices suitable to the measurement of the noise level; and
detecting the noise level associated with the input signal through an analysis of the histogram.

18. An apparatus, comprising:
a processor;
a generating section configured to use the processor to generate a reference signal associated with an input video signal, the reference signal being based on a motion compensation of the input video signal;
an identification section configured to use the processor to identify a plurality of areas within the input video signal;
a computation section configured to use the processor to compute indices of a noise level associated with the plurality of areas of the input video signal, the indices comprising fluctuations of pixel values of at least the reference signal and the input video signal;
a determination section configured to use the processor to determine at least subset of the computed indices suitable to a measurement of the noise level within the plurality of areas;
a noise level measurement section configured to use the processor to create a histogram based on the subset of the indices suitable to the measurement of the noise level and detect the noise level associated with the input signal through an analysis of the histogram.

19. The method of claim 1, wherein the generating comprises:
computing a delay signal associated with the input video signal, the delay signal corresponding to an application of a delay time to the input video signal, the delay time comprising a period of one field or one frame of the input video signal.

20. The method of claim 19, wherein the generating further comprises:
computing a motion compensation vector associated with the input video signal, based on at least the delay signal; and
generating the reference signal based on at least the input video signal and the motion compensation vector.

* * * * *